US010687329B2

(12) United States Patent
Nosratinia et al.

(10) Patent No.: US 10,687,329 B2
(45) Date of Patent: Jun. 16, 2020

(54) COHERENCE DIVERSITY IN FREQUENCY AND TIME

(71) Applicant: The Board of Regents, The University of Texas System, Austin, TX (US)

(72) Inventors: Aria Nosratinia, Plano, TX (US); Mohamed Fadel Shady, Richardson, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 106 days.

(21) Appl. No.: 15/864,769

(22) Filed: Jan. 8, 2018

(65) Prior Publication Data

US 2018/0199323 A1    Jul. 12, 2018

Related U.S. Application Data

(60) Provisional application No. 62/443,153, filed on Jan. 6, 2017.

(51) Int. Cl.
*H04W 72/04*   (2009.01)
*H04L 5/00*    (2006.01)
(Continued)

(52) U.S. Cl.
CPC ........ *H04W 72/044* (2013.01); *H04B 7/0491* (2013.01); *H04B 7/12* (2013.01);
(Continued)

(58) Field of Classification Search
CPC ...... H04B 7/0413; H04B 7/0491; H04B 7/12; H04L 25/023; H04L 27/18; H04L 5/0048;
(Continued)

(56) References Cited

U.S. PATENT DOCUMENTS 7,042,858 B1 * 5/2006 Ma ................. H04L 1/0618
370/208
2013/0251058 A1 * 9/2013 Wu ................. H04B 7/0456
375/267
(Continued)

OTHER PUBLICATIONS

Coherence Diversity in Time and Frequency presentation by Aria Nosratinia, Information Theory and Applications Workshop, San Diego, CA, Feb. 2, 2016.
Coherence Diversity in Time and Frequency by M. Fadel and A. Nosratinia, 2016 IEEE Global Communications Conference (GLOBECOM), Dec. 2016.
Coherence Disparity in Broadcast and Multiple Access Channels by M. Fadel and A. Nosratinia, IEEE Transactions on Information Theory, Volume: 62, Issue: 12, Dec. 2016.
(Continued)

*Primary Examiner* — Faisal Choudhury
(74) *Attorney, Agent, or Firm* — Thomas Horstemeyer, LLP

(57) ABSTRACT

Various examples are provided for coherence diversity. In one example, a method includes receiving a product signal transmitted over a plurality of subcarriers, the product signal including a product superposition of a first baseband signal and a second baseband signal; estimating equivalent channel responses for the plurality of subcarriers based upon the pilot symbol in the number of time slots of the plurality of subcarriers; and decoding the second encoded message based at least in part upon the first baseband signal and the equivalent channel responses. The first baseband signal can include a pilot symbol in a number of time slots of at least a portion of the plurality of subcarriers and a first encoded message in a remaining number of time slots of the plurality of subcarriers, and the second baseband signal can include a second encoded message.

25 Claims, 18 Drawing Sheets

(a)

(b)

(c)

(d)

(51) Int. Cl.
*H04L 25/02* (2006.01)
*H04B 7/0491* (2017.01)
*H04B 7/12* (2006.01)

(52) U.S. Cl.
CPC .......... *H04L 5/0023* (2013.01); *H04L 5/0048* (2013.01); *H04L 25/021* (2013.01); *H04L 25/0222* (2013.01); *H04L 25/0224* (2013.01); *H04L 5/0035* (2013.01)

(58) Field of Classification Search
CPC . H04L 5/0023; H04L 5/0035; H04L 25/0222; H04L 25/021; H04L 25/0224; H04J 15/00; H04W 72/044
USPC .......................................................... 370/329
See application file for complete search history.

(56) References Cited

U.S. PATENT DOCUMENTS

2013/0343474 A1* 12/2013 Nosratinia ............ H04L 25/023
 375/267
2016/0197745 A1* 7/2016 Yi ....................... H04L 25/0204
 370/329

OTHER PUBLICATIONS

Li et al. "Product Superposition for MIMO Broadcast Channels" IEEE Transactions on Information Theory, vol. 58, No. 11 (Nov 2012) 14 pages.
Li et al. "Coherent Product Superposition for Downlink Multiuser MIMO" IEEE (Jul 2016) 17 pages.

* cited by examiner

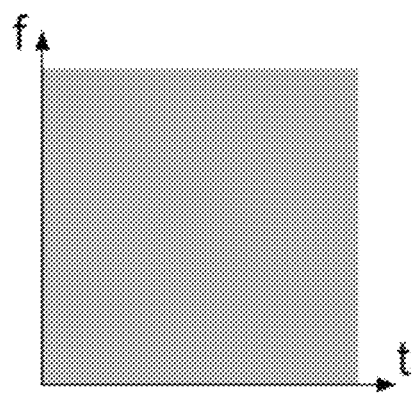
(a)
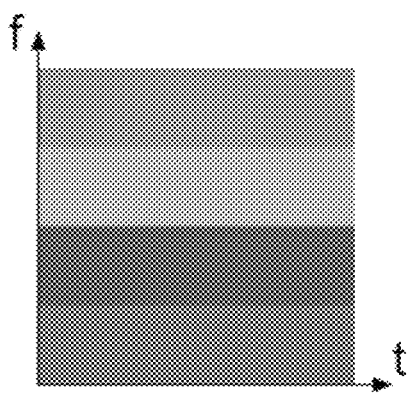
(b)
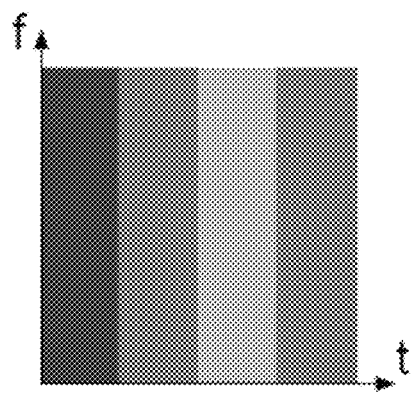
(c)
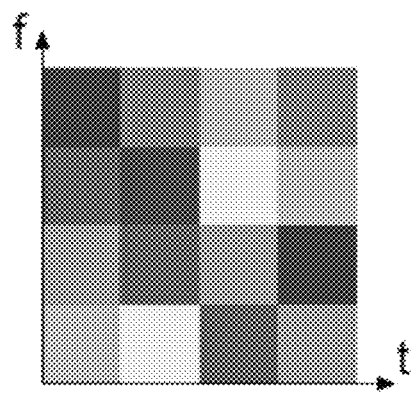
(d)
FIG. 1

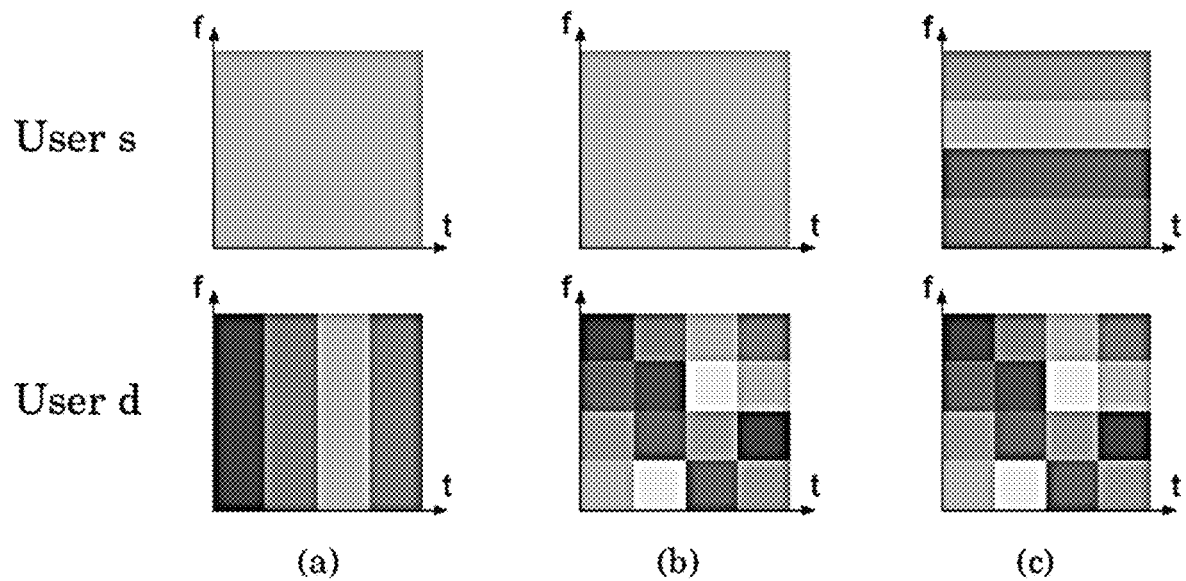
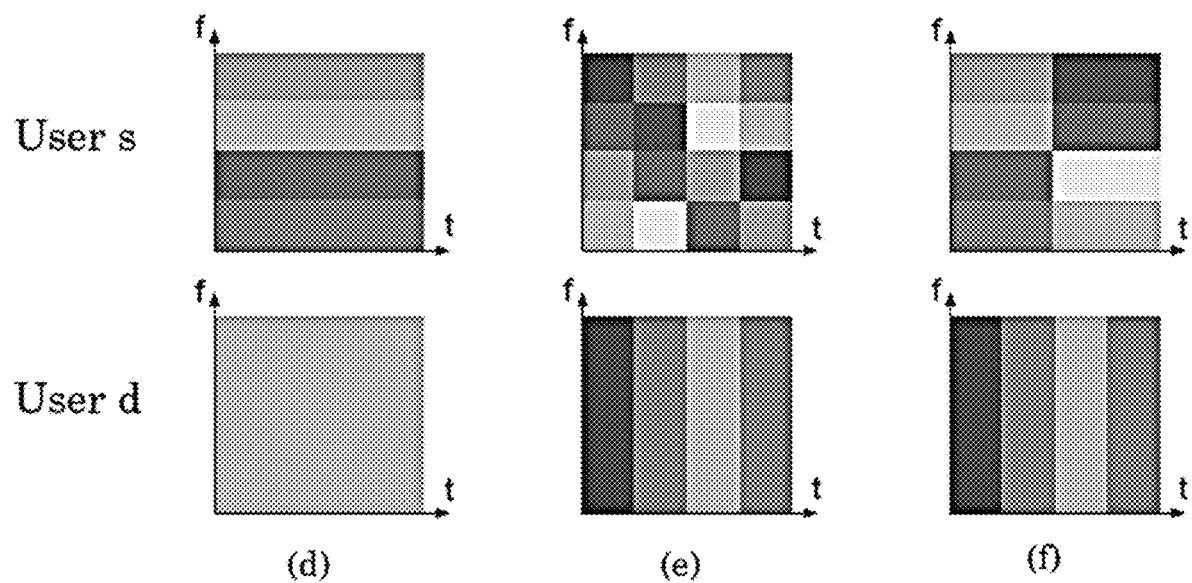
FIG. 2

| Coherence Times | Degrees of freedom |
|---|---|
| Identical: $T_k = T$, $\forall k$ | $\sum_{k=1}^{K} \frac{d_k}{N_k^*\left(1-\frac{N_k^*}{T}\right)} \leq 1$ |
| Integer ratios: $\frac{T_k}{T_{k-1}} \in \mathbb{Z}$, $T_k \in \mathbb{N}$ | Inner bound 1: $d_j = \begin{cases} N_j^*\left(1 - \frac{N_j^*}{T_j} - \frac{\min\{M, N_{j_{\max}}, T_j\} - N_j^*}{T_{j+1}}\right), & j = j_{\min} \\ N_{j_{\min}}^* \min\{M, N_j, T_{j_{\min}}\}\left(\frac{1}{T_{j-1}} - \frac{1}{T_j}\right), & j \neq j_{\min} \end{cases}$<br>Inner bound 2: $d_j = \begin{cases} N_j^*\left(1 - \frac{N_j^*}{T_j}\right), & j = j_{\min} \\ N_{j_{\min}}^* \min\{N_{j_{\min}}, N_j^*\}\left(\frac{1}{T_{j-1}} - \frac{1}{T_j}\right), & j \neq j_{\min} \end{cases}$<br>where $j \in J \subseteq [1:K]$<br>Outer bound: $\sum_{j \in J} \frac{d_j}{N_j^*\left(1 - \frac{N_j^*}{T_{j_{\max}}}\right)} \leq 1$, $\forall J \subseteq [1:K]$<br>Cases of tightness: 1) $M \leq \min_j N_j$<br>2) $N = N_j$, $\forall j$<br>3) $T_j \gg T_1$, $j = 2, \ldots, K$<br>4) $T_1 = T$, $T_j \geq 2\max\{M, N_j\}$ |
| Arbitrary ratios: $T_k \in \mathbb{R}$, $\forall k$ | Inner bound: $d_j = \begin{cases} N_j^*\left(1 - \frac{N_j^*}{T_j}\right), & j = j_{\min} \\ N_{j_{\min}}^* \min\{N_{j_{\min}}, N_j^*\}\left(\frac{1}{T_{j-1}} - \frac{1}{T_j}\right), & j \neq j_{\min} \end{cases}$<br>where $j \in J \subseteq [1:K]$ |

FIG. 11

| Coherence Times | Degrees of freedom |
|---|---|
| Identical: $T_k = T$, $\forall k$ | Inner bound: $d_j = M'_j \left(1 - \frac{\sum_{i \in J} M'_i}{T}\right)$, $j \in J \subseteq [1:K]$<br><br>Outer bound: $\sum_{j \in J} d_j \leq \min\left\{N, \sum_{j \in J} M_j\right\} \left(1 - \frac{\min\{N, \sum_{j \in J} M_j\}}{T}\right)$, $\forall J \subseteq [1:K]$<br><br>Inner bound is tight against sum degrees of freedom |
| Integer ratio: $\frac{T_k}{T_{k-1}} \in \mathbb{Z}$, $\forall k$ | Inner bound: $d_j = M'_j \sum_{m=1}^{J} \left(T_{i_j} - \sum_{n=1}^{m} M'_{i_n}\right) \left(\frac{1}{T_{i_m}} - \frac{1}{T_{i_{m+1}}}\right)$<br><br>Outer bound: $\sum_{j \in J} d_j \leq \min\left\{N, \sum_{j \in J} M_j\right\} \left(1 - \frac{\min\{N, \sum_{j \in J} M_j\}}{T_{i_J}}\right)$<br><br>where $J = \{i_1, \cdots, i_J\} \subseteq [1:K]$ |

FIG. 12

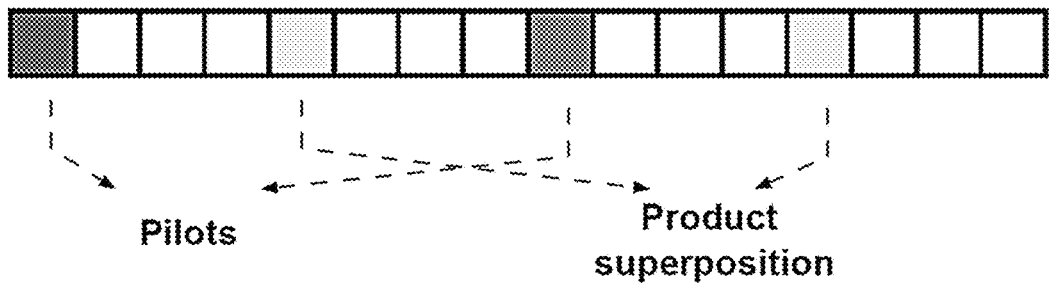
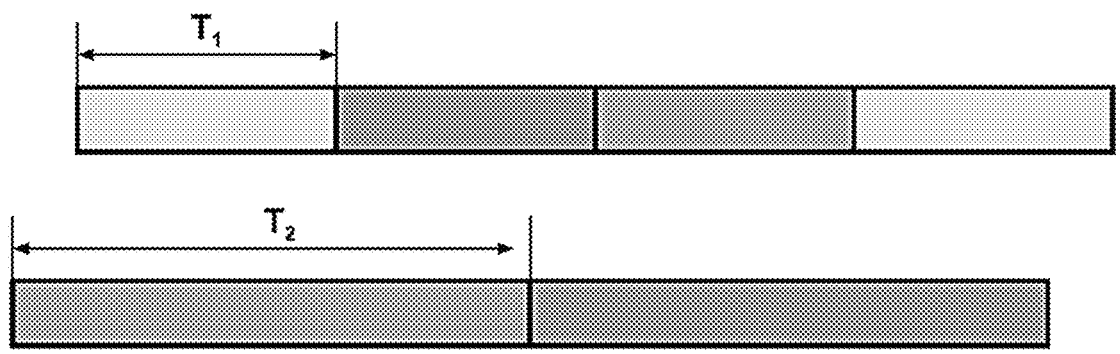
FIG. 18
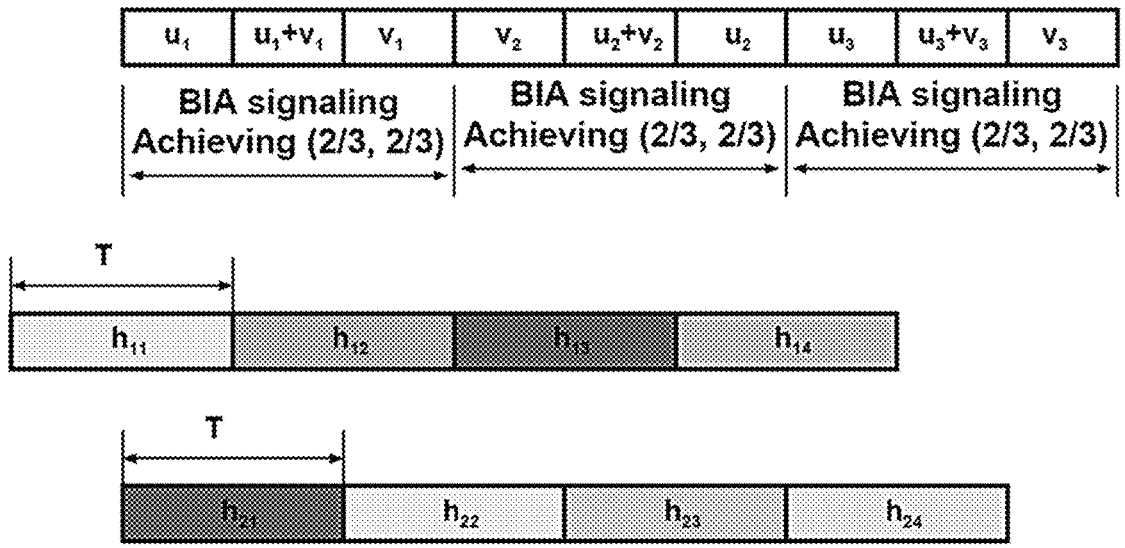
FIG. 19

COHERENCE DIVERSITY IN FREQUENCY AND TIME

CROSS REFERENCE TO RELATED APPLICATIONS

This application claims priority to, and the benefit of, U.S. provisional application entitled "Coherence Diversity in Frequency and Time" having Ser. No. 62/443,153, filed Jan. 6, 2017, which is hereby incorporated by reference in its entirety.

STATEMENT REGARDING FEDERALLY SPONSORED RESEARCH OR DEVELOPMENT

This invention was made with government support under CCF1219065 and CCF1527598 awarded by the National Science Foundation. The government has certain rights in the invention.

BACKGROUND

In practical wireless networks, fading of various links does not transition in lock step and may not have exactly the same frequency selectivity. Variations in node mobility and scattering environment may easily produce unequal link coherence times. Individual links in a wireless network can experience non-identical coherence time and bandwidth due to the differences in mobility or local scattering, a practical scenario where the fundamental limits of communication have been mostly unknown. But most investigations either ignore the differences in coherence qualities of the links in a network or handle it as a nuisance via worst case analysis.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1 provides graphical illustrations of examples of wireless fading conditions, in accordance with various embodiments of the present disclosure.

FIG. 2 provides graphical illustrations of examples of disparity cases between two users, in accordance with various embodiments of the present disclosure.

FIGS. 11 and 12 are tables illustrating degrees of freedom of block-fading broadcast channel with no CSI and degrees of freedom of block-fading multiple access channel with no CSI, respectively, in accordance with various embodiments of the present disclosure.

FIG. 18 graphically illustrates product superposition transmission for unaligned coherence times, in accordance with various embodiments of the present disclosure.

FIG. 19 graphically illustrates blind interference alignment for staggered coherence times with CSIR, in accordance with various embodiments of the present disclosure.

DETAILED DESCRIPTION

Figure 3:
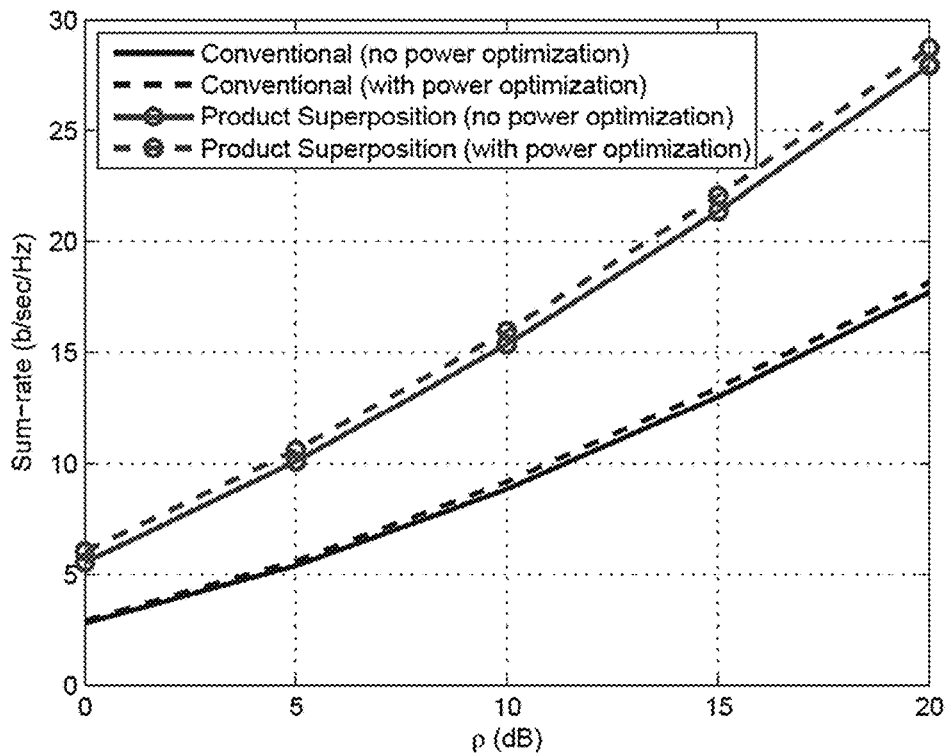
FIGS. 3 and 4 are plots illustrating comparisons of sum rate vs. signal-to-noise ratio (SNR), in accordance with various embodiments of the present disclosure.

Disclosed herein are various embodiments of methods related to coherency diversity. Wireless nodes can experience non-identical coherence time and bandwidth due to different node mobility and differences in local scattering. This can lead to a new source of gains in wireless networks entitled coherence diversity, which is made possible by leveraging the differences between coherence qualities of the links in the same network. This disclosure analyzes coherence diversity in a wide set of scenarios. Two wireless nodes experiencing downlink fading that may be either slow or fast, and either flat or frequency selective, are considered. This disclosure explores the nature of coherence diversity and the magnitude of gains whenever the dynamic conditions of two downlink channels are not identical. The initial analysis is organized into three parts: when the disparity is in coherence time, in coherence bandwidth, and in both coherence time and coherence bandwidth. For each disparity scenario, a version of product superposition transmission scheme is highlighted and analyzed, demonstrating the gains in achievable rates. Numerical simulations are presented that shed light on the behavior of coherence diversity and the advantages of the disclosed schemes. Reference will now be made in detail to the description of the embodiments as illustrated in the drawings, wherein like reference numbers indicate like parts throughout the several views.

Coherence Diversity for Two-User Broadcast Channel

I. Introduction

Variation in coherence time and coherence bandwidth can produce opportunities that are reminiscent of, but quite distinct from, other forms of diversity like multiuser diversity, and spatial diversity; this new phenomenon is called coherence diversity. Unlike multiuser diversity (SNR gains), coherence diversity improves the degrees of freedom (multiplexing gain). Unlike spatial diversity, coherence diversity does not necessarily require multiple antennas.

The genesis of coherence diversity goes back to the following: in broadcasting to a pair of users, one time-selective and one static, it is possible to allow the time-selective user to occupy all the degrees of freedom of its link and still to insert a signal meant for the static user in a manner that it produces no interference on the time-selective user. This is made possible by product superposition, a method that allows the signal of the static user to "disappear" into the equivalent channel seen by the time-selective user. The main contribution of this disclosure is to extend the notion of coherence diversity to general conditions where either of the two users can be static, time-selective, frequency-selective, or doubly-selective, and show that in all the combinations where the two channels have non-identical dynamical characteristics, coherence diversity applies and leads to gains, and furthermore to highlight a methodology to capture those gains and characterize the magnitude of such gains.

Results were obtained in the framework of OFDM transmission with pilots. The manifestation of coherence diversity in this context is best explained in terms of channel-state information and pilots: in a multi-user OFDM system, pilots resources need to be designed to accommodate the faster user (in time or frequency), and are therefore wasted for user(s) that need fewer pilots. Product superposition allows some pilot resources (time/frequency) to be reused to send data to the users that do not need that pilot resource, without contaminating those same pilots for the users that indeed need that pilot.

First consider the case where the disparity of coherence times is large enough that the overhead of one of the users may be neglected for the purposes of analysis. This user, which is referred to as "static" (denoted by user s), may have a channel that is either flat or frequency-selective. A second user (denoted by user d) can be modeled that is both time-selective and frequency-selective. The system can be analyzed under a variety of pilot transmission schemes (pilots on all subcarriers vs. pilot interpolation), as well as channel estimation techniques (frequency domain versus time domain). In each case a version of product superposition is disclosed and analyzed, and its gains demonstrated.

Second, consider equal coherence time but unequal coherence bandwidth. Third, consider disparity in both coherence time and bandwidth. In each of these cases a version of product superposition is disclosed and analyzed. A visual representation of the channel types analyzed in this disclosure appears in FIGS. 1 and 2. FIG. 1 illustrates examples of wireless fading conditions for (a) no selectivity; (b) frequency selective; (c) time selective; and (d) doubly selective. FIG. 2 illustrates examples for disparity cases between two users. Case (a) demonstrates disparity in coherence time with no frequency selectivity. Cases (b) and (c) demonstrate disparity in coherence time. In case (b), user s has no selectivity in time or in frequency, whereas in case (c) user s has frequency selectivity. Cases (d) and (e) demonstrate disparity in coherence bandwidth, where both users have no selectivity in time in case (d), or the same level of time selectivity in case (e). Case (f) demonstrates disparity in both coherence time and coherence bandwidth.

The following notation is used throughout the disclosure: Upper (or lower) letters will be used for frequency-domain (of time domain) symbols; boldface letters will be used for matrices and column vectors. $A^H$, $A^{-1}$, $\det A$, and $\text{Tr}\{A\}$ will denote Hermitian (conjugate transpose), inverse, determinant, and trace, respectively, of matrix A, $\text{diag}\{a\}$ denotes a diagonal matrix whose entries consists of the elements of the vector a, $I_M$ denotes the M×M identity matrix, $0_{N \times M}$ denotes the N×M all-zero matrix, $1_N$ denotes the N all-one vector, and $A \otimes B$ denotes the Kronecker product of A and B. Furthermore, $\mathbb{C}^{N \times M}$ is the set of N×M complex matrices, $\mathbb{E}\{\cdot\}$ represents expectation, and log is taken to the base 2.

II. System Model

Consider an OFDM downlink transmission to two users where the transmitter (or a base station) is equipped with M antennas, the first user (denoted by user d) is equipped with $N_d$ antennas, and the second user (denoted by user s) is equipped with $N_s$ antennas. The users fading channels are modeled to be block fading where user d has $T_d$ coherence time, and $K_d$ coherence bandwidth, whereas user s has $T_s$ coherence time, and $K_s$ coherence bandwidth. The OFDM downlink transmission can be described by a two-dimensional lattice (a.k.a. resource block) in time and frequency, where each cell (a.k.a. resource element) in the resource block corresponds to one time slot and one subcarrier. For a resource block having T time slots and K subcarriers, define $Y_k \in \mathbb{C}^{N_d \times T}$ to be user d received signal at subcarrier k, hence, $$Y_k = \sqrt{\frac{\rho}{M}} H_k X_k + W_k, \qquad (1)$$

where $X_k \in \mathbb{C}^{M \times T}$ denotes the transmitted signal at subcarrier k with ρ transmitted power, i.e. $\mathbb{E}\{X_k X_k^H\} = MI_M$, and $W_k \in \mathbb{C}^{N_d \times T}$ denotes user d additive noise at subcarrier k. It is assumed that $W_k$ have zero-mean unit-variance independent complex-Gaussian entries, and hence, $\mathbb{E}\{X_k X_k^H\} = MI_{N_d}$. Furthermore, $H_k \in \mathbb{C}^{N_d \times M}$ represents the channel frequency response between the transmitter and user d at subcarrier k, i.e., $H_k = F_{k,d} h$, where $$\mathbb{E}\{H_k H_k^H\} = MF_{k,d} F_{k,d}^H = M\|f_{k,d}\|^2 I_{N_d}, \qquad (2)$$

and furthermore, $h_{n,m}$ stays constant during $T_d$ time slots.

Furthermore, within the resource block, $Z_k \in \mathbb{C}^{N_s \times T}$ is defined to be user s received signal at subcarrier k, hence, $$Z_k = \sqrt{\frac{\rho}{M}} D_k X_k + \Xi_k, \qquad (3)$$

where $D_k \in \mathbb{C}^{N_s \times M}$ represents the channel frequency response between the transmitter and user s at subcarrier k, i.e., $D_k = F_{k,s} d$, where $$F_{k,s} = I_{N_s} \otimes f_{k,s}^H,$$

$$d = \begin{bmatrix} d_{1,1} & \cdots & d_{1,M} \\ \vdots & \ddots & \vdots \\ d_{N_s,1} & \cdots & d_{N_s,M} \end{bmatrix},$$

$f_{k,s} \in \mathbb{C}^{L_s \times 1}$ is the vector comprising the first $L_s$ elements of row k of the DFT matrix, $d_{n,m} \in \mathbb{C}^{L_s \times 1}$ is the user s channel impulse response vector between the transmit antenna m, and receive antenna n with $L_s$ zero-mean unit-variance independent complex-Gaussian taps, and hence, $$\mathbb{E}\{D_k D_k^H\} = M F_{k,s} F_{k,s}^H = M \|f_{k,s}\|^2 I_{N_s}, \tag{4}$$

and furthermore, $d_{n,m}$ stays constant during $T_s$ time slots. Furthermore, $\Xi_k \in \mathbb{C}^{N_s \times T}$ is user s additive noise at subcarrier k whose entries have zero-mean unit-variance independent complex-Gaussian distribution.

III. Disparity in Coherence Time

In this section, the downlink transmission for two users is examined with disparity in coherence time, i.e. $T_d \neq T_s$, but equality in coherence bandwidth, i.e., $K_s = K_d$. Consider the case when $T_s \gg T_d$, i.e., the channel of users stays constant over very long interval of time compared the interval of user d channel. Hence, the cost of sending pilots to estimate the channel of user s can be ignored, and hence, user s channel is assumed to be known at user s whereas user d channel is assumed to be unknown at any node. Throughout this section, the channels of the two users have the same number of taps (i.e. $L_d = L_s = L$). The channel of user s stays the same over a long interval of time. Hence, the selectivity of user s across frequency does not change the analysis and the results of this section.

A. Flat Fading Channel (L=1)

The case of flat-fading channel with disparity in coherence time was examined where product superposition transmission can be used to provide gain for the system rate compared to the conventional transmission. In the sequel, the product superposition transmission that was considered is expressed. The same notation in Section II is followed after removing the subscript k, since the channel here is flat fading. Consider the transmission time is the user d coherence time, i.e. $T = T_d$. The transmitted signal of the product superposition scheme is $$X = [\sqrt{M} V, VU], \tag{5}$$

where $V \in \mathbb{C}^{M \times M}$ is a user s data matrix whose elements are i.i.d. complex Gaussian with zero mean and 1/M variance, and $U \in \mathbb{C}^{M \times (T_d - M)}$ is the user d data matrix whose elements are i.i.d. complex Gaussian with zero mean and unit variance. Therefore the signal received at user d, during $T_d$ time slots, is $$Y = H\left[\sqrt{\rho_T} V, \sqrt{\frac{\rho_\delta}{M}} VU\right] + W \tag{6}$$

where $\rho_\tau$, and $\rho_\delta$ denote the SNR of the pilot signal, and the data transmission, respectively. Define G=HV to be the user d equivalent channel, and hence, $$Y = H\left[\sqrt{\rho_T} G, \sqrt{\frac{\rho_\delta}{M}} GU\right] + W. \tag{7}$$

Therefore, user d can estimate its equivalent channel G during the first M time slots and then decodes U coherently based on the channel estimate. Thus user d can achieve the rate $$R_d \geq \left(1 - \frac{M}{T_d}\right) \mathbb{E}\{\log\det I_{N_d} + \rho'_\delta \hat{G}\hat{G}^H\}, \tag{8}$$

where $\hat{G}$ is the estimated equivalent channel, and $$\rho'_\delta = \frac{\rho_\tau \rho_\delta M^2}{1 + \rho_\tau M + \rho_\delta N_d M}. \tag{9}$$

On the other hand, user s received signal during the first M time slots is $$Z^{(p)} = \sqrt{\rho_\tau} DV + \Xi^{(p)}, \tag{10}$$

where $Z^{(p)} \in \mathbb{C}^{N_s \times M}$ is the corresponding additive Gaussian noise. Having a very long coherence time, user s knows its channel D, hence, it can decode its signal V. As a result, user s can achieve the rate, $$R_s \geq \frac{M}{T_d} \mathbb{E}\{\log\det I_{N_s} + \rho_\tau DD^H\}. \tag{11}$$

Furthermore, user s can achieve higher rates as follows. User s can first estimate the product DV during the first M time slots, and then decode U during the following $T_d - M$ time slots. Canceling the interference caused by U, user s can decode V using the power sent through the entire transmission time. As a result, user s can achieve the rate, $$R_s \geq \frac{M}{T_d} \mathbb{E}\left\{\log\det I_{N_s} + \frac{1}{\mathbb{E}\{\lambda_i^{-2}\}} DD^H\right\}, \tag{12}$$

where $\lambda_i^{-2}$ is being any of the unordered eigenvalues of $\tilde{U}\tilde{U}^H$, $\tilde{U} = [\rho_\tau I, \rho_\delta UU^H]$.

Thus, user s can achieve a nonzero rate "for free" in the sense that user d achieves approximately the same rate as in the single user scenario. Therefore, product superposition can provide gain over the conventional transmission, $$R_d \geq \left(1 - \frac{M}{T_d}\right) \mathbb{E}\{\log\det I_{N_d} + \rho'_\delta \hat{H}\hat{H}^H\}, \tag{13}$$

where $\hat{H}$ is the estimated channel of user d. The difference between the above rate, and that in Eq. (8) is the expectation, since the former is with respect to $\hat{H}$, and the later is with respect to $\hat{G}$.

B. Frequency Selective Channel (L≥1)

Conventional OFDM Downlink Transmission:

For completeness, start by giving the downlink OFDM transmission for user d providing the estimated channel, the estimation error, and the achievable rate when the channel frequency response is estimated (frequency-domain channel estimation). Consider a resource block within $T_d$ time slots, and $K_d$ subcarriers. For estimating the channel at subcarrier $k=\{1, \ldots, K_d\}$, pilot signals are sent during the first M resource elements at the subcarrier k so that the receiver can estimate the channel corresponding to the M transmission antennas. The transmission signal at subcarrier $k=1, \ldots, K_d$ is $$X_k = [\sqrt{M} I_M, U_k], \quad (14)$$

Hence, the received signal during $T_d$ time slots is $$Y_k = \left[\sqrt{\rho_{\tau,k}} H_k, \sqrt{\frac{\rho_{d,k}}{M}} H_k U_k\right] + W_k. \quad (15)$$

Hence, the minimum mean square error (MMSE) estimate of the user d channel at the subcarrier k is $$\hat{H}_k = \Sigma_{HY,k} \Sigma_{Y,k}^{-1} (\sqrt{\rho_{\tau,k}} H_k + W_k^{(p)}), \quad (16)$$

where $W_k^{(p)} \in \mathbb{C}^{N_d \times M}$ is the additive noise during the first M time slots of the subcarrier k, and furthermore, $$\sum_{HY,k} = \mathbb{E}\left\{H_k Y_k^{(p)H}\right\} = M\sqrt{\rho_{\tau,k}} \|f_{k,d}\|^2 I_{N_d}, \quad (17)$$

$$\sum_{Y,k} = \mathbb{E}\left\{Y_k^{(p)} Y_k^{(p)H}\right\} = (M\rho_{\tau,k} \|f_{k,d}\|^2 + M) I_{N_d}.$$

Hence, $$\hat{H}_k = \gamma_{\tau,kd} H_k + \frac{\gamma_{\tau,kd}}{\sqrt{\rho_{\tau,k}}} W_k^{(p)}, \quad (18)$$

where $$\gamma_{\tau,kd} = \frac{\rho_{\tau,k} \|f_{k,d}\|^2}{\rho_{\tau,k} \|f_{k,d}\|^2 + 1}. \quad (19)$$

The covariance matrix of the estimated channel can be given by, $$\sum_{\hat{H},k} = \mathbb{E}\{\hat{H}_k \hat{H}_k^H\} = M\left(\gamma_{\tau,kd}^2 \|f_{k,d}\|^2 + \frac{\gamma_{\tau,kd}^2}{\rho_{\tau,k}}\right) I_{N_d}, \quad (20)$$

and furthermore, define $$\sigma_{\hat{H},k}^2 = \frac{1}{N_d M} Tr\left\{\sum_{\hat{H},k}\right\} = \gamma_{\tau,k}^2 \|f_k\|^2 + \frac{\gamma_{\tau,k}^2}{\rho_{\tau,k}} = \gamma_{\tau,k} \|f_{k,d}\|^2. \quad (21)$$

Therefore, the user d channel estimation error is $$\tilde{H}_k = H_k - \hat{H}_k = (1 - \gamma_{\tau,kd}) H_k - \frac{\gamma_{\tau,kd}}{\sqrt{\rho_{\tau,k}}} W_k^{(p)}, \quad (22)$$

and furthermore, the estimation error covariance matrix is $$\Sigma_{\tilde{H},k} = \mathbb{E}\{\tilde{H}_k \tilde{H}_k^H\} \quad (23)$$

$$= M\|f_{k,d}\|^2 (1 - \gamma_{\tau,k})^2 I_{N_d} + M \frac{\gamma_{\tau,kd}^2}{\rho_{\tau,k}} I_{N_d}$$

$$= \frac{M \gamma_{\tau,kd}}{\rho_{\tau,k}} I_{N_d}.$$

Hence, the normalized MMSE of the user d channel estimation can be written as $$\sigma_{\tilde{H},k}^2 = \frac{1}{MN_d} Tr\left\{\sum_{\tilde{H},k}\right\} = \frac{\gamma_{\tau,kd}}{\rho_{\tau,k}}. \quad (24)$$

After estimating the channel at subcarrier $k=\{1, \ldots, K_d\}$, user d can decode the transmitted data at the resource elements coherently. The received signal of user d during data transmission in the resource elements at subcarrier k is $$Y_k^{(d)} = \sqrt{\frac{\rho_{d,k}}{M}} H_k U_k + W_k^{(d)}, \quad (25)$$

where $W_k^{(d)} \in \mathbb{C}^{N_d \times (T_d - M)}$ is the corresponding noise. From Eq. (22), $$Y_k^{(d)} = \sqrt{\frac{\rho_{d,k}}{M}} \hat{H}_k U_k + \sqrt{\frac{\rho_{d,k}}{M}} \tilde{H}_k U_k + W_k^{(d)}. \quad (26)$$

Therefore, at subcarrier k, user d can achieve the rate $$R_{d,k} = \quad (27)$$

$$I(U_k; Y_k^{(d)} | \hat{H}_k) \geq \frac{T_d - M}{T_d} \mathbb{E}\left\{\log\det I_{N_d} + \frac{\rho_{d,k}}{1 + \rho_{d,k} \sigma_{\tilde{H},k}^2} \frac{\hat{H}_k \hat{H}_k^H}{M}\right\},$$

where $\sigma_{\tilde{H},k}^2$ is given in (24). By defining the normalized estimated channel $$\check{H}_k = \frac{\hat{H}_k}{\sigma_{\hat{H},k}}, \quad (28)$$

where $\sigma_{\hat{H},k}$ is defined in (21). Thus, the achievable rate of user d in $T_d$ time slots and $K_d$ subcarriers is $$R_d \geq \frac{T_d - M}{T_d K_d} \sum_{k=1}^{K} \mathbb{E}\left\{\text{logdet} I_{N_d} + \rho_{H,k} \frac{\tilde{H}_k \tilde{H}_k^H}{M}\right\}, \quad (29)$$

where $$\rho_{H,k} = \frac{\rho_{d,k} \sigma_{\tilde{H},k}^2}{1 + \rho_{d,k} \sigma_{\tilde{H},k}^2}. \quad (30)$$

According to the power optimization provided below, user d can be maximized when the values for $\rho_{d,k}$, and $\rho_{\tau,k}$ are $$\rho_{d,k} = (1 - \alpha_k)\rho \frac{T_d}{T_\delta}, \; \rho_{\tau,k} = \alpha_k \rho \frac{T_d}{T_\tau}, \quad (31)$$

where $T_\delta = T_d - M$, $T_\tau = M$, and $$\alpha_k = -\ell + \sqrt{\ell(\ell + 1)}, \quad (32)$$

$$\ell = \frac{T_\delta T_\tau + \rho T_d T_\tau \|f_{k,d}\|^2}{T_\delta \rho T_d \|f_{k,d}\|^2 \left(1 - \frac{T_\tau}{T_\delta}\right)}.$$

Power Optimization of $\rho_{\tau,k}$, and $\rho_{d,k}$:

The optimal values of $\rho_{\tau,k}$ and $\rho_{d,k}$ can be found so that the value of $\rho_{H,k}$ is maximized, which in turn maximizes the user d achievable rate in Eq. (29). From the law of conservation of energy, $$\rho_{d,k} T_\delta + \rho_{\tau,k} T_\tau = \rho T, \quad (33)$$

and hence, $$\rho_{d,k} T_\delta = (1 - \alpha_k)\rho T, \rho_{\tau,k} T_\tau = \alpha_k \rho T, \quad (34)$$

where $\alpha_k \in [0,1]$ is the power allocation factor. Therefore, $$\rho_{H,k} = \frac{\rho_{d,k} \alpha_k \|f_{k,d}\|^2}{1 + \rho_{d,k} \frac{\gamma_k}{\rho_{\tau,k}}} \quad (35)$$

$$= \frac{\alpha_k(1 - \alpha_k) \frac{(\rho T)^2}{T_\tau T_\delta} \|f_{k,d}\|^4}{1 + \alpha_k \frac{\rho T}{T_\tau} \|f_{k,d}\|^2 + (1 - \alpha_k) \frac{\rho T}{T_\delta} \|f_{k,d}\|^2}$$

$$= \frac{\rho T \|f_{k,d}\|^2}{(T_\delta - T_\tau)} \frac{\alpha_k(1 - \alpha_k)}{\alpha_k + \ell},$$

where $$\ell = \frac{T_\delta T_\tau + \rho T T_\tau \|f_{k,d}\|^2}{T_\delta \rho T \|f_{k,d}\|^2 \left(1 - \frac{T_\tau}{T_\delta}\right)}. \quad (36)$$

By taking the first and the second derivatives of $\rho_{H,k}$ with respect to $\alpha_k$, it is possible to obtain $$\frac{\partial \rho_{H,k}}{\partial \alpha_k} = \frac{\rho T}{T_\delta - T_\tau} \frac{(\alpha_k + \ell)(1 - 2\alpha) - \alpha_k(1 - \alpha_k)}{(\alpha_k + \ell)^2}, \quad (37)$$

and hence, $$\frac{\partial^2 \rho_{H,k}}{\partial \alpha_k^2} = \frac{\rho T}{(T_\delta - T_\tau)(\alpha_k + \ell)^4} \quad (38)$$

$$(-2(\alpha_k + \ell)^3 - 2(\alpha_k + \ell)((\alpha_k + \ell)(1 - 2\alpha_k) - \alpha_k(1 - \alpha_k)))$$

$$= \frac{-2\rho T}{(T_\delta - T_\tau)(\alpha_k + \ell)^3}((\alpha_k + \ell)^2 - \alpha_k^2 - 2\alpha_k \ell + \ell)$$

$$= \frac{-2\rho T(\ell + \ell^2)}{(T_\delta - T_\tau)(\alpha_k + \ell)^3},$$

which shows the concavity of $\rho_{H,k}$. Therefore, from the KKT conditions, i.e.

$$\frac{\partial \rho_{H,k}}{\partial \alpha_k} = 0,$$

and hence, the optimal $\alpha_k$ is given by $$\alpha_k = -\ell + \sqrt{\ell(\ell+1)}. \quad (39)$$

Product Superposition OFDM Scheme:

In the following, the product superposition transmission can be given when frequency-domain channel estimation is used, and the product superposition gain calculated over the conventional transmission. The transmitted signal at subcarrier $k = \{1, \ldots, K_d\}$ can be $$X_k = [\sqrt{M} V_k, V_k U_k], \quad (40)$$

where $V_k \in \mathbb{C}^{M \times M}$ is the user s signal, with $\mathbb{E}\{V_k V_k^H\} = I_M$, and $U_k \in \mathbb{C}^{M \times T_d - M}$ is the user d signal, with $\mathbb{E}\{U_k U_k^H\} = M I_M$. Hence, the user d received signal at subcarrier k during the first M resource elements is $$Y_k^{(\rho)} = \sqrt{\rho_{\tau,k}} H_k V_k + W_k^{(\rho)} \quad (41)$$

$$= \sqrt{\rho_{\tau,k}} G_k + W_k^{(p)},$$

where $G_k = H_k V_k$ is the user d equivalent channel which can be estimated during the first M resource elements. Following the same analysis as presented in Section III-B, the MMSE equivalent channel estimate can be given by $$\hat{G}_k = \gamma_{\tau,kd} G_k + \frac{\gamma_{\tau,kd}}{\sqrt{\rho_{\tau,k}}} W_k^{(p)}, \quad (42)$$

where $\gamma_{\tau,kd}$ is given in Eq. (19). Furthermore, $$\sum_{\hat{G},k} = \mathbb{E}\{\hat{G}_k \hat{G}_k^H\} = M\left(\gamma_{\tau,kd}^2 \|f_{k,d}\|^2 + \frac{\gamma_{\tau,kd}^2}{\rho_{\tau,k}}\right) I_{N_d}, \quad (43)$$

and $$\sigma_{\hat{G},k}^2 = \frac{1}{N_d M} Tr\left\{\sum_{\hat{G},k}\right\} = \gamma_{\tau,kd} \|f_{k,d}\|^2. \quad (44)$$

Therefore, the user d equivalent channel estimation error is $$\tilde{G}_k = G_k - \hat{G}_k = (1 - \gamma_{\tau,kd})G_k - \frac{\gamma_{\tau,kd}}{\sqrt{\rho_{\tau,k}}} W_k^{(p)}, \quad (45)$$

and furthermore, the estimation error covariance matrix is $$\sum_{\tilde{G},k} = \mathbb{E}\{\tilde{G}_k \tilde{G}_k^H\} = \frac{M\gamma_{\tau,kd}}{\rho_{\tau,k}} I_{N_d}. \quad (46)$$

Hence, the normalized MMSE of user d channel estimation can be written as $$\sigma_{\tilde{G},k}^2 = \frac{1}{MN_d} Tr\left\{\sum_{\tilde{G},k}\right\} = \frac{\gamma_{\tau,kd}}{\rho_{\tau,k}}. \quad (47)$$

After estimating the equivalent channel during the first M resource elements, the user d signal can be sent during the remaining $T_d - M$ resource elements of subcarrier k. The received signal of user d at subcarrier k is $$Y_k^{(d)} = \sqrt{\frac{\rho_{d,k}}{M}} G_k U_k^{(d)} + W_k^{(d)}, \quad (48)$$

$$= \sqrt{\frac{\rho_{d,k}}{M}} \hat{G}_k U_k^{(d)} + \sqrt{\frac{\rho_{d,k}}{M}} \tilde{G}_k U_k^{(d)} + W_k^{(d)}.$$

Therefore, at subcarrier k, user d can achieve the rate $$R_{d,k} = I(U_k^{(d)}; Y_k^{(d)} | \hat{G}_k) \quad (49)$$

$$\geq \frac{T_d - M}{T_d} \mathbb{E}\left\{\log\det I_{N_d} + \frac{\rho_{d,k}}{1 + \rho_{d,k}\sigma_{\tilde{G},k}^2} \frac{\hat{G}_k \hat{G}_k^H}{M}\right\},$$

and hence, for $K_d$ subcarriers, and $T_d$ time slots, user d can achieve the rate $$R_d \geq \frac{T_d - M}{T_d K_d} \sum_{k=1}^{K} \mathbb{E}\left\{\log\det I_{N_d} + \rho_{G,k} \frac{\bar{G}_k \bar{G}_k^H}{M}\right\}, \quad (50)$$

where $\bar{G}_k = \frac{\hat{G}_k}{\sigma_{\tilde{G},k}}$, and $$\rho_{G,k} = \frac{\rho_{d,k}\sigma_{\tilde{G},k}^2}{1 + \rho_{d,k}\sigma_{\tilde{G},k}^2}. \quad (51)$$

Also the value of optimal power allocation $\rho_{d,k}$, and $\rho_{\tau,k}$ in Eq. (31) can be used to maximize the user d product superposition rate in Eq. (50).

Furthermore, during the first M resource elements at subcarrier $k=\{1, \ldots, K_d\}$, the user s received signal is $$Z_k^{(p)} = \sqrt{\rho_{\tau,k}} D_k V_k + \Xi_k^{(p)}, \quad (52)$$

where $\Xi_k^{(p)} \in \mathbb{C}^{N_s \times M}$ is the corresponding additive Gaussian noise. Knowing its channel, user s, for $K_d$ subcarriers and $T_d$ time slots, can achieve the rate $$R_s \geq \frac{M}{T_d K_d} \sum_{k=1}^{K} \mathbb{E}\left\{\log\det I_{N_s} + \frac{1}{\mathbb{E}\{\lambda_i^{-2}\}} D_k D_k^H\right\}, \quad (53)$$

where $\lambda_i^{-2}$ can be any of the unordered eigenvalues of $U_k U_k^H$, $U_k = [\rho_\tau I, \rho_\delta U_k U_k^H]$.

Thus user s can achieve "for free" rate in Eq. (53) where user d achieves "approximately" the interference-free rate in Eq. (50) providing higher gain over the conventional transmission achievable rate in Eq. (29).

C. Channel Estimation with Interpolation

In frequency-response channel estimation, other than sending pilots at each subcarrier, pilots can be sent at some subcarriers and the receiver can use interpolation to estimate the channel at the other subcarriers exploiting the correlation of the channel across subcarriers. In the following, start by giving the achievable rate for conventional transmission, and proceed to give the system achievable rate obtained by the product superposition transmission.

Define the set of subcarriers containing pilots to be $\{k_1, k_2\}$, and furthermore, $A_k \in \mathbb{C}^{N_d \times 2N_d}$ to be the user d channel estimation interpolation matrix at subcarriers $k=\{1, \ldots, K_d\}$. Thus, the estimated channel at subcarrier k is $$\hat{H}_k = A_k \begin{bmatrix} \hat{H}_{k_1} \\ \hat{H}_{k_2} \end{bmatrix}, \quad (54)$$

where $\hat{H}_{k_1}$ and $\hat{H}_{k_2}$ are the MMSE channel estimates at the subcarriers $k_1$, and $k_2$, respectively, and are given in Eq. (18). Hence, $$\hat{H}_k = A_k \begin{bmatrix} \gamma_{\tau,k_1} H_{k_1} \\ \gamma_{\tau,k_2} H_{k_2} \end{bmatrix} + A_k \begin{bmatrix} \frac{\gamma_{\tau,k_1}}{\sqrt{\rho_{\tau,k_1}}} W_{k_1}^{(p)} \\ \frac{\gamma_{\tau,k_2}}{\sqrt{\rho_{\tau,k_2}}} W_{k_2}^{(p)} \end{bmatrix}. \quad (55)$$

Therefore, the estimation covariance matrix can be given by $$\sum_{\hat{H},k} = MA_k \left( \begin{bmatrix} \gamma_{\tau,k_1} F_{k_1} \\ \gamma_{\tau,k_2} F_{k_2} \end{bmatrix} \begin{bmatrix} \gamma_{\tau,k_1} F_{k_1} \\ \gamma_{\tau,k_2} F_{k_2} \end{bmatrix}^H + \begin{bmatrix} \frac{\gamma_{\tau,k_1}^2}{\rho_{\tau,k_1}} I & 0 \\ 0 & \frac{\gamma_{\tau,k_2}^2}{\rho_{\tau,k_2}} I \end{bmatrix} \right) A_k^H, \quad (56)$$

and $$\sigma_{\hat{H},k}^2 = \frac{1}{N_d M} Tr\left\{\sum_{\hat{H},k}\right\}. \quad (57)$$

Furthermore, the estimation error is $$\tilde{H}_k = \left(F_k - A_k \begin{bmatrix} \gamma_{\tau,k_1} F_{k_1} \\ \gamma_{\tau,k_2} F_{k_2} \end{bmatrix}\right) h - A_k \begin{bmatrix} \frac{\gamma_{\tau,k_1}}{\sqrt{\rho_{\tau,k_1}}} W_{k_1}^{(p)} \\ \frac{\gamma_{\tau,k_2}}{\sqrt{\rho_{\tau,k_2}}} W_{k_2}^{(p)} \end{bmatrix}. \quad (58)$$

The channel taps are uncorrelated, i.e. $\mathbb{E}\{hh^H\} = MI_{N_d}$, and hence, the error covariance matrix is $$\sum_{\tilde{H},k} = M\left(F_k - A_k \begin{bmatrix} \gamma_{\tau,k_1} F_{k_1} \\ \gamma_{\tau,k_2} F_{k_2} \end{bmatrix}\right)\left(F_k - A_k \begin{bmatrix} \gamma_{\tau,k_1} F_{k_1} \\ \gamma_{\tau,k_2} F_{k_2} \end{bmatrix}\right)^H + \quad (59)$$

$$MA_k \begin{bmatrix} \frac{\gamma_{\tau,k_1}^2}{\rho_{\tau,k_1}} I & 0 \\ 0 & \frac{\gamma_{\tau,k_2}^2}{\rho_{\tau,k_2}} I \end{bmatrix} A_k^H.$$

Furthermore the normalized MMSE is $$\sigma_{\tilde{H},k}^2 = \frac{1}{N_d M} Tr\left\{\sum_{\tilde{H},k}\right\}. \quad (60)$$

Therefore, for $K_d$ subcarriers and $T_d$ time slots, user d can achieve the rate $$R_d \geq \frac{T_d - M}{T_d K_d} \mathbb{E}\left\{\log\det I_{N_d} + \rho_{H,k_1} \frac{\tilde{H}_{k_1} \tilde{H}_{k_1}^H}{M}\right\} + \quad (61)$$

$$\frac{T_d - M}{T_d K_d} \mathbb{E}\left\{\log\det I_{N_d} + \rho_{H,k_2} \frac{\tilde{H}_{k_2} \tilde{H}_{k_2}^H}{M}\right\} +$$

$$\frac{1}{K_d} \sum_{k=1, k \notin \{k_1, k_2\}}^{K} \mathbb{E}\left\{\log\det I_{N_d} + \rho_{H,k} \frac{\tilde{H}_k \tilde{H}_k^H}{M}\right\},$$

where $\rho_{H,k}$ is given in Eq. (30) with $\sigma_{\tilde{H},k}^2$, and $\sigma_{\tilde{H},k}^2$ given in Eq. (57), and Eq. (60), respectively.

Now, the product superposition scheme can be given for the case of channel estimation with interpolation. Define $V_{k_1}$, and $V_{k_2}$ to be an independent users signal at the subcarriers $k_1$, and $k_2$, respectively. Hence, the transmitted signal at $k_1$ and $k_2$ subcarriers, respectively, are $$X_{k_1} = [\sqrt{M} V_{k_1}, V_{k_1} U_{k_1}],$$

$$X_{k_2} = [\sqrt{M} V_{k_2}, V_{k_2} U_{k_2}]. \quad (62)$$

At subcarrier $k = k_1, k_2$, during the $T_d$ time slots, the transmitted signal is $$X_k = V_k U_k, \quad (63)$$

with $U_k \in \mathbb{C}^{M \times T_d}$, and $$V_k = B_k \begin{bmatrix} V_{k_1} \\ V_{k_2} \end{bmatrix}, \quad (64)$$

where $B_k \in \mathbb{C}^{M \times 2M}$ is the user s signal interpolation matrix. Therefore, the user d estimated equivalent channel is $$\hat{G}_k = A_k \begin{bmatrix} \hat{G}_{k_1} \\ \hat{G}_{k_2} \end{bmatrix} \quad (65)$$

$$= \begin{bmatrix} \gamma_{\tau,k_1} G_{k_1} \\ \gamma_{\tau,k_2} G_{k_2} \end{bmatrix} + A_k \begin{bmatrix} \frac{\gamma_{\tau,k_1}}{\sqrt{\rho_{\tau,k_1}}} W_{k_1}^{(p)} \\ \frac{\gamma_{\tau,k_2}}{\sqrt{\rho_{\tau,k_2}}} W_{k_2}^{(p)} \end{bmatrix},$$

and hence, the user d estimation covariance matrix is $$\sum_{\hat{G},k} = \mathbb{E}\{\hat{G}_k \hat{G}_k^H\} \quad (66)$$

$$= A_k \left(\begin{bmatrix} \gamma_{\tau,k_1}^2 \mathbb{E}\{G_{k_1} G_{k_1}^H\} & 0 \\ 0 & \gamma_{\tau,k_2}^2 \mathbb{E}\{G_{k_2} G_{k_2}^H\} \end{bmatrix} + \begin{bmatrix} \frac{\gamma_{\tau,k_1}^2}{\rho_{\tau,k_1}} I & 0 \\ 0 & \frac{\gamma_{\tau,k_2}^2}{\rho_{\tau,k_2}} I \end{bmatrix}\right) A_k^H,$$

$$= MA_k \left(\begin{bmatrix} \gamma_{\tau,k_1}^2 \|f_{k_1}\|^2 & 0 \\ 0 & \gamma_{\tau,k_2}^2 \|f_{k_2}\|^2 \end{bmatrix} + \begin{bmatrix} \frac{\gamma_{\tau,k_1}^2}{\rho_{\tau,k_1}} I & 0 \\ 0 & \frac{\gamma_{\tau,k_2}^2}{\rho_{\tau,k_2}} I \end{bmatrix}\right) A_k^H,$$

and furthermore, $$\sigma_{\hat{G},k}^2 = \frac{1}{N_d M} Tr\left\{\sum_{\hat{G},k}\right\}. \quad (67)$$

Therefore, the user d estimation error at subcarrier k is $$\tilde{G}_k = G_k - \hat{G}_k \quad (68)$$

$$= H_k B_k \begin{bmatrix} V_{k_1} \\ V_{k_2} \end{bmatrix} - A_k \begin{bmatrix} \gamma_{\tau,k_1} H_{k_1} V_{k_1} \\ \gamma_{\tau,k_2} H_{k_2} V_{k_2} \end{bmatrix} - A_k \begin{bmatrix} \frac{\gamma_{\tau,k_1}}{\sqrt{\rho_{\tau,k_1}}} W_{k_1}^{(p)} \\ \frac{\gamma_{\tau,k_2}}{\sqrt{\rho_{\tau,k_2}}} W_{k_2}^{(p)} \end{bmatrix}$$

$$= \left(H_k B_k - A_k \begin{bmatrix} \gamma_{\tau,k_1} H_{k_1} & 0 \\ 0 & \gamma_{\tau,k_2} H_{k_2} \end{bmatrix}\right) \begin{bmatrix} V_{k_1} \\ V_{k_2} \end{bmatrix} - A_k \begin{bmatrix} \frac{\gamma_{\tau,k_1}}{\sqrt{\rho_{\tau,k_1}}} W_{k_1}^{(p)} \\ \frac{\gamma_{\tau,k_2}}{\sqrt{\rho_{\tau,k_2}}} W_{k_2}^{(p)} \end{bmatrix},$$

and hence, the error covariance matrix is $$\sum_{\tilde{G},k} = \mathbb{E}\left\{\left(H_k B_k - A_k \begin{bmatrix} \gamma_{\tau,k_1} H_{k_1} & 0 \\ 0 & \gamma_{\tau,k_2} H_{k_2} \end{bmatrix}\right)\right\} \quad (69)$$

-continued $$\left(H_k B_k - A_k \begin{bmatrix} \gamma_{\tau,k_1} H_{k_1} & 0 \\ 0 & \gamma_{\tau,k_2} H_{k_2} \end{bmatrix}\right)^H\right\} +$$

$$M A_k \begin{bmatrix} \frac{\gamma_{\tau,k_1}^2}{\rho_{\tau,k_1}} I & 0 \\ 0 & \frac{\gamma_{\tau,k_2}^2}{\rho_{\tau,k_2}} I \end{bmatrix} A_k^H,$$

and furthermore, $$\sigma_{\tilde{G},k}^2 = \frac{1}{N_d M} Tr\left\{\sum_{\tilde{G},k}\right\}. \tag{70}$$

Therefore, the achievable rates of the dynamic and the static users are $$R_d \geq \frac{T_d - M}{T_d K_d} \mathbb{E}\left\{\text{logdet} I_{N_d} + \rho_{G,k_1} \frac{\overline{G}_{k_1} \overline{G}_{k_1}^H}{M}\right\} + \tag{71}$$

$$\frac{T_d - M}{T_d K_d} \mathbb{E}\left\{\text{logdet} I_{N_d} + \rho_{G,k_2} \frac{\overline{G}_{k_2} \overline{G}_{k_2}^H}{M}\right\} +$$

$$\frac{1}{K_d} \sum_{k=1, k \notin \{k_1, k_2\}}^{K} \mathbb{E}\left\{\text{logdet} I_{N_d} + \rho_{G,k} \frac{\overline{G}_k \overline{G}_k^H}{M}\right\},$$

where $\rho_{G,k}$ is given in Eq. (51) with $\sigma_{\tilde{G},k}^2$, and $\sigma_{\tilde{G},k}^2$ given in Eq. (67), and Eq. (70),
respectively. user s decodes its signal sent on the subcarriers $k_1$ and $k_2$ obtaining the rate $$R_s \geq \frac{M}{T_d K_d} \sum_{k=\{k_1,k_2\}} \mathbb{E}\left(\text{logdet} I_{N_s} + \frac{1}{\mathbb{E}\{\lambda_i^{-2}\}} D_k D_k^H\right). \tag{72}$$

As shown in Eq. (68), the user s signal interpolation matrix affects the error of the user d channel, $\sigma_{\tilde{G},k}^2$. Although linear $B_k$ can be used, the system achievable rate can be maximized by designing an optimal $B_k$ matrix. The optimal $B_k$ is $$B_k = \text{argmin} \sigma_{\tilde{G},k}^2 \tag{73}$$

subject to $Tr\{B_k B_k^H\} \leq M$

Using the identity $Tl\{XY\}=Tr\{YX\}$, $$\sigma_{\tilde{G},k}^2 = \frac{1}{N_d M} Tr\left\{B_k^H \Psi_k B_k - B_k \Phi_k - \Phi_k^H B_k^H + \tag{74} \right.$$

$$\left. M A_k \left(\begin{bmatrix} \gamma_{\tau,k_1}^2 \|f_{k_1}\|^2 & 0 \\ 0 & \gamma_{\tau,k_2}^2 \|f_{k_2}\|^2 \end{bmatrix} + \begin{bmatrix} \frac{\gamma_{\tau,k_1}^2}{\rho_{\tau,k_1}} I & 0 \\ 0 & \frac{\gamma_{\tau,k_2}^2}{\rho_{\tau,k_2}} I \end{bmatrix}\right) A_k^H\right\},$$

where $$\Phi_k = \mathbb{E}\left\{\begin{bmatrix} \gamma_{\tau,k_1} H_{k_1}^H & 0 \\ 0 & \gamma_{\tau,k_2} H_{k_2}^H \end{bmatrix} A_k^H H_k\right\} \tag{75}$$

$$\Psi_k = \mathbb{E}\{H_k^H H_k\}.$$

Hence, $$B_k = \text{argmin} Tr\{B_k^H \Psi_k B_k\} - Tr\{B_k \Phi_k\} - Tr\{\Phi_k^H B_k^H\} \tag{76}$$

subject to $Tr\{B_k B_k^H\} \leq M$.

The above optimization problem is convex, and furthermore, can be solved using CVX, which is a package for specifying and solving convex programs.

D. Time-Domain Channel Estimation

In the previous discussion, product superposition is applied on the OFDM system when the channel estimation is done in the frequency domain, where the channel frequency response, $\{H_k\}_k$, is estimated, either with or without interpolation. Now consider applying the product superposition when channel estimation is done in the time-domain, where the channel impulse response, h, is estimated. The rate achieved in the conventional system when time-domain channel estimation is used is first considered, then the system achievable rate for the product superposition scheme is examined. Define, $\tilde{Y}_2(t) \in \mathbb{C}^{K \times 1}$ to be the received signal at receive antenna $n=1, \ldots, N_d$ at time slot t. Hence, $$\tilde{Y}_n(t) = \sqrt{\frac{\rho}{M}} \sum_{m=1}^{M} \text{diag}\{F[h_{n,m}^H, 0_{1 \times (K-L_d)}^H]^H\} \tilde{X}_m(t) + \tilde{W}_n(t), \tag{77}$$

where $F \in \mathbb{C}^{K \times K}$ is the DFT matrix, $\tilde{X}_m(t) \in \mathbb{C}^{K \times 1}$ is the transmitted signal at antenna $m=1, \ldots, M$ at time slot t, and $\tilde{W}_n(t) \in \mathbb{C}^{K \times 1}$ is the additive Gaussian noise at receive antenna n at time slot t. Therefore, $$\tilde{Y}_n(t) = \sqrt{\frac{\rho}{M}} \sum_{m=1}^{M} \text{diag}\{\tilde{X}_m(t)\} F[h_{n,m}^H, 0_{1 \times (K-L_d)}^H]^H + \tilde{W}_n(t). \tag{78}$$

For estimating $h_{n,m}$, at least L pilots are needed for each transmit antenna $m=1, \ldots, M$. Assume that LM pilots are sent at the first L subcarriers where M pilots are sent during the first M time slots of each subcarrier. Furthermore, assume that $$\tilde{X}_r^{(P)} = \begin{cases} \sqrt{M}\,1_L, & r=m, \\ 0_{L\times 1}, & r \neq m, \end{cases} \quad (79)$$

is the transmitted pilot signal to estimate $h_{n,m}$, and hence, the received signal at antenna n during pilot transmission can be given by $$\tilde{Y}_n^{(P)} = \sqrt{\rho_\tau} F_L h_{n,m} + \tilde{W}_n^{(P)}, \quad (80)$$

where $F_L \in \mathbb{C}^{L\times L}$, denotes the first L columns and the first L rows of F, and $W_n^{(P)} \in \mathbb{C}^{L\times 1}$ is the corresponding additive noise.

Using MMSE estimation, the estimated channel is
$$\hat{h}_{n,m} = \sqrt{\rho_\tau} F_L^H (\rho_\tau F_L F_L^H + I_L)^{-1} \tilde{Y}_n^{(P)}, \quad (81)$$

and hence, $$\sum_{\hat{h}} = \mathbb{E}\{\hat{h}_{n,m}\hat{h}_{n,m}^H\} \quad (82)$$
$$= \rho_\tau^2 F_L^H(\rho_\tau F_L F_L^H + I_L)^{-1} F_L F_L^H (\rho_\tau F_L F_L^H + I_L)^{-1} F_L +$$
$$\rho_\tau F_L^H (\rho_\tau F_L F_L^H + I_L)^{-2} F_L.$$

The estimation error is $\tilde{h}_{n,m} = h_{n,m} - \hat{h}_{n,m}$, and hence, $$\sum_{\tilde{h}} = \mathbb{E}\{\tilde{h}_{n,m}\tilde{h}_{n,m}^H\} \quad (83)$$
$$= \sum_{\hat{h}} + I_L - 2\rho_\tau F_L^H (\rho_\tau F_L F_L^H + I_L)^{-1} F_L.$$

Therefore the estimated channel, and the estimation error at subcarrier k are $$\hat{H}_k = F_k \hat{h}, \quad \hat{h} = \begin{bmatrix} \hat{h}_{1,1} & \cdots & \hat{h}_{1,M} \\ \vdots & \ddots & \vdots \\ \hat{h}_{N_d,1} & \cdots & \hat{h}_{N_d,M} \end{bmatrix}, \quad (84)$$

$$\tilde{H}_k = F_k \tilde{h}, \quad \tilde{h} = \begin{bmatrix} \tilde{h}_{1,1} & \cdots & \tilde{h}_{1,M} \\ \vdots & \ddots & \vdots \\ \tilde{h}_{N_d,1} & \cdots & \tilde{h}_{N_d,M} \end{bmatrix}.$$

Furthermore, $$\sigma_{\hat{H},k}^2 = \frac{1}{N_d M} Tr\{\mathbb{E}\{F_k \hat{h}\hat{h}^H F_k^H\}\} \quad (85)$$
$$= \frac{1}{N_d} Tr\{F_k (I_{N_d} \otimes \sum_{\hat{h}}) F_k^H\},$$

$$\sigma_{\tilde{H},k}^2 = \frac{1}{N_d M} Tr\{\mathbb{E}\{F_k \tilde{h}\tilde{h}^H F_k^H\}\}$$
$$= \frac{1}{N_d} Tr\{F_k (I_{N_d} \otimes \sum_{\tilde{h}}) F_k^H\}.$$

Thus user d can achieve the rate $$R_d \geq \frac{T_d - M}{T_d K_d} \sum_{k=1}^{L} \mathbb{E}\left\{\log\det I_{N_d} + \rho_{H,k} \frac{\overline{H}_k \overline{H}_k^H}{M}\right\} + \quad (86)$$

-continued $$\frac{1}{K_d} \sum_{k=L+1}^{K} \mathbb{E}\left\{\log\det I_{N_d} + \rho_{H,k} \frac{\overline{H}_k \overline{H}_k^H}{M}\right\},$$

where $\rho_{H,k}$, $\overline{H}_k$ are given in Eq. (30), and Eq. (28), respectively.

Now consider the product superposition scheme in the case of time-domain channel estimation. Assume the pilot signal in this case is given by $$\tilde{X}_r^{(P)} = \begin{cases} \sqrt{M}\,v_m 1_L, & r=m, \\ 0_{1\times L}, & r \neq m \end{cases}, \quad (87)$$

where $v_m$ is user s signal sent by transmit antenna m=1, ..., M during the pilot transmission needed for estimating $h_{n,m}$. Hence, user d received signal at antenna n during pilot transmission can be given by $$\tilde{Y}_n^{(P)} = \sqrt{\rho_\tau} F_L h_{n,m} v_m + \tilde{W}_n^{(P)} \quad (88)$$
$$= \sqrt{\rho_\tau} F_L g_{n,m} + \tilde{W}_n^{(P)}$$

where $g_{n,m} = h_{n,m} v_m$ is the user d equivalent channel impulse response between receive antenna n and transmit antenna m. Using MMSE, channel estimation for the equivalent channel $g_{n,m}$ is $$\hat{g}_{n,m} = \sqrt{\rho_\tau} F_L^H (\rho_\tau F_L F_L^H + I_L)^{-1} \tilde{Y}_n^{(P)}, \quad (89)$$

and hence, $$\Sigma_{\hat{g}} = \mathbb{E}\{\hat{g}_{n,m}\hat{g}_{n,m}^H\} = \Sigma_{\hat{h}},$$
$$\Sigma_{\tilde{g}} = \mathbb{E}\{\tilde{g}_{n,m}\tilde{g}_{n,m}^H\} = \Sigma_{\tilde{h}}, \quad (90)$$

where $\tilde{g}_{n,m} = g_{n,m} - \hat{g}_{n,m}$ is the user d equivalent channel estimation error, and $\Sigma_{\hat{h}}$, and $\Sigma_{\tilde{h}}$ are defined in Eq. (82), and Eq. (83), respectively. Therefore the user d estimated equivalent channel, and the estimation error at subcarrier k are $$\hat{G}_k = F_k \hat{g}, \quad \hat{g} = \begin{bmatrix} \hat{g}_{1,1} & \cdots & \hat{g}_{1,M} \\ \vdots & \ddots & \vdots \\ \hat{g}_{N_d,1} & \cdots & \hat{g}_{N_d,M} \end{bmatrix}, \quad (91)$$

$$\tilde{G}_k = F_k \tilde{g}, \quad \tilde{g} = \begin{bmatrix} \tilde{g}_{1,1} & \cdots & \tilde{g}_{1,M} \\ \vdots & \ddots & \vdots \\ \tilde{g}_{N_d,1} & \cdots & \tilde{g}_{N_d,M} \end{bmatrix}.$$

Futhermore, $$\sigma_{\hat{G},k}^2 = \frac{1}{N_d M} Tr\{\mathbb{E}\{F_k \hat{g}\hat{g}^H F_k^H\}\} = \sigma_{\hat{H},k}^2, \quad (92)$$

$$\sigma_{\tilde{G},k}^2 = \frac{1}{N_d M} Tr\{\mathbb{E}\{F_k \tilde{g}\tilde{g}^H F_k^H\}\} = \sigma_{\tilde{H},k}^2,$$

where $\sigma_{\hat{H},k}^2$, and $\sigma_{\tilde{H},k}^2$ are defined by Eq. (85). Thus user d can achieve the rate $$R_d \geq \frac{T_d - M}{T_d K_d} \sum_{k=1}^{L} \mathbb{E}\left\{\log\det I_{N_d} + \rho_{H,k} \frac{\overline{G}_k \overline{G}_k^H}{M}\right\} + \quad (93)$$

-continued $$\frac{1}{K_d} \sum_{k=L_d+1}^{K_d} \mathbb{E}\left\{\log\det I_{N_d} + \rho_{H,k} \frac{\overline{G}_k \overline{G}_k^H}{M}\right\}.$$

Furthermore, the user s received signal at the subcarriers with pilots k=1, ..., L, is $$Z_k = \sqrt{\rho_\tau} D_k v + \Xi_k, \quad (94)$$

where $v=[v_1^H, \ldots, v_M^H]^H$ is the vector containing the static user signal. Define, the received signal at the L subcarriers containing pilots to be $$\overline{Z} = \sqrt{\rho_\tau}\, \overline{D}_v + \overline{\Xi}, \quad (95)$$

where $$\overline{Z} = \begin{bmatrix} Z_1 \\ \vdots \\ Z_L \end{bmatrix}, \overline{D} = \begin{bmatrix} D_1 \\ \vdots \\ D_L \end{bmatrix}, \overline{\Xi} = \begin{bmatrix} \Xi_1 \\ \vdots \\ \Xi_L \end{bmatrix}. \quad (96)$$

Thus user s can achieve the rate $$R_s \geq \frac{1}{T_d K_d} \mathbb{E}\left\{\log\det I_{N_s} + \mathbb{E}\frac{1}{\{\lambda_i^{-2}\}} \overline{\overline{D}}\,\overline{\overline{D}}^H\right\}, \quad (97)$$

which represents the "for free" achievable rate using product superposition transmission.

IV. Disparity in Coherence Bandwidth

In this section, the downlink transmission for two users with disparity in bandwidth, i.e. $K_d \neq K_s$, but equality in time, i.e., $T_s=T_d$, is examined. The channels of user s and user d stay constant during the same coherence time $T_s=T_d=T$. The two users are assumed to have the same selectivity over time, and hence, the value of T could be short or long. Consider the case when $L_d=1$, i.e., the channel of user d is flat fading ($H_k=H$, $\forall k$), whereas $L_s \geq 1$, i.e., users channel is frequency selective. The system can be given achievable rates obtained by applying the product superposition transmission and the gain over the conventional transmission.

For this system, the product superposition transmission is as follows. Since the channel of user d is the same for all the subcarriers, the channel can be estimated at one subcarrier, $k_1$, every T time slots. On the other hand, channel estimation at all the subcarriers is needed for user S. This section shows the gain provided by product superposition transmission when channel estimation is done in the frequency domain without interpolation. For frequency-domain channel estimation with interpolation, and time-domain channel estimation, product superposition transmission still can provide gain over conventional transmission, as shown in Section III-D. The analysis of the latter two cases is removed here for brevity. Therefore at subcarrier $k_1$, the pilot signals can be sent so that the two users can estimate their channels, $D_{k_1}$, and H, and furthermore, at the other subcarriers $k \neq k_1$, product superposition can be used to provide for free rate for user d. Hence, at the subcarriers $k \neq k_1$, the transmitted signal is $$X_k = [\sqrt{M} U_k, U_k V_k], \quad (98)$$

where $U_k \in \mathbb{C}^{M \times M}$ is the signal of user d, and $V_k \in \mathbb{C}^{M \times T-M}$. Hence, the users received signal at the first M time slots is $$Z_k^{(p)} = \sqrt{\rho_{\tau,k}} D_k U_k + \Xi_k^{(p)} = \sqrt{\rho_{\tau,k}} J_k + \Xi_k^{(p)} \quad (99)$$

where $J_k = D_k U_k$ is the user s equivalent channel matrix at subcarrier k. Following the same analysis in Section III, the MMSE estimate of the channel is $$\hat{J}_k = \gamma_{\tau,k} J_k + \frac{\gamma_{\tau,k}}{\sqrt{\rho_{\tau,k}}} \Xi_k^{(p)}, \quad (100)$$

$$\sigma_{\hat{J}}^2 = \gamma_{\tau,k} \|f_k\|^2, \quad (101)$$

and furthermore, the user s channel estimation error is $$\tilde{J}_k = J_k - \hat{J}_k = (1-\gamma_{\tau,k}) J_k - \frac{\gamma_{\tau,k}}{\sqrt{\rho_{\tau,k}}} \Xi_k^{(p)}. \quad (102)$$

Therefore, the normalized MMSE of the user s estimated channel is $$\sigma_{\tilde{J}}^2 = \frac{\gamma_{\tau,k}}{\rho_{\tau,k}}. \quad (103)$$

Therefore, using $K_s$ subcarriers and during T time slots, user s can achieve the rate $$R_s \geq \frac{T-M}{TK_s} \sum_{k=1}^{K_s} \mathbb{E}\left\{\log\det I_{N_s} + \rho_{J,k} \frac{\overline{J}_k \overline{J}_k^H}{M}\right\}, \quad (104)$$

where $\overline{J}_k = \hat{J}_k/\sigma_{\hat{J}_k}$, and $$\rho_{J,k} = \frac{\rho_{d,k} \sigma_{\hat{J}}^2}{1+\rho_{d,k} \sigma_{\tilde{J}}^2}. \quad (105)$$

Furthermore, using $K_s$ subcarriers and during T time slots, user d can achieve the rates $$R_d \geq \frac{M}{TK_s} \sum_{k=1, k \neq k_1}^{K_s} \mathbb{E}\left\{\log\det I_{N_d} + \rho_{H,k} \frac{\overline{H}\overline{H}^H}{M}\right\}, \quad (106)$$

where $$\rho_{H,k} = \frac{\sigma_{\tilde{H},k}^2}{\mathbb{E}\{\epsilon_i^{-2}\} + \sigma_{\tilde{H},k}^2},$$

and $\epsilon_i^{-2}$ i is any unordered eigenvalue of $\tilde{V}_k \tilde{V}_k^H$, $\tilde{V}_k = [\rho_\tau I, \rho_\delta V_k V_k^H]$. Hence, the user d achievable rate in the above equation demonstrates the "for free" rate obtained by using product superposition transmission.

V. Disparity in Both Coherence Time and Coherence Bandwidth

In this section, consider the scenario when the users have disparity in both coherence time and coherence bandwidth at the same time, i.e., $T_d \neq T_s$ and $L_d \neq L_s$. In the case when $L_d=1$, $L_s \geq 1$, and $T_s = qT_d$, where $q = 1, 2, \ldots$, the coherence time of users is a multiple integer of user d. Two versions of product superposition transmissions can be used to obtain "for free" gain over the conventional transmission. The first one is product superposition transmission with respect to user d where user s obtains the "for free" rate, and the second is product superposition transmission with respect to user s where user d obtains the "for free" gain.

A. Product Superposition Transmission with Respect to User d

Since $T_s = qT_d$, the interval $T_s$ can be divided into q subintervals. During the first subinterval of length $T_d$ slots, the transmitter can send pilots during the first M resource elements at subcarrier $k_1$ so that user d can estimate its channel H, and furthermore user s can estimate its channel at subcarrier $k_1$. Hence, $$\hat{H} = \frac{\rho_{\tau,k_1}}{\rho_{\tau,k}+1}H + \frac{\sqrt{\rho_{\tau,k_1}}}{\rho_{\tau,k_1}+1}W_{k_1}^{(p)}, \quad (107)$$

$$\hat{D}_{k_1} = \gamma_{\tau,k_1}D_{k_1} + \frac{\gamma_{\tau,k_1}}{\sqrt{\rho_{\tau,k_1}}}\Xi_{k_1}^{(p)}.$$

During the following (q−1) subintervals, user d utilizes pilots to estimate its channel, whereas, user s already has estimated its channel during the first subinterval. Hence, product superposition transmission can be used at subcarrier $k_1$ to obtain the "for free" rate for user s. Therefore, the transmitted signal at the subcarrier $k_1$ during the first M resource elements is $$X_{k_1}^{(p)} = \sqrt{M}V, \quad (108)$$

where V is the user s signal. Hence, the user d received signal during the first M resource elements is $$Y_{k_1}^{(p)} = \sqrt{\rho_{\tau,k_1}}G + W_{k_1}^{(p)}, \quad (109)$$

where G=HV is the user d equivalent channel matrix. Therefore, the MMSE estimate of the channel is $$Y_{k_1}^{(p)} = \sqrt{\rho_{\tau,k_1}}G + W_{k_1}^{(p)}, \quad (110)$$

and furthermore, $$\sigma_{\hat{G}}^2 = \frac{\rho_{\tau,k_1}}{1+\rho_{\tau,k_1}}, \quad (111)$$

Hence, the user d channel estimation error is $$\tilde{G} = G - \hat{G} = \frac{1}{1+\rho_{\tau,k_1}}G - \frac{\sqrt{\rho_{\tau,k_1}}}{1+\rho_{\tau,k_1}}W_{k_1}^{(p)}. \quad (112)$$

and furthermore, $$\sigma_{\tilde{G}}^2 = \frac{1}{1+\rho_{\tau,k_1}}. \quad (113)$$

Hence, user d can achieve the rate $$R_d \geq \frac{1}{q}\left(\frac{T_d - M}{T_d K_d}\mathbb{E}\left\{\log\det I_{N_d} + \rho_{H,k_1}\frac{\overline{HH}^H}{M}\right\} + \right. \quad (114)$$

$$\frac{1}{K_d}\sum_{k=1,k\neq k_1}^{K_d}\mathbb{E}\left\{\log\det I_{N_d} + \rho_{H,k}\frac{\overline{HH}^H}{M}\right\} +$$

$$\left(1-\frac{1}{q}\right)\left(\frac{T_d - M}{T_d K_d}\mathbb{E}\left\{\log\det I_{N_d} + \rho_{G,k_1}\frac{\overline{GG}^H}{M}\right\} + \right.$$

$$\left.\frac{1}{K_d}\sum_{k=1,k\neq k_1}^{K_d}\mathbb{E}\left\{\log\det I_{N_d} + \rho_{G,k}\frac{\overline{GG}^H}{M}\right\}\right).$$

Furthermore, the achievable rate by user s is $$R_s \geq \left(1-\frac{1}{q}\right)\frac{M}{T_d K_d}\mathbb{E}\left\{\log\det I_{N_s} + \rho_{H,k_1}\frac{\overline{D}_{k_1}\overline{D}_{k_1}^H}{M}\right\}, \quad (115)$$

which demonstrates the "for free" rates obtained by product superposition transmission over conventional transmission.

B. Product Superposition with Respect to User s

The second product superposition scheme makes use of the disparity in coherence bandwidth between the two users. Hence, the product superposition with respect to user s is the same as the one given in Section IV yielding the user achievable rates that are given in Eq. (104), and Eq. (106), where the latter is the "for free" rate over the conventional transmission.

VI. Numerical Results

The numerical results were averaged over 10000 Monte Carlo runs. In each run, the channel coefficients and the users noises are independent and randomly generated. The system sum-rate denotes, for the case of conventional transmission, the interference-free rate of one user, and for the case of product superposition transmission, the summation of the interference-free rate and the "for free" rate of the two users. For the system with disparity in coherence time discussed in Section III, consider a system of M=4 transmitting antennas, $N_d$=4, and $N_s$=4 receive antennas at user d, and user s, respectively. Furthermore, user d and user s channels have $L_s$=$L_d$=2 taps, and the number of subcarriers is K=12 subcarriers and the coherence time of user d is $T_d$=20 time slots, i.e. the size of the considered resource block is 12 subcarriers and 20 time slots.

Figure 4:
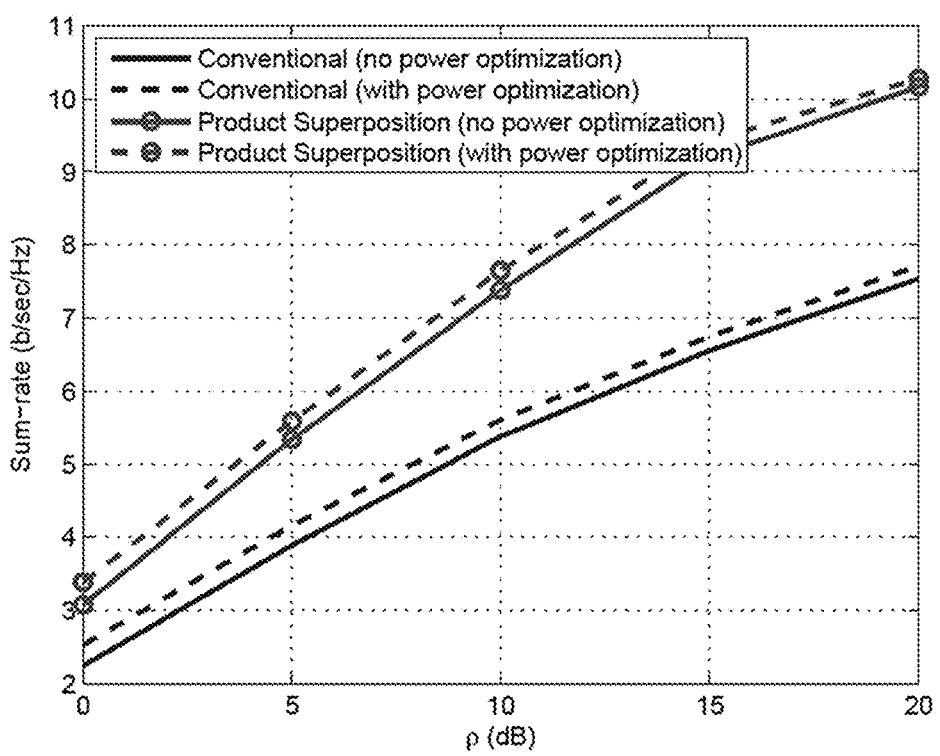

FIGS. 3 and 4 compare the conventional transmission, and the product superposition transmission when the users channels have disparity in coherence time. FIG. 3 shows the rates (sum-rate) versus the transmitted SNR when frequency-domain channel estimation is used without interpolation. There is disparity in coherence time. Notice from FIG. 3, the gain obtained when product superposition transmission is used over the conventional transmission. Furthermore, FIG. 4 shows that product superposition transmission can still provide gain when interpolation is used for frequency domain channel estimation with interpolation. The rates (sum-rate) versus the SNR are when there is disparity in coherence time. In FIGS. 3 and 4, the curves with no power optimization denote the case when $\rho_{\tau,k} = \rho_{d,k} = \rho$, whereas the curves with power optimization denote the case when $\rho_{\tau,k}$, $\rho_{d,k}$ are given in Eq. (31).

Figure 5:
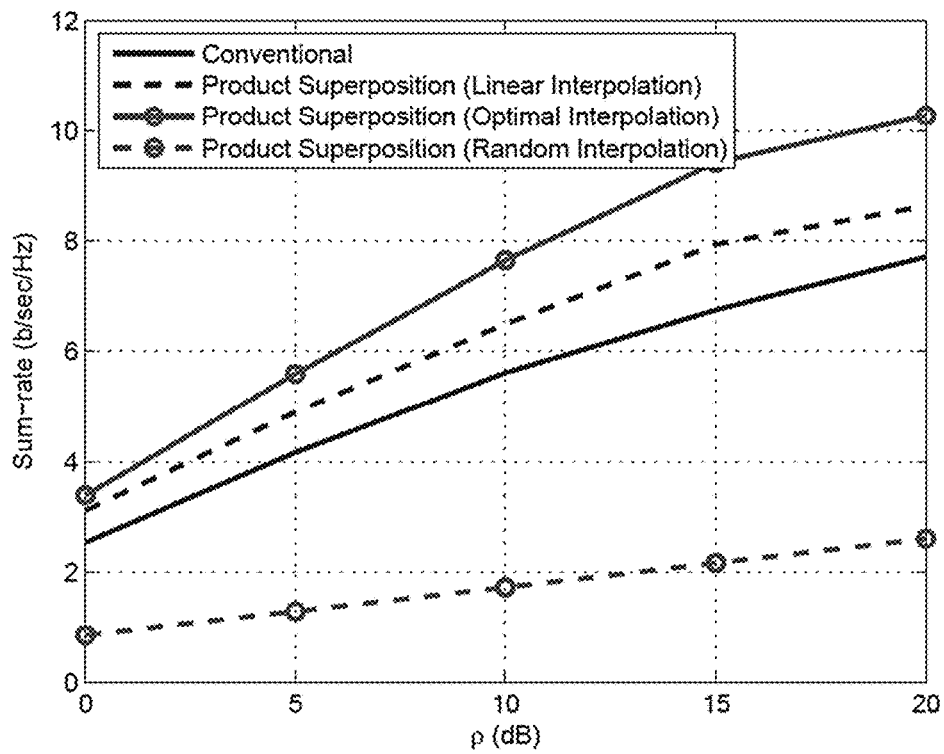
FIG. 5 is a plot illustrating the effect of a user interpolation matrix on the product superposition gain, in accordance with various embodiments of the present disclosure.
Figure 6:
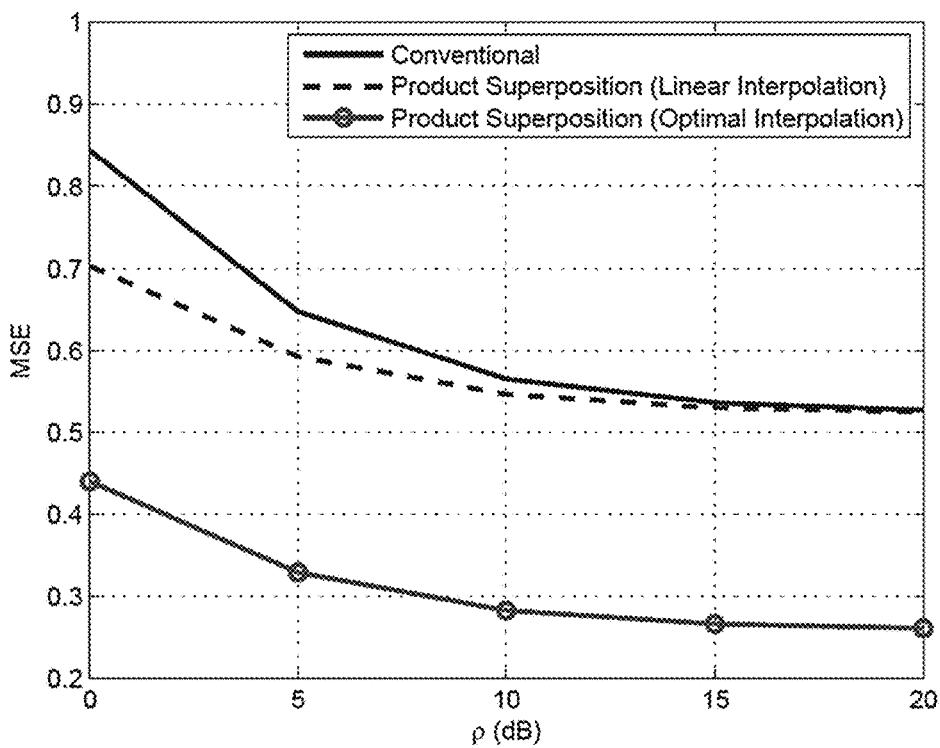
FIG. 6 is a plot illustrating a comparison of system minimum mean square error (MMSE) vs. SNR, in accordance with various embodiments of the present disclosure.

For the same system parameters, and interpolation is used to estimate user d channel, FIGS. 5 and 6 demonstrate the effect of using an optimal user s interpolation matrix $B_k$ given in Eq. (76) on the product superposition gain. In FIG. 5, the product superposition transmission is shown when $B_k$ is optimal, linear, or random. Frequency-domain channel estimation with interpolation is used. Furthermore, FIG. 6 compares the MMSE of channel estimation for conventional transmission, and product superposition transmission with linear, and optimal $B_k$. There is disparity in coherence time, and frequency-domain channel estimation with interpolation is used.

Figure 7:
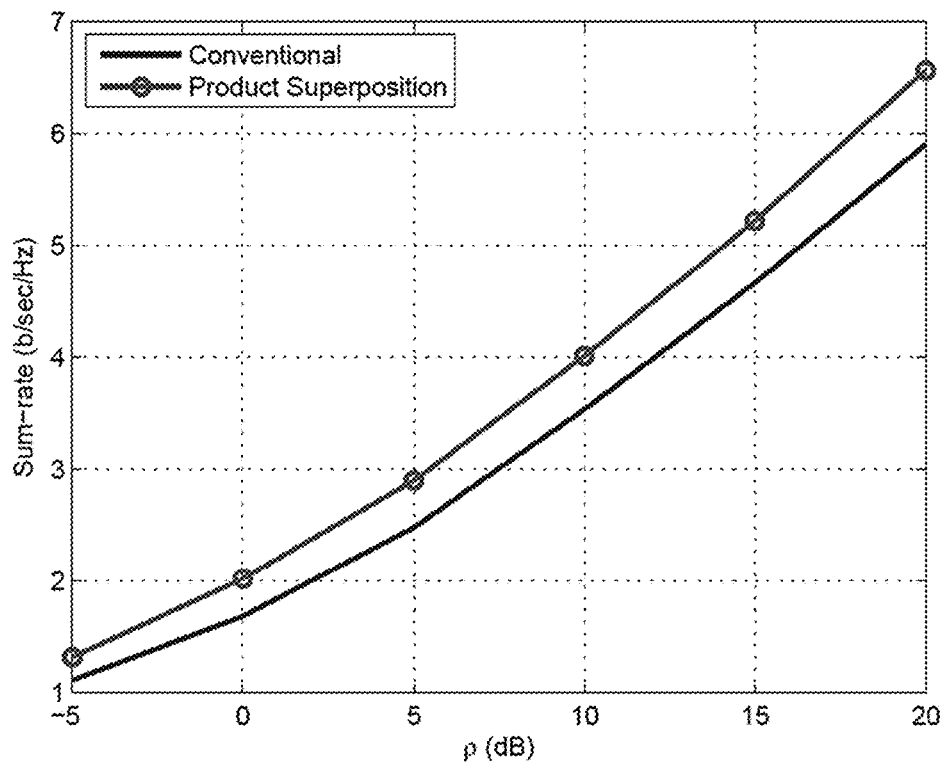
FIGS. 7-9 are plots illustrating comparisons of sum rate vs. signal-to-noise ratio (SNR), in accordance with various embodiments of the present disclosure.

For simulating the system with time-domain channel estimation, consider M=4 transmitting antennas, $N_d$=2, and $N_s$=4 receive antennas at user d, and users, respectively. Furthermore, user d and user s channels can have $L_s$=$L_d$=5 taps, and the number of subcarriers considered is K=10 subcarriers and the coherence time of user d is $T_d$=8 time slots. FIG. 7 shows the product superposition gain compared to the conventional transmission. The sum-rate versus SNR is when there is disparity in coherence time, and time-domain channel estimation is used.

Figure 8:
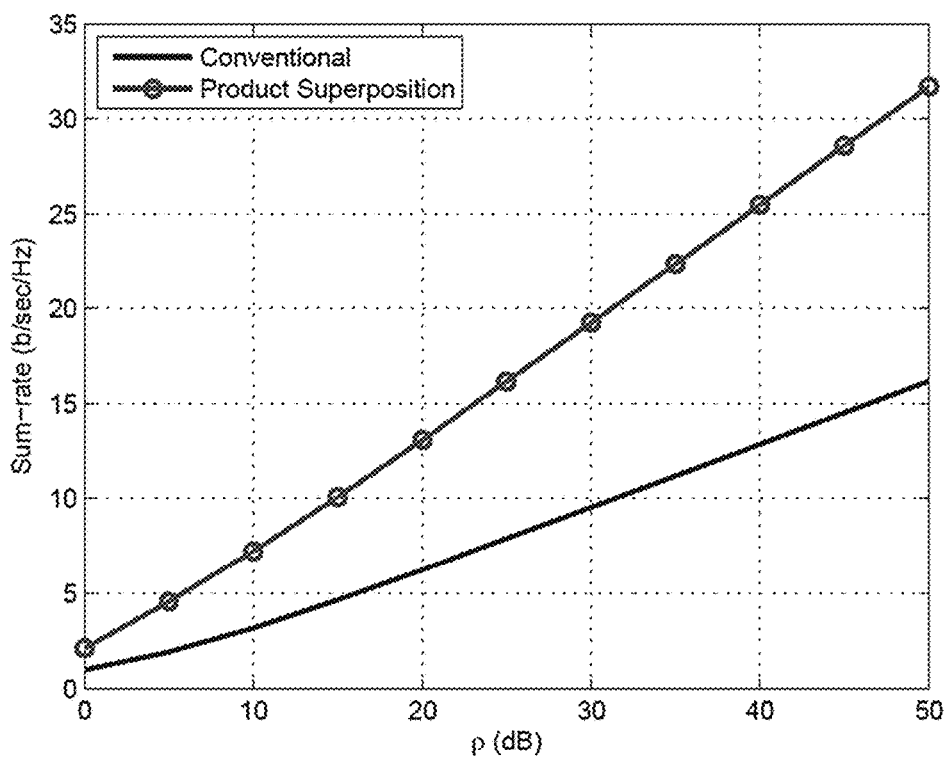

FIG. 8 shows the product superposition gain over the conventional system when the channels of user d and user s have disparity in coherence bandwidth. The sum-rate versus SNR when there is disparity in coherence bandwidth. Consider a system of M=4 transmitting antennas, $N_d$=2, and $N_s$=2 receive antennas at user d, and users, respectively. Furthermore, user d and user s channels have the same coherence time $T_s$=$T_d$=T=8 time slots. Furthermore, user d has $L_d$=1 channel tap, whereas, the channel of user s has $L_s$=2 taps, and the number of subcarriers considered is K=8 subcarriers.

Figure 9:
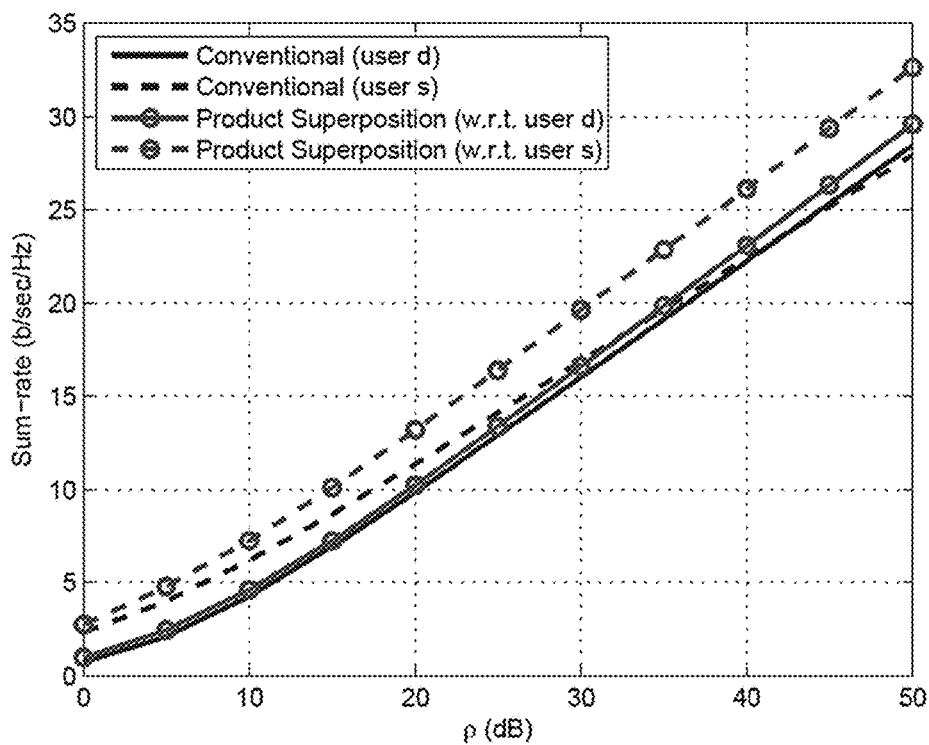
Figure 10:
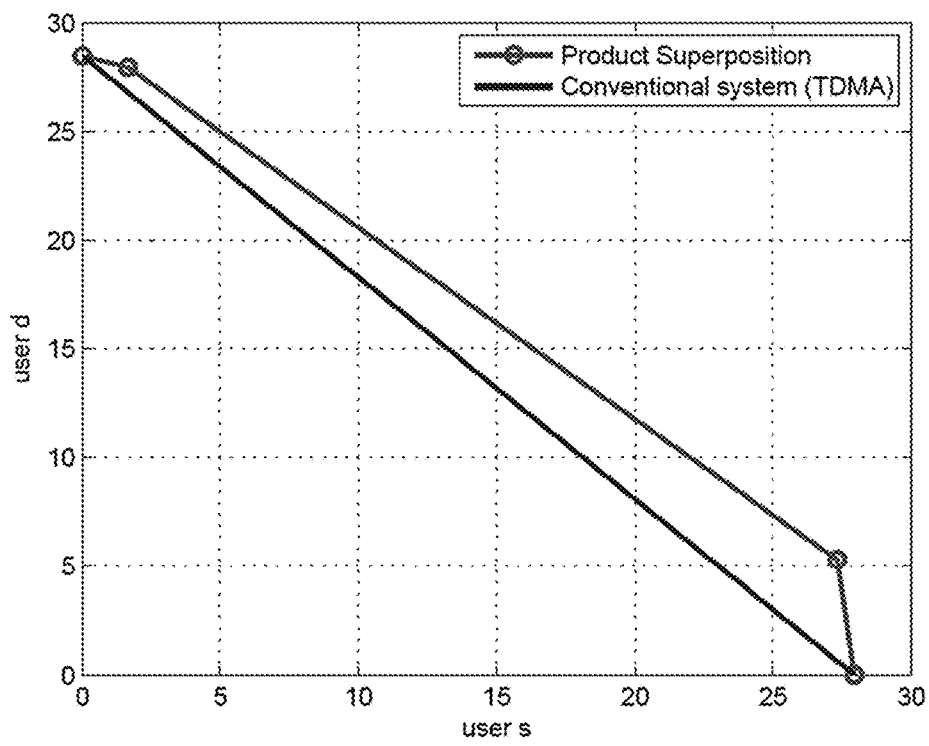
FIG. 10 is a plot illustrating a system rate region for a system with disparity in both coherence time and coherence bandwidth, in accordance with various embodiments of the present disclosure.

FIGS. 9 and 10 show the sum-rate increase when product superposition transmission is used for the case of disparity in both coherence time and coherence bandwidth. Consider a system with M=4 transmitting antennas, $N_d$=2, and $N_s$=2 receive antennas. The disparity in both coherence time and coherence bandwidth is simulated when the channels of user d and users have $L_d$=1, and $L_s$=3 taps, respectively, and furthermore, the coherence time of user d is $T_d$=8 time slots, and that of users is $T_s$=24 time slots, i.e. q=3. In FIG. 9, the two product superposition transmissions: with respect to user d, and with respect to user s are compared their corresponding conventional transmissions. The sum-rate versus SNR is when there is disparity in both coherence time and coherence bandwidth. FIG. 10 shows the increase in the system rate region obtained via product superposition scheme compared to the conventional transmission rate region obtained by TDMA between the two users. The system rate region is for a system with disparity in both coherence time and coherence bandwidth.

VII. Conclusion

The first part of this disclosure has presented multiuser wireless channels when the users have disparity in fading conditions, in particular disparity in coherence time and coherence bandwidth. A new source of gain, called coherence diversity, can be obtained by making use of this disparity phenomenon. OFDM downlink transmission for two users was considered in three different scenarios of disparity: in coherence time, in coherence bandwidth, and in both coherence time and coherence bandwidth. In each scenario a version of product superposition transmission was used to obtain the gains in the achievable rates. Numerical simulations were also provided to calculate the gains in the system achievable rates compared to conventional transmission demonstrating the superiority of the proposed schemes.

Coherence Diversity for Multiple Users

I. Introduction

In a wireless network, variations in node mobility and scattering environment may easily produce unequal link coherence times. But the performance limits of wireless networks under unequal link coherence times have been for the most part an open problem.

Even under identical coherence times, understanding the performance limits of many wireless networks under block fading or related models has been far from trivial, with some key results under identical fading intervals being realized only very recently. For a two-user multiple-input single-output (MISO) broad-cast channel with receive-side channel state information (CSIR) and finite precision transmit-side channel state information (CSIT), the degrees of freedom may collapse to unity under (non-singular) correlated fading. A broadcast channel with heterogeneous CSIT, i.e., the CSIT with respect to different links may be perfect, delayed, or non-existent, has been considered. In this case, a collapse of degrees of freedom for a two-receiver broadcast may occur as long as CSIT with respect to one link is missing. These were settled in the positive using the idea of aligned image sets. Furthermore, an outer bound for a K-receiver MISO broadcast channel was developed where there is CSIT with respect to some link gains and delayed CSIT with respect to other link gains. For the 3-receiver case, when the transmitter has CSIT for one receiver and delayed CSIT for the other two, a transmission scheme achieving 5/3 sum degrees of freedom can be found. For the same system, a transmission scheme was proposed that can achieve 9/5 sum degrees of freedom. A broadcast channel with delayed CSIT was demonstrated showing that even completely outdated channel feedback is still useful. A scenario of mixed CSIT (imperfect instantaneous and perfect delayed) can also be considered.

Considering a two-receiver broadcast channel with CSIR but no CSIT under i.i.d. fast fading, it can be shown that TDMA is degrees of freedom optimal. This result can be extended to multiple receivers and to a wider class of fading distributions and fading dynamics (not including block fading). This can be based on the notion of stochastic equivalence of links with respect to the transmitter.

For the broadcast channel, a summary of the results of the second part of this disclosure is as follows. Begin by settling the open problem of the degrees of freedom of the multi-receiver block-fading broadcast channel with identical fading intervals. We show that with CSIR but no CSIT, the degrees of freedom is limited to time-sharing. In the absence of CSIR (and CSIT) it can be shown that once again the degrees of freedom cannot be improved beyond time sharing.

Now consider unequal fading intervals, where the perspective for the availability and cost of channel state information is quite distinct from the case of equal fading intervals. Specifically, the normalized per-transmission cost of acquiring CSIR, e.g. via pilots, is closely related to the block length, therefore the normalized cost of CSIR for links with un-equal coherence times may vary widely. It follows that when fading intervals are unequal, any assumption of free CSIR may obscure important features of the problem.

Therefore consider a model without free availability of CSIR. i.e., one where the cost of CSIR is accounted for. For achievable degrees of freedom of the multi-receiver broadcast channel, a generalization of the method of product superposition to multiple receivers with coherence times of arbitrary integer ratios may be used, and without free CSIR. Also, availability of CSIT is not assumed. For example, this method may be considered for the special case of a two-receiver broadcast channel were one receiver has a very long coherence time compared with the other. This achievable rate can be obtained by transmitting a pilot whenever one or more receivers experience a fading transition, and then during each pilot transmission exactly one (other) receiver who does not need the pilot can simultaneously utilize the channel for data transmission without contaminating the pilot. This leads to degrees of freedom gains that are directly tied to the disparity of coherence times, and are therefore called coherence diversity.

If the coherence time is at least twice the number of transmit and receive antennas, the obtained degrees of freedom can be shown to meet the upper bound in four cases: When the number of transmit antennas is less than or equal to the number of antennas at every receiver, when all the receivers have the same number of antennas, when the coherence times of the receivers are very long compared to one receiver, or when all the receivers have identical coherence times. The development of outer bounds for this problem makes use of the idea of channel enhancement, which comprises increasing the coherence time of all receivers to match the coherence time of the slowest channel.

The inner bounds for coherence diversity can be further extended to the case of multiple receivers experiencing fading block lengths of arbitrary ratio or alignment. Unaligned block fading intervals bring to mind blind interference alignment. Consider a version of bind interference alignment takes into account the full cost of CSIR via training; in that framework the synergies between blind interference alignment and product superposition are examined.

For the block-fading multiple-access channel, the capacity in the absence of CSIR is unknown. In fact, the capacity of a point-to-point channel under this condition is also unknown except in certain special cases. In the single-input multiple-output (SIMO) block-fading multiple access without CSIR, the sum capacity can be achieved by activating no more than T receivers. Also, for a two-receiver single-input single-output (SISO) multiple access channel with i.i.d. fast fading (all the receivers have coherence time of length 1), a non-naive time-sharing inner bound and a cooperative outer bound on the capacity region can be provided. Furthermore, a multi-receiver multiple access channel with identical coherence times where the receivers are equipped with single antenna where an inner bound on the network sum capacity can be provided based on successive decoding, and an outer bound can be obtained based on assuming cooperation between the transmitters.

The results for the multiple-access channel are as follows: begin by highlighting bounds on the degrees of freedom of the block-fading MIMO multiple access channel with identical coherence times in the absence of free CSIR. A conventional pilot-based scheme emitting individual and separate pilots from (e.g., a subset of) the antennas of receivers is considered that subsequently allows the receiver to perform zero-forcing. This method can be shown to partially meet the cooperative outer bound. In particular, this method can always achieves the optimal sum degrees of freedom, and in some cases can be optimal throughout the degrees of freedom region. For the case of unequal coherence times, the same transmission technique can be employed with pilots transmitted at the fading transition times of every active receiver. The outer bound can once again build on the concept of enhancing the channel by increasing the receivers coherence times so that the receivers of the enhanced channel have identical coherence times.

The key results of the paper are summarized in the table of FIG. 11 for broadcast channel and in the table of FIG. 12 for multiple access channel, where $$N_i^* = \min\left\{M, N_i, \left\lfloor \frac{T_i}{2} \right\rfloor\right\}, N_{max} = \max_{j \in \mathbb{J}} \{N_j\} \text{ and } j_{min}$$

is the receiver with the shortest coherence time in $\mathbb{J}$.

II. Broadcast Channel with Identical Coherence Times

Consider a K-receiver MIMO broadcast channel where the transmitter is equipped with M antennas and receiver k is equipped with $N_k$ antennas, k=1, . . . , K. The received signal at receiver k is $$y_k(n) = \overline{H}_k(n)x(n) + z_k(n), k=1, \ldots, K, \quad (116)$$

where $x(n) \in \mathbb{C}^{M \times 1}$ is the transmitted signal, $z_k(n) \in \mathbb{C}^{N_k \times 1}$ is receiver k i.i.d. Gaussian additive noise and $\overline{H}_k(n) \in \mathbb{C}^{N_k \times M}$ is the receiver k Rayleigh block-fading channel matrix with coherence interval of length $T_k$ time slots, at the discrete time index n. One time slot is equivalent to a single transmission symbol period, and all $T_k$ are positive integers. Assume no CSIT, meaning the realization of $\overline{H}_k(n)$ is not known at the transmitter, whereas its distribution (including the length of the coherence time, and its transition) is globally known at the transmitter and at all receivers.

Also assume that there are K independent messages associated with rates $R_1(\rho), \ldots, R_K(\rho)$ to be communicated from the transmitter to the K receivers at $\rho$ signal-to-noise ratio. The degrees of freedom at receiver k achieving rate $R_k(\rho)$ can be defined as $$d_k = \lim_{\rho \to \infty} \frac{R_k(\rho)}{\log(\rho)}. \quad (117)$$

The degrees of freedom region of a K-receiver MIMO broadcast is defined as $$\mathcal{D} = \quad (118)$$
$$\left\{(d_1, \ldots, d_K) \in \mathbb{R}_+^K \mid \exists (R_1(\rho), \ldots, R_K(\rho)) \in C(\rho), \right.$$
$$\left. d_k = \lim_{\rho \to \infty} \frac{R_k(\rho)}{\log(\rho)}, k \in 1, \ldots, K\right\},$$

where $C(\rho)$ is the capacity region at $\rho$ signal-to noise ratio.

Assume that the receivers have identical coherence times, where the coherence times are perfectly aligned, and furthermore, have the same length, namely T. For the capacity to be determined, it is sufficient to study the capacity of only one coherence time. Define $Y_k(n) \in \mathbb{C}^{N_k \times T}$, $X(n) \in \mathbb{C}^{M \times T}$ to be the received signal at receiver k=1, . . . , K and the transmitted signal, respectively, during the coherence time T, $$Y_k = H_k X_k + Z_k, k=1, \ldots, K, \quad (119)$$

where $H_k(n) \in \mathbb{C}^{N_k \times M}$ is the receiver k channel matrix which remains constant during the interval T.

When there is CSIR, the degrees of freedom optimality of TDMA for two receivers with T=1 can be determined. Furthermore, the result can be extended to an arbitrary number of receivers and for a wider class of fading distribution. Since there is no CSIT, and furthermore, the receivers have identical coherence times, namely T, the receivers are stochastically equivalent (indistinguishable) with respect to the transmitter. As a result, TDMA is enough to achieve the degrees of freedom region of the system, i.e. the degrees of freedom region can be given by, $$\mathcal{D} = \left\{ (d_1, \ldots, d_K) \in \mathbb{R}_+^K \mid \sum_{i=1}^{K} \frac{d_i}{\min\{M, N_i\}} \leq 1 \right\}.$$

As will be further discussed in, e.g., paragraph 0145, this result for T≥1 can be extended to show that TDMA is degrees of freedom optimal.

Now assume that, for a K-receiver broadcast channel, there is no CSIR. As long as the receivers have identical coherence times, the receivers are still stochastically equivalent. In the sequel, it can be shows that TDMA is enough to achieve the degrees of freedom region of the system.

Theorem 1:

Consider a K-receiver broadcast channel with identical coherence times T. When there is no CSIT or CSIR meaning that the channel realization is not known, but the channel distribution is globally known, the degrees of freedom region of the channel is given by, $$\mathcal{D} = \left\{ (d_1, \ldots, d_K) \in \mathbb{R}_+^K \mid \sum_{i=1}^{K} \frac{d_i}{N_i^*\left(1 - \frac{N_i^*}{T}\right)} \leq 1 \right\}. \quad (120)$$

where $N_i^* = \min\left\{M, N_i, \left\lfloor \frac{T_i}{2} \right\rfloor\right\}$.

Proof:

A simple time division multiplexing between the receivers achieves the degrees of freedom region. The remainder of the proof is dedicated to finding a corresponding outer bound. Without loss of generality, assume $N_1 \leq \ldots \leq N_K$. When $M \leq N_1$, the cooperative outer bound for the sum degrees of freedom is $$\mathcal{D} = \left\{ (d_1, \ldots, d_K) \in \mathbb{R}_+^K \mid \sum_{i=1}^{K} \frac{d_i}{N_i^*\left(1 - \frac{N_i^*}{T}\right)} \leq 1 \right\}. \quad (121)$$

which is tight against the TDMA inner bound. When $M \geq N_1$, to obtain the outer bound the following Lemma is introduced.

Lemma 1:

For the above MIMO K-receiver broadcast channel, define $\overline{Y} = [Y_1^H, Y_2^H, \ldots, Y_K^H]^H$ to be the matrix that contains all received signals during T interval, and $\overline{Y}_j \in \mathbb{C}^{1 \times T}$ is row j of $\overline{Y}$ and $\tilde{Y}_S$ is the matrix constructed from excluding the set S of the rows from the matrix $\overline{Y}$. Then, $$I(X; \overline{Y}_j | U, \tilde{Y}_{U,1}) = I(X; \overline{Y}_l | U, \tilde{Y}_{U,1}), \quad (122)$$

and furthermore, $$I(X; \overline{Y}_j | U, \tilde{Y}_{U,1}) \geq I(X; \overline{Y}_j | U, \tilde{Y}_{U,1}, \overline{Y}_l), \quad (123)$$

where Uset→X→$\overline{Y}$ forms a Markov Chain. The proof of Lemma 1 is provided below.

Now, the outer bound for the case when $M \geq N_1$ can be found. Since the receivers have the same noise variance, the system is considered degraded, $$R_k \leq I(U_k; Y_k | U^{k-1}), k \neq K,$$

$$R_K \leq I(X; Y_K | U^{K-1}), \quad (124)$$

where $U_1 \to \ldots \to U_{K-1} \to X \to (Y_1, \ldots, Y_K)$ forms a Markov Chain, and $U_0$ is a trivial random variable. Using the chain rule, Eq. (124) can be written as $$R_k \leq I(X; Y_k | U^{k-1}) - I(X; Y_k | U^k), k \neq K,$$

$$R_K \leq I(X; Y_K | U^{K-1}). \quad (124)$$

Define $r_k$ to be the degrees of freedom of the term $I(X; Y_k | U^k)$, where $$0 \leq r_k \leq N_k^*\left(1 - \frac{M}{T}\right).$$

Furthermore, the degrees of freedom of $I(X; Y_1)$ is bounded by the single receiver bound, i.e.

$$N_1\left(1 - \frac{M}{T}\right),$$

hence, $$R_1 \leq \left(N_1\left(1 - \frac{M}{T}\right) - r_1\right)\log(\rho) + o(\log(\rho)), \quad (125)$$

$$R_k \leq I(X; Y_k | U^{k-1}) - r_k \log(\rho) + o(\log(\rho)), k \neq 1, K$$

$$R_K \leq I(X; Y_K | U^{K-1}).$$

Furthermore, $$r_k \log(\rho) + o(\log(\rho)) = I(X; Y_k | U^k) \quad (126)$$

$$\stackrel{(a)}{=} I(X; Y_{k,1:N_k^*} | U^k) +$$

$$\quad I(X; Y_{k,N_k^*+1:N_k} | U^k, Y_{k,1:N_k^*}) + o(\log(\rho))$$

$$\stackrel{(b)}{\geq} I(X; Y_{k,1:N_k^*} | U^k) + o(\log(\rho))$$

$$\stackrel{(c)}{=} \sum_{i=1}^{N_k^*} I(X; Y_{k,i} | U^k, Y_{k,i+1:N_k^*}) + o(\log(\rho))$$

$$\stackrel{(d)}{=} \sum_{i=1}^{N_k^*} I(X; Y_{k,1} | U^k, Y_{k,i+1:N_k^*}) + o(\log(\rho))$$

$$\stackrel{(e)}{\geq} N_k^* I(X; Y_{k,1} | U^k, Y_{k,2:N_k^*}) + o(\log(\rho)),$$

where $Y_{k,i:j}$ denotes the matrix constructed from the rows i:j of the matrix $Y_k$. (a), and (c) follow from the chain rule, and (b) follows since mutual information is non-negative. Furthermore, (d) follows from Lemma 1 and (e) follows since removing conditioning does not reduce the entropy. Therefore, $$I(X; Y_{k,1} \mid U^k, Y_{k,2:N_k^*}) \leq \frac{r_k}{N_k^*}\log(\rho) + o(\log(\rho)). \quad (127)$$

Furthermore, $$I(X; Y_k \mid U^{k-1}) \stackrel{(a)}{=} I(X; Y_{k,1:N_k^*} \mid U^{k-1}) + \quad (128)$$
$$I(X; Y_{k,N_k^*+1:N_k} \mid U^{k-1}, Y_{k,1:N_k^*})$$
$$\stackrel{(b)}{=} I(X; Y_{k,1:N_{k-1}^*} \mid U^{k-1}) +$$
$$I(X; Y_{k,N_{k-1}^*+1:N_k^*} \mid U^{k-1}, Y_{k,1:N_{k-1}^*}) + o(\log(\rho))$$
$$\stackrel{(c)}{=} I(X; Y_{k-1,1:N_{k-1}^*} \mid U^{k-1}) +$$
$$I(X; Y_{k,N_{k-1}^*+1:N_k^*} \mid U^{k-1}, Y_{k-1,1:N_{k-1}^*}) + o(\log(\rho))$$
$$= r_{k-1}\log(\rho) +$$
$$\sum_{i=N_{k-1}^*+1}^{N_k^*} I\begin{pmatrix} X; Y_{k,i} \mid U^{k-1}, \\ Y_{k-1,1:N_{k-1}^*}, Y_{k,i+1:N_k^*} \end{pmatrix} + o(\log(\rho))$$
$$\stackrel{(d)}{\leq} r_{k-1}\log(\rho) +$$
$$(N_k^* - N_{k-1}^*)I\begin{pmatrix} X; Y_{k-1,1} \mid U^{k-1}, \\ Y_{k-1,2:N_{k-1}^*} \end{pmatrix} + o(\log(\rho))$$
$$\stackrel{(e)}{\leq} r_{k-1}\log(\rho) + (N_k^* - N_{k-1}^*)\frac{r_{k-1}}{N_{k-1}^*}\log(\rho) + o(\log(\rho))$$
$$\leq \frac{N_k^*}{N_{k-1}^*}r_{k-1}\log(\rho) + o(\log(\rho)),$$

here (a) and (b) follow from applying the chain rule, and I(X; $Y_{k,N_k^*+1:N_k} \mid U^{k-1}, Y_{k,1:N_k}$)=o(log(ρ)) since more receive antennas than $N_k^*$ does not increase the degrees of freedom. Furthermore, (c) follows since $Y_{k,1:N_{k-1}}^*$ and $Y_{k-1,1:N_{k-1}}^*$ are statistically the same. (d) follows from applying Lemma 1 and (e) follows from Eq. (127). Therefore, $$d_1 \leq N_1\left(1 - \frac{M}{T}\right) - r_1, \quad (129)$$
$$d_k \leq \frac{N_k^*}{N_{k-1}^*}r_{k-1} - r_k, \; i \neq 1, K,$$
$$d_K \leq \frac{N_K^*}{N_{K-1}^*}r_{K-1}.$$

Hence, $$\sum_{i=1}^{K} \frac{d_i}{N_i^*\left(1 - \frac{M}{T}\right)} \leq \quad (130)$$
$$1 + \sum_{i=2}^{K} \frac{r_{k-1}}{N_{k-1}^*\left(1 - \frac{M}{T}\right)} - \sum_{i=1}^{K-1} \frac{r_k}{N_k^*\left(1 - \frac{M}{T}\right)}, \; = 1,$$

where the last inequality follows since the two summations on the right hand side cancel each other. Thus, the degrees of freedom region is bounded by TDMA of the single receiver points $$N_k^*\left(1 - \frac{M}{T}\right),$$

which is maximized to be $$N_k^*\left(1 - \frac{N_k^*}{T}\right),$$

completing the proof of Theorem 1.

III. Broadcast Channel with Heterogeneous Coherence Times

Consider the K-receiver broadcast channel defined in Eq. (116) where there is no CSIT or CSIR. Consider that the receivers have perfectly aligned coherence times with integer ratio, i.e., $$\frac{T_k}{T_{k-1}} \in \mathbb{Z},$$

Figure 13:
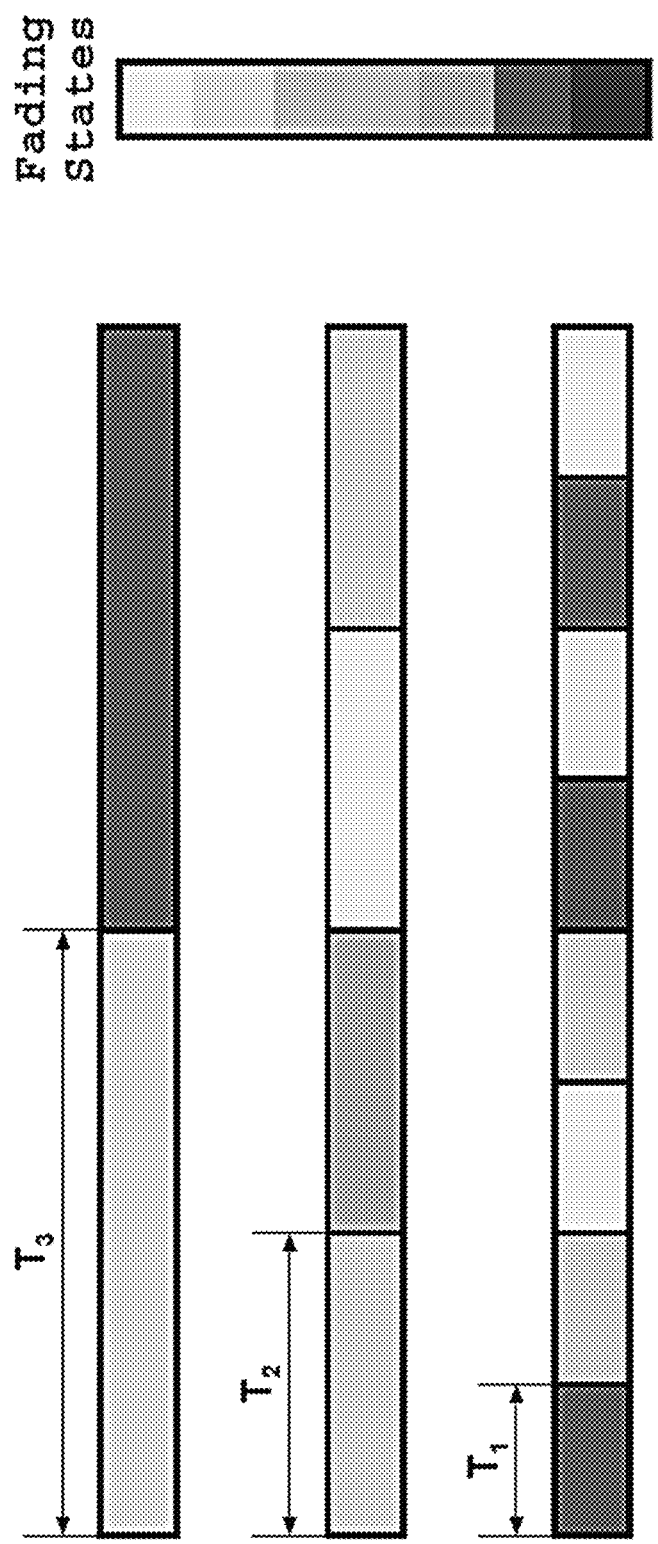
FIG. 13 graphically illustrates three receivers having aligned coherence times, in accordance with various embodiments of the present disclosure.

∀k. FIG. 13 denotes three receivers where $T_3=2T_2=4T_1$. In this system, the receivers are no longer stochastically equivalent, and hence, TDMA inner bound is no longer tight.

In the following subsections, product superposition transmission in revisited, and a product superposition transmission for the K-receiver broadcast channel defined in Eq. (116) calculating the achievable degrees of freedom region is given. An outer bound on the degrees of freedom region is also given and the tightness of these bounds is shown, and hence, the optimality of the achievable product superposition scheme for four cases. Numerical examples are also provided.

A. Product Superposition Scheme

A two-receiver broadcast channel with no CSIT and with mixed CSIR have been studied; one static receiver has very long coherence time, hence, there is CSIR for this receiver, and one dynamic receiver has short coherence time $T_d$, hence, there is no CSIR for this receiver. It can be shown that TDMA is suboptimal in such a broadcast channel and a product superposition scheme is disclosed as follows. Consider $M \geq N_s \geq N_d$, where $N_s$, $N_d$ are the number of receive antennas of the static and dynamic receivers, respectively. The transmitted signal is $$X = X_s X_d, \quad (131)$$

where $X_s \in \mathbb{C}^{M \times N_d}$ is the data matrix for the static receiver with i.i.d. $\mathcal{CN}(0,1)$ elements, and $X_d \in \mathbb{C}^{N_d \times T_d}$ is the signal matrix for the dynamic receiver, where $$X_d = [I_{N_d}, X_\delta], \quad (132)$$

$I_{N_d}$ is an $N_d \times N_d$ identity matrix, and $X_\delta \in \mathbb{C}^{N_d \times (T_d - N_d)}$ is the dynamic receiver data matrix having i.i.d $\mathcal{CN}(0,1)$ elements. Therefore the signal received at the dynamic receiver, during $T_d$ slots, is $$Y_d = H_d X_s [I_{N_d}, X_\delta] + Z_d \quad (133)$$
$$= [\overline{H}_d, \overline{H}_d X_\delta] + Z_d,$$

where $\overline{H}_d = H_d X_s$, and $H_d \in \mathbb{C}^{N_d \times M}$ is the dynamic receiver channel. The dynamic receiver estimates the equivalent channel $\overline{H}_d$ during the first $N_d$ slots and then decodes $X_\delta$ coherently based on the channel estimation. On the other hand, the received signal at the static receiver during the first $N_d$ slots is $$Y_{s1} = H_s X_s + Z_{s1}, \quad (134)$$

where $H_s \in \mathbb{C}^{N_s \times M}$ is the static receiver channel which is known at the receiver, and hence, $X_s$ can be decoded. As a result, the achievable degrees of freedom pair is $$\left(N_d\left(1 - \frac{N_d}{T_d}\right), \frac{N_s N_d}{T_d}\right), \quad (135)$$

which is strictly greater than TDMA. Thus, the product superposition achieves nonzero degrees of freedom for the static receiver "for free" in the sense that the dynamic receiver achieves the single-receiver degrees of freedom.

B. Achievability

Theorem 2:

Consider a K-receiver broadcast channel with heterogeneous coherence times and without CSIT or CSIR. The coherence times can be perfectly aligned and integer multiples of each other, i.e., $$\frac{T_k}{T_{k-1}} \in \mathbb{Z}.$$

Define $\mathbb{J} \subseteq [1:K]$ to be a set of J receivers ordered ascendingly according to the coherence time length. For $j \in \mathbb{J}$, the set of degrees of freedom tuples $\mathbb{D}_1(\mathbb{J})$ can be achieved:

$$d_j = \begin{cases} N_j^*\left(1 - \frac{N_j^*}{T_j} - \frac{\min\{M, N_{max}, T_j\} - N_j^*}{T_{j+1}}\right), & j = j_{min} \\ N_{j_{min}}^* \min\{M, N_j, T_{j_{min}}\}\left(\frac{1}{T_{j-1}} - \frac{1}{T_j}\right), & j \neq j_{min} \end{cases}. \quad (136)$$

Furthermore, the set of degrees of freedom tuples $\mathbb{D}_2(\mathbb{J})$ can be achieved:

$$d_j = \begin{cases} N_j^*\left(1 - \frac{N_j^*}{T_j}\right), & j = j_{min} \\ N_{j_{min}}^* \min\{N_j, N_{j_{min}}^*\}\left(\frac{1}{T_{j-1}} - \frac{1}{T_j}\right), & j \neq j_{min} \end{cases}, \quad (137)$$

where $$N_j^* = \min\left\{M, N_j, \left\lfloor\frac{T_j}{2}\right\rfloor\right\}, N_{max} = \max_{j \in \mathbb{J}}\{N_j\}$$

and $j_{min}$ is the receiver with the shortest coherence time in $\mathbb{J}$. The achievable degrees of freedom region is the convex hull of the degrees of freedom tuples, $\mathbb{D}_1(\mathbb{J})$ and $\mathbb{D}(\mathbb{J})$, over all the possible sets $\mathbb{J} \subseteq [1:K]$, i.e., $$\mathcal{D} = \{(d_1, \ldots, d_K) \in Co(\mathbb{D}_1(\mathbb{J}), \mathbb{D}_2(\mathbb{J}))), \forall \mathbb{J} \\ \subseteq [1:K]\}. \quad (138)$$

The proof of Theorem 2 is provided below.

Remark 1:

The receivers of the set $\mathbb{J}$ are ordered ascendingly according to the coherence time length. $J_{min}$ is the first receiver of $\mathbb{J}$.

Remark 2:

The two achievable set of degrees of freedom tuples, $\mathbb{D}_1(\mathbb{J})$ and $\mathbb{D}_2(\mathbb{J})$, are achieved by product superposition transmission scheme. The degrees of freedom gains are different in the two sets due to the difference in the number of estimated antennas. In general, none of the two sets includes the other. In the first set, $\mathbb{D}_1(\mathbb{J})$, all the receivers estimate the channel of the maximum number of antennas required for transmission, i.e., receiver j can estimate the channel between $N_j^*$ antennas. In the second set, $\mathbb{D}_2(\mathbb{J})$, the receivers are limited to estimate the channel between $N_{j1}$ antennas.

Remark 3:

When the receivers have the same coherence times, the product superposition scheme is not able to achieve degrees of freedom gains. In this case, there is no coherence diversity between the two receivers, hence, the degrees of freedom region is tight against TDMA.

C. Outer Bound

Theorem 3:

Consider a K-receiver broadcast channel under heterogeneous coherence times without CSIT or CSIR, meaning that the channel realization is not known, but the channel distribution is globally known. The coherence times are perfectly aligned and integer multiples of each others, i.e., $$\frac{T_k}{T_{k-1}} \in \mathbb{Z}.$$

Define $\mathbb{J} \subseteq [1:K]$ to be a set of J receivers ordered ascendingly according to the coherence time length, if a set of degrees of freedom tuples $(d_1, \ldots, d_K)$ is achievable, then it must satisfy the inequalities $$\sum_{j \in \mathbb{J}} \frac{d_j}{N_j^*\left(1 - \frac{N_j^*}{T_{j_{max}}}\right)} \leq 1, \quad \forall \mathbb{J} \subseteq [1:K], \quad (139)$$

where $N_j^* = \min\left\{M, N_j \left\lfloor\frac{T_j}{2}\right\rfloor\right\}$, and $j_{min}$ is the receiver with the longest coherence time in $\mathbb{J}$.

Remark 4:

The receivers of the set $\mathbb{J}$ are ordered ascendingly according to the coherence time length, i.e., $$\frac{T_k}{T_{k-1}} \in \mathbb{Z}.$$

$\mathbb{J}_{max}$ is the last receiver of the set, and $T_{j_{max}}$ is the longest coherence time in the set $\mathbb{J}$.

Proof:

To prove the Theorem, consider that for any $\mathbb{J} \subseteq [1:K]$, the degrees of freedom are bounded by the inequality of Eq. (139). First, show that for the set of receivers $\mathbb{J}$, increasing the coherence time of the receivers to be equal to the longest coherence time, i.e. $T_j = T_{j_{max}}$, $\forall j \in \mathbb{J}$ cannot reduce the degrees of freedom. The degrees of freedom region of the enhanced channel includes the original degrees of freedom region. Now, for $\mathbb{J} \subseteq [1:K]$, it can be shown that the degrees of freedom are non-decreasing with the receivers coherence times.

Lemma 2:

For a K-receiver broadcast channel with heterogeneous coherence times and without CSIT or CSIR, define $\mathcal{D}(\mathbb{J})$ to be the degrees of freedom region of a set of receivers $\mathbb{J} \subseteq [1:K]$ where the receivers are ordered ascendingly according to the coherence time length. Define $\overline{\mathcal{D}}(\mathbb{J})$ to be the degrees of freedom region of the same set of receivers $\mathbb{J}\subseteq[1:K]$ where the receivers have the coherence time of the longest receiver, i.e., $T_j=T_{j_{max}}$, $\forall j\in\mathbb{J}$. Thus, $$\mathcal{D}(\mathbb{J})\subseteq\overline{\mathcal{D}}(\mathbb{J}) \qquad (140)$$

The proof of Lemma 2 is provided below. Using Lemma 2, the degrees of freedom region for every set of receivers $\mathbb{J}\subseteq[1:K]$ is included in the degrees of freedom region of an enhanced channel with identical coherence times of length $T_{j_{max}}$ slots. Furthermore, Theorem 1 shows that the degrees of freedom region of the enhanced channel is tight against TDMA inner bound. Thus, the region in Eq. (139) is obtained, and hence, the proof of Theorem 3 is completed.

D. Optimality

For four cases, the achievable degrees of freedom region in Section III-B and the outer degrees of freedom region obtained in Section III-C are tight. In the four cases, the coherence time is at least twice the number of transmit and receive antennas, i.e., $T_j \geq 2\max\{M, N_j\}$.

Case 1—the Transmitter has Fewer Antennas:

When $M\leq\min_j\{N_j\}$, the outer degrees of freedom region given by Eq. (139) is $$\sum_{j\in\mathbb{J}} d_j \leq M\left(1-\frac{M}{T_{j_{max}}}\right), \quad \forall \mathbb{J}\subseteq[1:K]. \qquad (141)$$

The achievable degrees of freedom tuples in Eq. (137) are $$d_j = \begin{cases} M\left(1-\frac{M}{T_j}\right), & j=j_{min} \\ M^2\left(\frac{1}{T_{j-1}}-\frac{1}{T_j}\right), & j\neq j_{min} \end{cases}, j\in\mathbb{J}. \qquad (142)$$

Hence, (143)

$$\sum_{j\in\mathbb{J}} d_j = M\left(1-\frac{M}{T_{j_{min}}}\right) + \sum_{j\in\mathbb{J},j\neq j_{min}} M^2\left(\frac{1}{T_{j-1}}-\frac{1}{T_j}\right) \stackrel{(a)}{=}$$
$$M\left(1-\frac{M}{T_{j_{min}}}\right) + M^2\left(\frac{1}{T_{j_{min}}}-\frac{1}{T_{j_{max}}}\right) = M\left(1-\frac{M}{T_{j_{max}}}\right),$$

where (a) follows from the telescoping sum. Thus, the achievable degrees of freedom tuples are at the boundaries of the outer degrees of freedom region, consequently, the convex hull of the achievable degrees of freedom tuples is tight against the outer degrees of freedom region.

Case 2—the Receivers have Equal Number of Antennas:

When $N_k=N$, $\forall k$, the outer degrees of freedom region given in Eq. (139) is $$\sum_{j\in\mathbb{J}} d_j \leq N^*\left(1-\frac{N^*}{T_{j_{max}}}\right), \quad \mathbb{J}\subseteq[1:K]. \qquad (144)$$

The achievable degrees of freedom tuples in Eq. (137) are $$d_j = \begin{cases} N^*\left(1-\frac{N^*}{T_j}\right), & j=j_{min} \\ N^{*2}\left(\frac{1}{T_{j-1}}-\frac{1}{T_j}\right), & j\neq j_{min} \end{cases}, j\in\mathbb{J}. \qquad (145)$$

Hence, (146)

$$\sum_{j\in\mathbb{J}} d_j = N^*\left(1-\frac{N^*}{T_{j_{min}}}\right) + \sum_{j\in\mathbb{J},j\neq j_{min}} N^{*2}\left(\frac{1}{T_{j-1}}-\frac{1}{T_j}\right) \stackrel{(a)}{=}$$
$$N^*\left(1-\frac{N^*}{T_{j_{min}}}\right) + N^{*2}\left(\frac{1}{T_{j_{min}}}-\frac{1}{T_{j_{max}}}\right) = N^*\left(1-\frac{N^*}{T_{j_{max}}}\right).$$

The achievable degrees of freedom tuples are at the boundaries of the outer degrees of freedom region, thus the outer degrees of freedom region is tight.

Case 3—the Coherence Times of the Receivers are Very Large Compared to the Coherence Time of One Receiver:

When $T_j\gg T_1$, where $j=2,\ldots,K$, the outer region given in Eq. (139) is $$d_1 \leq N_1^*\left(1-\frac{N_1^*}{T_1}\right), \qquad (147)$$

$$\sum_{j\in\mathbb{J}} \frac{d_j}{N_j^*} \leq 1, \quad \mathbb{J}\subseteq[1:K].$$

The achievable degrees of freedom tuples in Eq. (136), $\mathbb{D}_1(\mathbb{J})$, are $$d_j = \begin{cases} N^*\left(1-\frac{N^*}{T_j}\right), & j=j_{min} \\ \frac{N_{j_{min}}^* N_j^*}{T_{j-1}}, & j\neq j_{min} \end{cases}, j\in\mathbb{J}. \qquad (148)$$

Therefore, (149)

$$\sum_{j\in\mathbb{J}} \frac{d_j}{N_j^*} \approx 1 - \frac{N_{j_{min}}^*}{T_{j_{min}}} + \frac{N_{j_{min}}^*}{T_{j_{min}}} = 1,$$

and the achievable degrees of freedom region is tight.

Case 4—The Receivers have Identical Coherence Time:

In the case of identical coherence times, it was shown in Section II that the degrees of freedom region is tight against TDMA. When $T_k=T, \forall k$, the outer region given in Eq. (139) is $$\sum_{j\in\mathbb{J}} \frac{d_j}{N_j^*\left(1-\frac{N_j^*}{T}\right)} \leq 1, \quad \forall\mathbb{J}\subseteq[1:K], \qquad (150)$$

which is the same as the TDMA degrees of freedom region. In this case, the achievable degrees of freedom tuples in Eq. (137), $\mathbb{D}_2(\mathbb{J})$, are reduced to TDMA.

E. Numerical Examples

Consider a single-antenna two-receiver broadcast channel, i.e. $M=N_1=N_2=1$ with coherence times $T_1=2$ and $T_2=4$ slots. Thus, in this case, there are four possibilities of $\mathbb{J}$: { }, {1}, {2}, {1,2}. According to Theorem 3, the outer degrees of freedom region is given by $$d_1 \le 1/2,$$
$$d_1 + d_2 \le 3/4.$$

The achievable degrees of freedom tuples $$\mathbb{D}_1(\mathbb{J}) = \mathbb{D}_2(\mathbb{J}): (0, 0), \left(\frac{1}{2}, 0\right), \left(0, \frac{3}{4}\right)\left(\frac{1}{2}, \frac{1}{4}\right). \tag{151}$$

Figure 14:
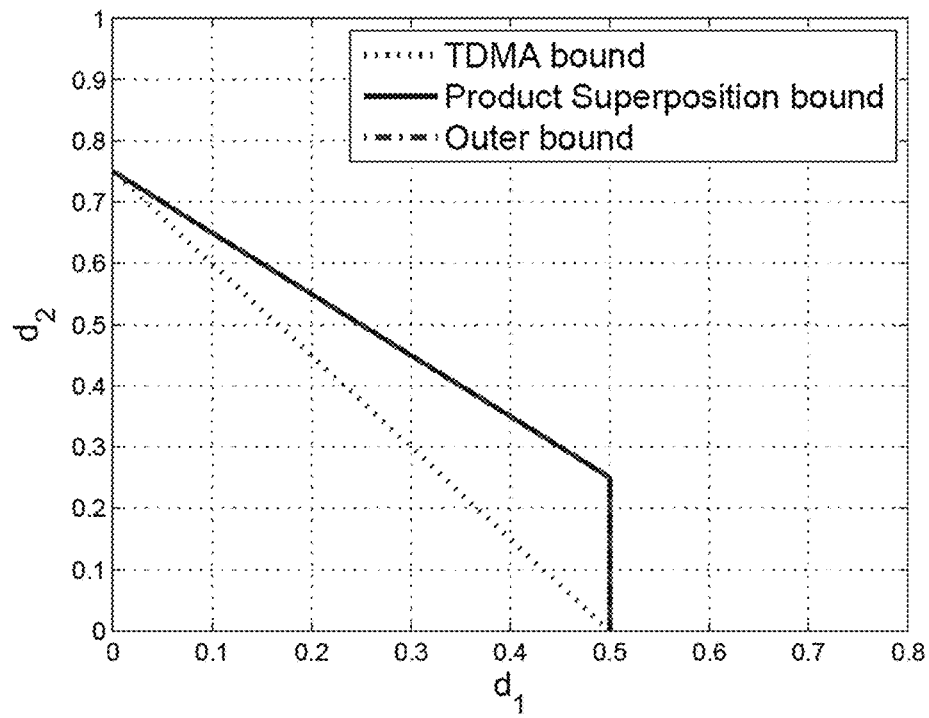
FIGS. 14-16 are plots illustrating examples of degrees of freedom region of a two-receiver broadcast channel with heterogeneous coherence times, in accordance with various embodiments of the present disclosure.

FIG. 14 shows an example of the degrees of freedom region of a two-receiver broadcast channel with heterogeneous coherence times where $M=N_1=N_2=1$, $T_1=2$, $T_2=4$. As shown in FIG. 14, the outer and the achievable regions coincide on each other.

For a two-receiver broadcast channel with $M=2$, $N_1=1$, $N_2=3$, and $T_1=4$, $T_2=24$, the outer degrees of freedom is given by $$d_1 \le \frac{18}{24},$$
$$\frac{d_1}{23/24} + \frac{d_2}{44/24} \le 1.$$

Furthermore, $$\mathbb{D}_1(\mathbb{J}): (0, 0), \left(\frac{18}{24}, 0\right), \left(0, \frac{44}{24}\right), \left(\frac{17}{24}, \frac{10}{24}\right),$$

$$\mathbb{D}_2(\mathbb{J}): (0, 0), \left(\frac{18}{24}, 0\right), \left(0, \frac{44}{24}\right), \left(\frac{18}{24}, \frac{5}{24}\right).$$

Figure 15:
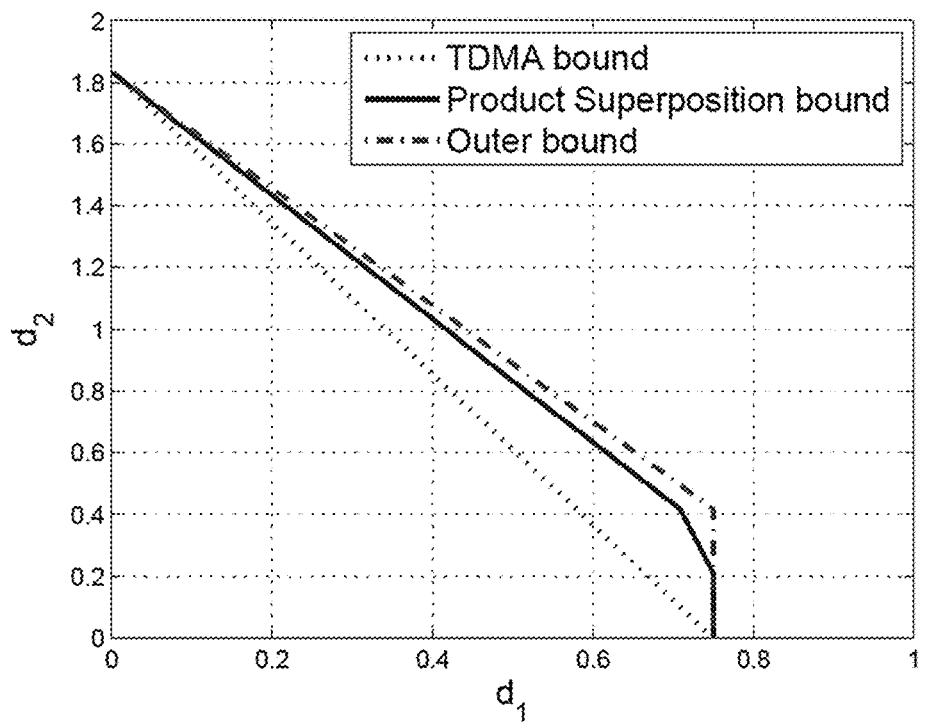

FIG. 15 shows an example of the degrees of freedom region of a two-receiver broadcast channel with heterogeneous coherence times where $M=2$, $N_1=1$, $N_2=3$, $T_1=4$, $T_2=24$. FIG. 15 illustrates the gap between the outer and the achievable bounds.

Furthermore, for a two-receiver broadcast channel with $M=2$, $N_1=1$, $N_2=3$ and $T_1=4$ and $T_2=40$, the outer degrees of freedom region is given by $$d_1 \le \frac{30}{40},$$
$$\frac{d_1}{39/40} + \frac{d_2}{76/40} \le 1.$$

For the achievable region in Theorem 2, $$\mathbb{D}_1(\mathbb{J}): (0, 0), \left(\frac{30}{40}, 0\right), \left(0, \frac{76}{40}\right), \left(\frac{30}{40}, \frac{9}{40}\right)$$

$$\mathbb{D}_2(\mathbb{J}): \left(\frac{12}{16}, 0\right), \left(0, \frac{28}{16}\right), \left(\frac{29}{40}, \frac{18}{40}\right).$$

Figure 16:
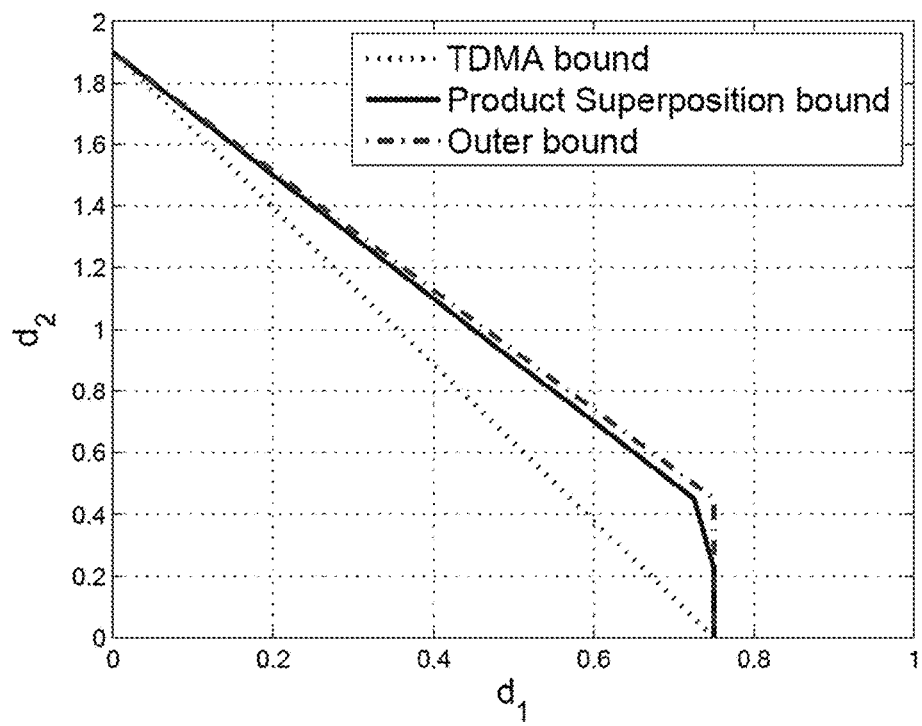

FIG. 16 shows an example of the degrees of freedom region of a two-receiver broadcast channel with heterogeneous coherence times where $M=2$, $N_1=1$, $N_2=3$, $T_1=4$, $T_2=40$. FIG. 16 shows the gap between the achievable and the outer regions which is decreased with the increase of the ratio between the coherence times, $$\frac{T_2}{T_1}.$$

Now consider a three-receiver broadcast channel with $M=4$, $N_z=N_2=N_3=2$ and $T_1=6$, $T_2=18$, $T_2=54$. When the receivers have equal number of antennas, as discussed in Section III-D, the achievable degrees of freedom and outer regions are tight. The outer degrees of freedom region is $$d_1 \le \frac{5}{6},$$
$$\frac{d_1}{17/18} + \frac{d_2}{32/18} \le 1,$$
$$\frac{d_1}{53/54} + \frac{d_2}{104/54} + \frac{d_3}{153/54} \le 1.$$

For the achievable degrees of freedom region, there are 8 possibilities for $\mathbb{J}$:

{ }, {1}, {2}, {3}, {1,2}, {1,3}, {2,3}, {1,2,3}.

Hence, $$\mathbb{D}_1(\mathbb{J}): (0,0,0), \left(\frac{5}{6},0,0\right), \left(0,\frac{32}{18},0\right), \left(0,0,\frac{153}{154}\right), \left(\frac{14}{18},\frac{4}{18},0\right),$$

$$\left(\frac{43}{54},0,\frac{24}{54}\right), \left(0,\frac{94}{54},\frac{12}{54}\right), \left(\frac{13}{18},\frac{4}{18},\frac{6}{54}\right).$$

$$\mathbb{D}_2(\mathbb{J}): (0,0,0), \left(\frac{5}{6},0,0\right), \left(0,\frac{32}{18},0\right), \left(0,0,\frac{153}{154}\right), \left(\frac{5}{6},\frac{2}{18},0\right),$$

$$\left(\frac{5}{6},0,\frac{8}{54}\right), \left(0,\frac{32}{18},\frac{8}{54}\right), \left(\frac{5}{6},\frac{2}{18},\frac{2}{54}\right).$$

Figure 17:
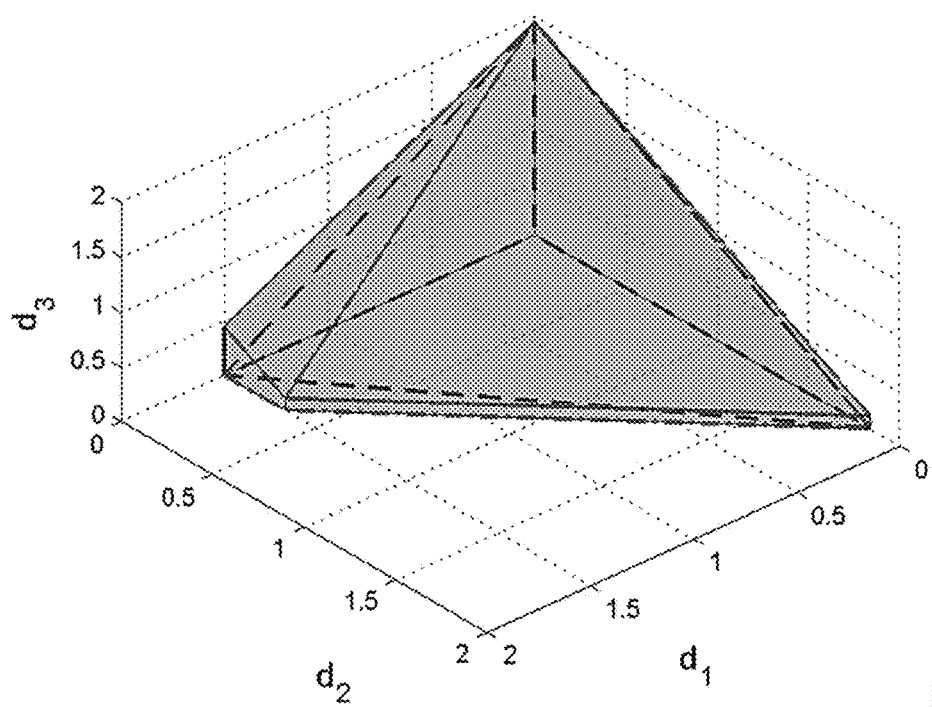
FIG. 17 is a plot illustrating an example of degrees of freedom region of a three-receiver broadcast channel with heterogeneous coherence times, in accordance with various embodiments of the present disclosure.

FIG. 17 shows an example of the degrees of freedom region of a three-receiver broadcast channel with heterogeneous coherence times where $M=4$, $N_1=N_2=N_3=2$, $T_1=8$, $T_2=24$, $T_2=72$. FIG. 17 shows the achievable degrees of freedom region (shaded area), the TDMA achievable region (dashed lines), and furthermore, the tight outer degrees of freedom region (solid lines).

IV. Proof for Theorem 2

Achievable rates under coherence diversity for a general K-receiver broadcast channel are attained by finding the best opportunities to re-use certain slots. Because the number of such opportunities blows up with K, the central idea behind finding such opportunities are not easily visible in the general case of K receivers, where the achievable rates are eventually described via an inductive process. To highlight the ideas in the achievable rate methodology, these ideas are developed through an example of 3 receivers, which is the smallest number of receivers where the full richness of these interactions manifest themselves. The K-receiver result is described in its full generality.

A. Achievability for Three Receivers

In the case of three receivers, there are 8 possible receivers sets J: one empty set { } achieving the trivial degrees of freedom tuple (0,0,0), three single receiver sets: {1}, {2}, {3}, three two-receiver sets: {1,2}, {1,3}, {2,3}, and one three-receiver set {1,2,3}. In the sequel, the achievability of $\mathbb{D}_1(\mathbb{J})$ is first shown, followed by the achievability of $\mathbb{D}_2(\mathbb{J})$.

$\mathbb{D}_1(\mathbb{J})$ Achievability:

For the three single-receiver sets, it is possible to achieve the three degrees of freedom tuples $$\left(N_1^*\left(1-\frac{N_1^*}{T_1}\right), 0, 0\right), \left(0, N_2^*\left(1-\frac{N_2^*}{T_2}\right), 0\right), \left(0, 0, N_3^*\left(1-\frac{N_3^*}{T_3}\right)\right), \quad (152)$$

by serving only one receiver while the other receivers remain unserved. In particular, for receiver k=1,2,3, every $T_k$ slots, a training sequence is sent during $N_k^*$ slots and then data for receiver k is sent during the remaining $$T_k - N_k^* \text{ slots. } N_k^*\left(1-\frac{N_k^*}{T_k}\right)$$

is achieved for receiver k whereas the other receivers achieve zero degrees of freedom.

For the three two-receiver sets, two receivers are being served while the third receiver remains unserved. Using product superposition for two receivers, the degrees of freedom tuples are $$\left(N_1^*\left(1-\frac{N_1^*}{T_1}\right) - \frac{N_1^*(\min\{M, \max\{N_1, N_2\}, T_1\} - N_1^*)}{T_2}, \right. \quad (153)$$
$$\left. N_1^*\min\{M, N_2, T_1\}\left(\frac{1}{T_1} - \frac{1}{T_2}\right), 0\right),$$

$$\left(N_1^*\left(1-\frac{N_1^*}{T_1}\right) - \frac{N_1^*(\min\{M, \max\{N_1, N_3\}, T_1\} - N_1^*)}{T_3}, \right. \quad (154)$$
$$\left. 0, N_1^*\min\{M, N_3, T_1\}\left(\frac{1}{T_1} - \frac{1}{T_3}\right)\right),$$

$$\left(0, N_2^*\left(1-\frac{N_2^*}{T_2}\right) - \frac{N_2^*(\min\{M, \max\{N_2, N_3\}, T_2\} - N_2^*)}{T_3}, \right. \quad (155)$$
$$\left. N_2^*\min\{M, N_3, T_2\}\left(\frac{1}{T_2} - \frac{1}{T_3}\right)\right).$$

To achieve Eq. (153), product superposition transmission is as follows.

Every $T_2$-length interval is divided into $T_1$-length subintervals.

During the first subinterval, a training sequence is sent during $\min\{M, \max\{N_1, N_2\}, T_1\}$ slots for receiver 1 and receiver 2 channel estimation. After that, data for receiver 1 is sent during the following $T_1-\min\{M, \max\{N_1, N_2\}, T_1\}$ slots. Receiver 1 achieves $N_1^*(T_1-\min\{M, \max\{N_1, N_2\}, T_1\})$ degrees of freedom.

During the remaining subintervals, the transmitter sends, every $T_1$ slots, $$X_i^{(12)} = [V_i, V_i U_i], \quad i = 1, \ldots, \frac{T_2}{T_1} - 1, \quad (156)$$

where $U_i \in \mathbb{C}^{N_1^* \times (T_1 - N_1^*)}$, $V_i \in \mathbb{C}^{M \times N_1^*}$ are data matrices for receiver 1, and receiver 2, respectively. Thus, receiver 1 estimates its equivalent channel $\overline{H}_{1,i} = H_{1,i} V_i$, and decodes $U_i$ achieving $$\left(\frac{T_2}{T_1} - 1\right)N_1^*(T_1 - N_1^*)$$

degrees of freedom. Furthermore, the channel of receiver 2 remains constant and known, hence, $V_i$ can be decoded coherently at receiver 2 achieving $$\left(\frac{T_2}{T_1} - 1\right)N_1^*\min\{M, N_2, T_1\}$$

degrees of freedom since when $N_2 \geq T_1$, receiver 2 estimates only $T_1$ antennas during the first subinterval.

Thus, by the above product superposition scheme, for every $T_2$ slots, receiver 1 achieves $$\frac{T_2}{T_1}N_1^*(T_1 - N_1^*) - N_1^*(\min\{M, \max\{N_1, N_2\}, T_1\} - N_1^*)$$

degrees of freedom, and furthermore, receiver 2 achieves $$\left(\frac{T_2}{T_1} - 1\right)N_1^*\min\{M, N_2, T_1\}$$

degrees of freedom obtaining Eq. (153).

For achieving (154), product superposition transmission is as follows.

Every $T_3$-length interval is divided into $T_1$-length subintervals.

During the first subinterval, a training sequence is sent during $\min\{M, \max\{N_1, N_3\}, T_1\}$ slots for receiver 1 and receiver 3 channel estimation. After that, data for receiver 1 is sent during the following $T_1-\min\{M, \max\{N_1, N_3\}, T_1\}$ slots. Receiver 1 achieves $N_1^*(T_1-\min\{M, \max\{N_1, N_3\}, T_1\})$ degrees of freedom.

During the remaining subintervals, every $T_1$ slots, the transmitted signal is similar to Eq. (156), yet, after replacing $V_i$ with $W_i$ which contains data for receiver 3. Receiver 1, and receiver 3 achieve $$\left(\frac{T_3}{T_1} - 1\right)N_1^*(T_1 - N_1^*)$$

and $$\left(\frac{T_3}{T_1} - 1\right)N_1^*\min\{M, N_3, T_1\}$$

degrees of freedom, respectively.

Thus, for every $T_3$ slots, receiver 1 achieves $$\frac{T_3}{T_1}N_1^*(T_1 - N_1^*) - N_1^*(\min\{M, \max\{N_1, N_3\}, T_1\} - N_1^*)$$

degrees of freedom, and furthermore, receiver 3 achieves $$\left(\frac{T_3}{T_1} - 1\right)N_1^*\min\{M, N_3, T_1\}$$

degrees of freedom obtaining Eq. (154).

Similar to the degrees of freedom tuples (38) and (39), we can achieve (40) by the same transmission strategy, yet, with respect to $T_2$ and $T_3$. Thus, every $T_3$ slots, receiver 2 achieves $$\frac{T_3}{T_2}N_2^*(T_2-N_2^*)-N_2^*(\min\{M,\max\{N_2,N_3\},T_2\}-N_2^*)$$

degrees of freedom, and furthermore, receiver 3 achieves $$\left(\frac{T_3}{T_2}-1\right)N_1^*\min\{M,N_3,T_2\}$$

degrees of freedom.

Now the remaining degrees of freedom tuple is the one with the three-receiver set $\{1,2,3\}$. In this case, the achievable degrees of freedom tuples are $$\left(N_1^*\left(1-\frac{N_1^*}{T_1}\right)-\frac{N_1^*(\min\{M,\max\{N_1,N_2,N_3\},T_1\}-N_1^*)}{T_2},\right.$$
$$\left. N_1^*\min\{M,N_2,T_1\}\left(\frac{1}{T_1}-\frac{1}{T_2}\right), N_1^*\min\{M,N_3,T_1\}\left(\frac{1}{T_2}-\frac{1}{T_3}\right)\right),$$

which can be achieved by product superposition as follows.

Every $T_3$-length interval is divided into $T_2$-length subintervals.

During the first subinterval, the transmitted signal is the same as that used to achieve Eq. (153). Thus, receiver 1 achieves $$\frac{T_2}{T_1}N_1^*(T_1-N_1^*)-N_1^*(\min\{M,\max\{N_1,N_2\},T_1\}-N_1^*)$$

degrees of freedom, receiver 2 achieves $$\left(\frac{T_2}{T_1}-1\right)N_1^*\min\{N_2^*,T_1\}$$

degrees of freedom, and furthermore, receiver 3 estimates its channel.

During the remaining $$\left(\frac{T_3}{T_2}-1\right)$$

subintervals, the transmitter sends, every $T_2$-length subinterval, the same signal that achieves Eq. (153) after multiplying it from the left by $W_i$ which contains data for receiver 3. Therefore, during the first $T_1$ of every $T_2$-length subinterval, the transmitted signal is $$X^{(123)}=[W_i,W_iU_i]. \quad (157)$$

After that during $$\left(\frac{T_2}{T_1}-1\right)T_1$$

slots, the transmitted signal is $$\tilde{X}^{(123)}=[W_iV_i,W_iV_iU_i]. \quad (158)$$

Thus, receiver 1 can estimate the equivalent channel $\underline{H}_{1,i}=H_{1,i}W_iV_i$, and decodes $U_i$, receiver 2 can estimate $\overline{H}_{2,i}=H_{2,i}W_i$, and can decode $V_i$ and receiver 3 can decode $W_i$. Thus, receiver 1, receiver 2, and receiver 3 achieve $$\left(\frac{T_3}{T_2}-1\right)\frac{T_2}{T_1}N_1^*(T_1-N_1^*),$$

$$\left(\frac{T_3}{T_2}-1\right)\left(\frac{T_2}{T_1}-1\right)N_1^*\min\{M,N_2,T_1\} \text{ and } \left(\frac{T_3}{T_2}-1\right)N_1^*\min\{M,N_3,T_1\}$$

degrees of freedom, respectively.

Therefore, by using the above product superposition transmission scheme, the above degrees of freedom tuple can be achieved.

$\mathbb{D}_2(\mathbb{J})$ Achievability:

Similar to $\mathbb{D}_1(\mathbb{J})$, it is possible to achieve the degrees of freedom tuples of Eq. (152) that correspond to the three single-receiver sets by serving only one receiver while the other receivers remain unserved.

For the three two-receiver sets, only two receivers are being served while the third receiver remains unserved. Using product superposition for two receivers, the degrees of freedom tuples $$\left(N_1^*\left(1-\frac{N_1^*}{T_1}\right), N_1^*\min\{N_1^*,N_2\}\left(\frac{1}{T_1}-\frac{1}{T_2}\right), 0\right), \quad (159)$$

$$\left(N_1^*\left(1-\frac{N_1^*}{T_1}\right), 0, N_1^*\min\{N_1^*,N_3\}\left(\frac{1}{T_1}-\frac{1}{T_3}\right)\right), \quad (160)$$

$$\left(0, N_2^*\left(1-\frac{N_2^*}{T_2}\right), N_2^*\min\{N_2^*,N_3\}\left(\frac{1}{T_2}-\frac{1}{T_3}\right)\right), \quad (161)$$

are achieved as follows. To achieve Eq. (159), the product superposition transmission strategy is as follows.

Every $T_2$-length interval is divided into $T_1$-length subintervals.

During the first $T_1$-length subinterval, a training sequence is sent during $N_1^*$ slots and data for receiver 1 is sent during the following $T_1-N_1^*$ slots. Receiver 1 achieves $N_1^*(T_1-N_1^*)$ degrees of freedom, and receiver 2 estimates its channel between $\min\{N_1^*, N_2\}$ transmit antennas.

During the remaining subintervals, every $T_1$ slots, the transmitter sends $$X_i^{(12)}=[V_i,V_iU_i], \quad i=1,\ldots,\frac{T_2}{T_1}-1, \quad (162)$$

Thus, receiver 1, and receiver 2 achieve $$\left(\frac{T_2}{T_1}-1\right)N_1^*(T_1-N_1^*), \text{ and } \left(\frac{T_2}{T_1}-1\right)N_1^*\min\{N_1^*,N_2\}$$

degrees of freedom, respectively.

Thus, by the above product superposition scheme, for every $T_2$ slots, receiver 1, and receiver 2 achieve $$\frac{T_2}{T_1}N_1^*(T_1-N_1^*), \text{ and } \left(\frac{T_2}{T_1}-1\right)N_1^*\min\{N_1^*,N_2\}$$

degrees of freedom, respectively obtaining Eq. (159).

For achieving Eq. (160) by product superposition, the same transmission scheme of achieving Eq. (159) can be used with respect to receiver 1 and receiver 3, i.e. replacing $T_2$, min$\{N_1^*, N_2\}$ with $T_3$, min$\{N_1^*, N_3\}$, respectively. Thus, receiver 1, and receiver 3 achieve $$\frac{T_3}{T_1}N_1^*(T_1-N_1^*), \text{ and } \left(\frac{T_3}{T_1}-1\right)N_1^*\min\{N_1^*,N_3\}$$

degrees of freedom, respectively, for every $T_3$ slots. Similarly, Eq. (161) can be achieved by the same transmission strategy, yet, with respect to $T_2$ and $T_3$.

For the three-receiver set, the achievable degrees of freedom tuples are $$\left(N_1^*\left(1-\frac{N_1^*}{T_1}\right), N_1^*\min\{N_1^*,N_2\}\left(\frac{1}{T_1}-\frac{1}{T_2}\right), N_1^*\min\{N_1^*,N_3\}\left(\frac{1}{T_2}-\frac{1}{T_3}\right)\right),$$

which can be achieved by product superposition for the three receivers as follows.

Every $T_3$-length interval is divided into $T_2$-length subintervals.

During the first subinterval, the transmitted signal is the same as that used to achieve Eq. (159). Thus, receiver 1, and receiver 2 achieves $$\frac{T_2}{T_1}N_1^*(T_1-N_1^*),$$

and $$\left(\frac{T_2}{T_1}-1\right)N_1^*\min\{N_1^*,N_2\}$$

degrees of freedom, and furthermore, receiver 3 estimates its channel between min$\{N_1^*, N_3\}$ transmit antennas.

During the remaining $$\left(\frac{T_3}{T_2}-1\right)$$

subintervals, the transmitter sends, every $T_2$-length subinterval, the same signal that achieves Eq. (159) after multiplying it from the left by $W_i$ which contains data for receiver 3. Therefore, during the first $T_1$ of every $T_2$-length subinterval, the transmitted signal is $$X^{(123)}=[W_i,W_iU_i]. \quad (163)$$

After that during $$\left(\frac{T_2}{T_1}-1\right)$$

$T_1$ slots, the transmitted signal is $$\tilde{X}^{(123)}=[W_iV_i,W_iV_iU_i]. \quad (164)$$

Thus, receiver 1 can estimate the equivalent channel $\underline{H}_{1,i}=H_{1,i}W_iV_i$, and decodes $U_i$. Also, receiver 2 can estimate $\overline{H}_{2,i}=H_{2,i}W_i$, and decode $V_i$ and furthermore, receiver 3 can decode $W_i$. Receiver 1, receiver 2, and receiver 3 achieve $$\left(\frac{T_3}{T_2}-1\right)\frac{T_2}{T_1}N_1^*(T_1-N_1^*), \left(\frac{T_3}{T_2}-1\right)\left(\frac{T_2}{T_1}-1\right)N_1^*\min\{N_1^*,N_2\} \text{ and}$$

$$\left(\frac{T_3}{T_2}-1\right)N_1^*\min\{N_1^*,N_3\}$$

degrees of freedom, respectively.

Therefore, the above degrees of freedom tuples can be obtained.

B. Achievability for K Receivers

To obtain the achievability for the K-receiver case, it can be shown that for every set of receivers $\mathbb{J}\subseteq[1:K]$, ordered ascendingly according to the coherence time length, the degrees of freedom tuples $\mathbb{D}_1(\mathbb{J})$ and $\mathbb{J}_2(\mathbb{D})$ are achievable. An induction argument is used in the proof as follows. First, the achievability when $\mathbb{J}$ has only three receivers was shown in Section IV. In the sequel, the rest of the proof is dedicated to show that for arbitrary set of receivers, $\mathbb{J}\subseteq[1:K]$ where the receivers are ordered ascendingly according to the coherence time length, the product superposition achieves the degrees of freedom tuples $\mathbb{D}_1(\mathbb{J})/\mathbb{D}_2(\mathbb{J})$, it is possible to achieve the degrees of freedom tuple $\mathbb{D}_1(\tilde{\mathbb{J}})/\mathbb{D}_2(\tilde{\mathbb{J}})$, where $\tilde{\mathbb{J}}\subseteq[1:K]$ is the set constructed by adding one more receiver to the set $\mathbb{J}$ where the length of the added receiver coherence time is an integer multiple of $j_{max}$. To complete the proof it can be shown that product superposition achieves the degrees of freedom tuples $\mathbb{D}_1(\tilde{\mathbb{J}})/\mathbb{D}_2(\tilde{\mathbb{J}})$ for the set $\tilde{\mathbb{J}}$. The following Lemma addresses this part of the proof.

Lemma 3:

For the broadcast channel considered in Section III, define $X_O \in \mathbb{C}^{T_\tau \times T_o}$ to be a pilot-based transmitted signal during $T_o$ slots where a training matrix $X_\tau \in \mathbb{C}^{T_\tau \times T_\tau}$ is sent during $T_\tau$ slots and then the data is sent during $T_O-T_\tau$ slots achieving the degrees of freedom tuple $\mathcal{D}^{(o)}=(d_1^{(o)}, d_2^{(o)}, \ldots, d_J^{(o)})$ for J receivers. It is possible to achieve $\mathcal{D}^{(o)}$ for the J receivers in addition to $$\left(\frac{T_\epsilon}{T_O}-1\right)\frac{T_\tau\min\{T_\tau,N_\epsilon^*\}}{T_\epsilon}$$

to a receiver $\epsilon$ with $T_\epsilon$-length coherence time and $N_\epsilon$ receive antennas, where $$\frac{T_\epsilon}{T_O}\in\mathbb{Z}.$$

Proof:

This can be achieved by the following product superposition transmission scheme.

Every $T_\epsilon$ slots is divided into $T_O$-length subintervals.

During the first $T_O$ subinterval, the transmitted signal is $X_O$. Thus $\mathcal{D}^{(o)}$ degrees of freedom tuple is achieved for the J receivers and no degrees of freedom for the receiver $\epsilon$, yet, it estimates its channel between min$\{N_\epsilon^*, T_\tau\}$ transmission antennas.

During the remaining subintervals, product superposition is used. Every $T_O$ slots, the transmitter sends $$\tilde{X}_o = PX_o, \quad (165)$$

where $P \in \mathbb{C}^{M \times T_\tau}$ contains data for receiver $\in$. $X_O$ contains the training matrix $X_\tau$, hence, receiver $\in$ can decode P, using its channel estimate. Furthermore, the J receivers estimate their equivalent channels and decode their data during $T_O - T_\tau$ slots. Thus, the J receivers achieve $$\left(\frac{T_\epsilon}{T_O} - 1\right) \mathcal{D}^{(o)}$$

degrees of freedom tuple and receiver $\in$ achieves $$\left(\frac{T_\epsilon}{T_O} - 1\right) T_\tau \min\{N_\epsilon^*, T_\tau\}$$

degrees of freedom.
Thus, in $T_\in$ slots, J receivers achieve $$\frac{T_\epsilon}{T_O} \mathcal{D}^{(o)}$$

degrees of freedom, and furthermore, receiver $\in$ achieves $$\left(\frac{T_\epsilon}{T_O} - 1\right) T_\tau \min\{N_\epsilon^*, T_\tau\}$$

degrees of freedom which completes the proof of Lemma 3. Using Lemma 3 the second part of the proof is completed, and hence, the proof of Theorem 2 is completed.

V. General Coherence Times

In this section, a K-receiver broadcast channel with general coherence times is examined. Achievable degrees of freedom region can be obtained, where the coherence times have arbitrary ratio or alignment. Coherence times, as is required in a block fading model in a time-sampled domain, continue to take positive integer values.

A. Unaligned Coherence Times

In this section, the assumption on the alignment of coherence intervals is relaxed. Consider a broadcast channel with K receivers where the coherence times are integer multiple of each other, i.e.

$$\frac{T_k}{T_{k-1}} \in \mathbb{Z}.$$

The coherence times have arbitrary alignment, meaning that there could be an offset between the transition times of the coherence intervals of different receivers. Recall that in the case of aligned coherence intervals, product superposition provided the achievable degrees of freedom region in Eq. (138). The receiver with longer coherence time reuses some of the unneeded pilots and achieves gains in degrees of freedom without affecting the receivers with shorter coherence times. Under unaligned coherence times the same gains in degrees of freedom are available with product superposition. Using the transmitted signal given in Section IV, the longer coherence times include the same number of unneeded pilot sequences regardless of the alignment. These unneeded pilot sequences can be reused by product superposition transmission, achieving degrees of freedom gain. For instance, if there are two receivers with M=2, $N_1=N_2=1$, $T_1=4$, $T_2=8$, with an offset of one transmission symbol as shown in FIG. 18, which illustrates product superposition transmission for unaligned coherence times. It is possible to achieve the degrees of freedom pair $$\left(\frac{3}{4}, \frac{1}{8}\right)$$

via a transmission strategy over pairs of coherence intervals for receiver 1, as follows.

In odd intervals for receiver 1, one pilot is transmitted during which both receivers estimate their channels. In the 3 remaining times in this interval, data is transmitted for receiver 1.

In the even intervals for receiver 1, during the first time slot a product superposition is transmitted providing one degree of freedom for receiver 2 (whose channel has not changed) while allowing receiver 1 to renew the estimate of his channel. The three remaining time slots provide 3 further degrees of freedom for receiver 1.

Thus, in 8 time slots, receiver 1 achieved 6 degrees of freedom and receiver 2 achieved 1. This is the same "corner point" that was obtained earlier, noting that the nature of the algorithm is not changed, only the position of the pilot transmission must be carefully chosen while keeping in mind the transition points of the block fading.

B. Unaligned Coherence Times with Perfect Symmetry (Staggered)

Now consider a special case of two-receiver unaligned coherence times where the transition of each coherence interval is exactly in the middle of the other coherence interval. This special case is motivated by blind interference alignment model in FIG. 19, and for easy reference we call this configuration a staggered coherence time. FIG. 19 shows blind interference alignment for staggered coherence times with CSIR.

Figure 20:
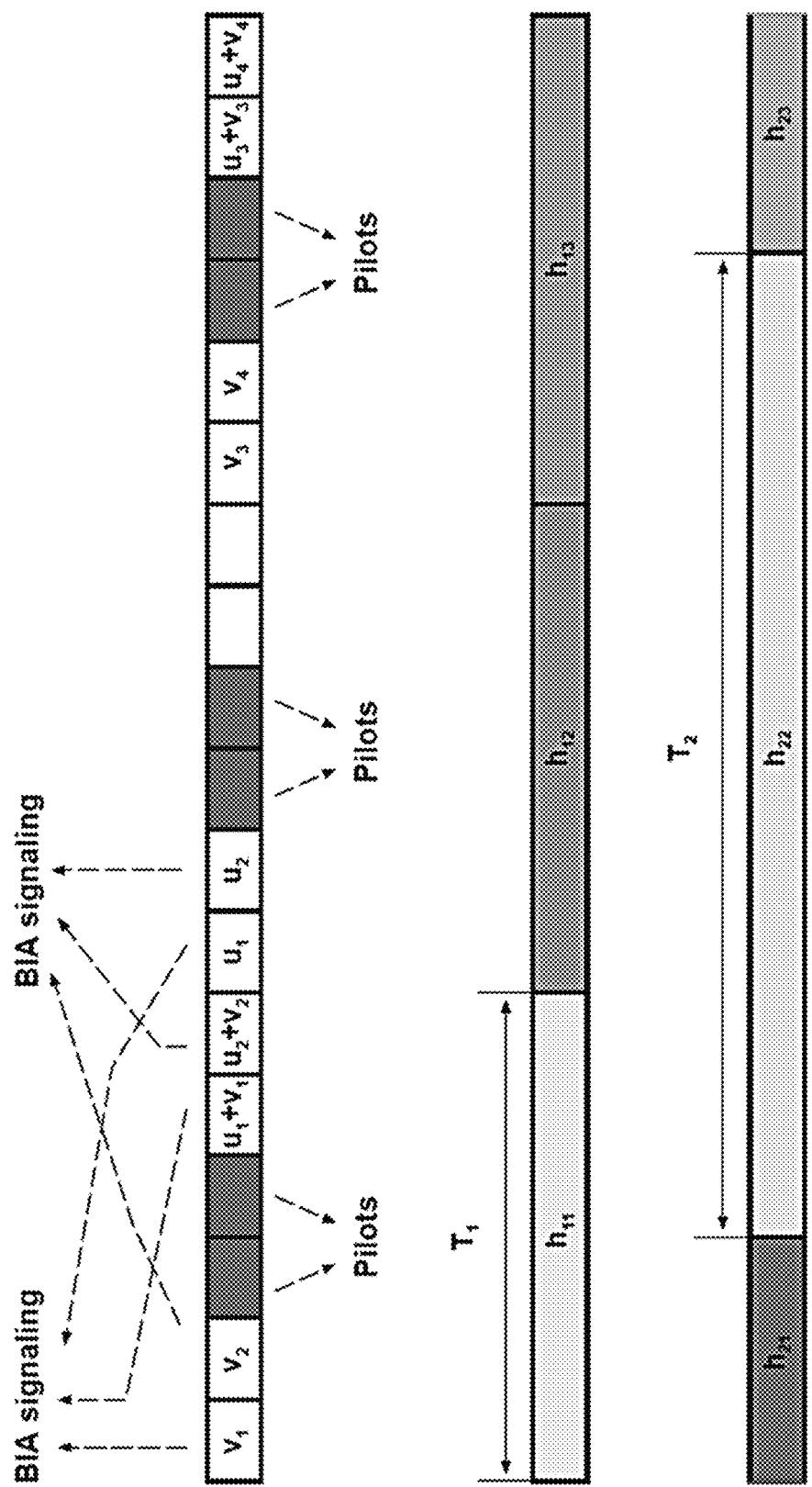
FIG. 20 graphically illustrates blind interference alignment with pilot transmission, in accordance with various embodiments of the present disclosure.
Figure 21:
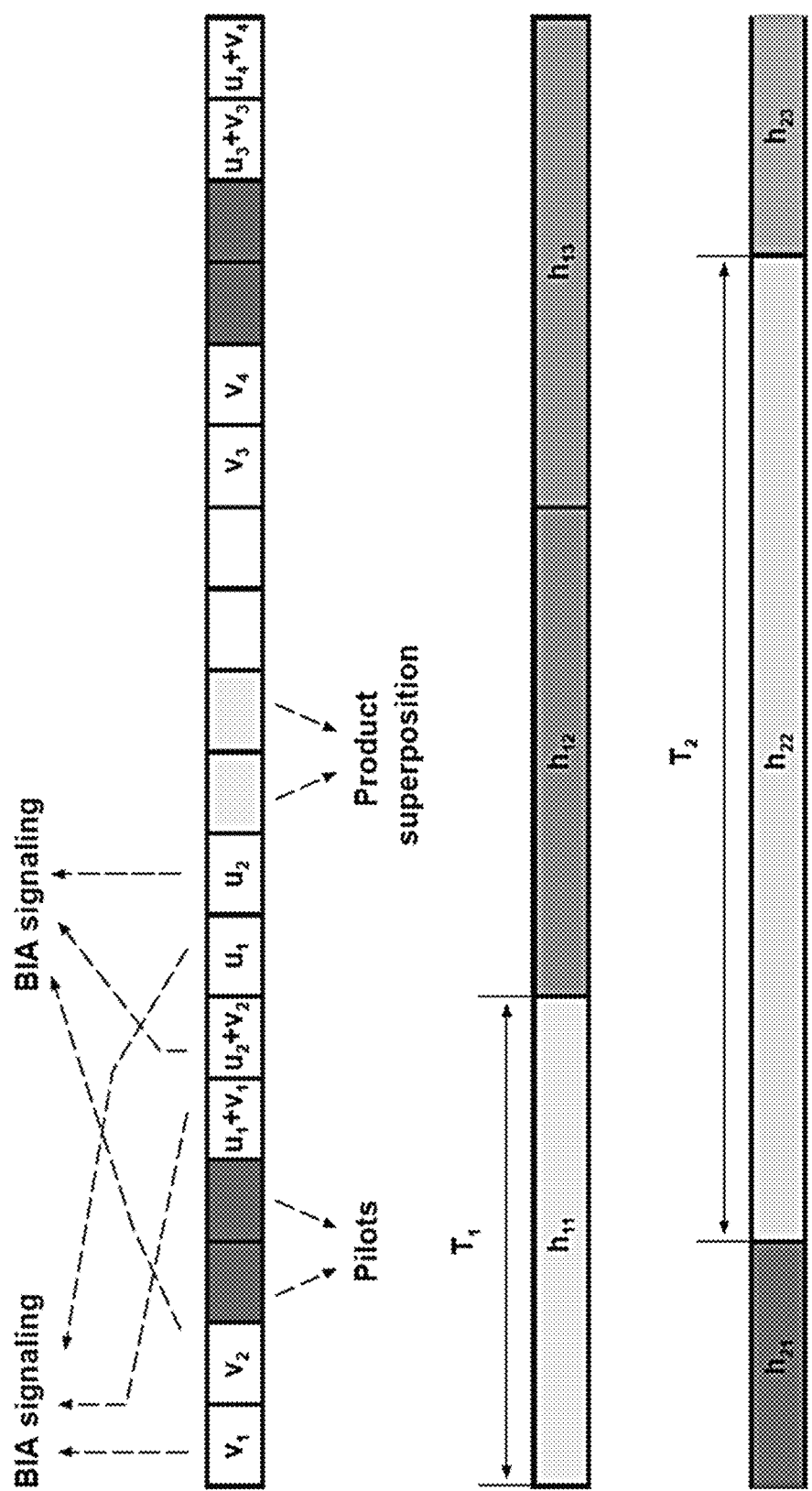
FIG. 21 graphically illustrates combining blind interference alignment with product superposition, in accordance with various embodiments of the present disclosure.

Follow the example of blind interference alignment: a 2-receiver broadcast channel with M=2, $N_1=N_2=1$. FIG. 20 illustrates blind interference alignment with pilot transmission. Receiver 1 cancels $h_{1i}^H v$, and decodes u, whereas receiver 2 cancels $h_{2i}^H u$, and decodes v. As shown in FIG. 20, the transitions of the longer coherence interval occur at the middle of the shorter coherence interval. Based on the discussion in Section V-A, product superposition can obtain degrees of freedom gain for the staggered scenario. Blind interference alignment can achieve degrees of freedom pair $$\left(\frac{2}{3}, \frac{2}{3}\right)$$

while ignoring the cost of CSIR. To allow comparison and synergy, a version of blind interference alignment with channel estimation shown in FIG. 20 is analyzed. The gain of blind interference alignment comes from the staggering of the coherence time, whereas the source of product superposition gain is reusing the unneeded pilots with respect to the longer coherence times. Therefore, it is possible to give a transmission scheme that uses both blind interference alignment and product superposition over $$\frac{T_2}{T_1}$$

coherence intervals of receiver 1, as shown in FIG. 21.

During the first 2 intervals, two pilots are sent at the middle of each interval for channel estimation. Furthermore, during the first interval and half of the second interval, $$\left(\frac{T_1}{2} - 1\right)$$

blind interference alignment signaling is sent achieving $$\left(2\left(\frac{T_1}{2} - 1\right), 2\left(\frac{T_1}{2} - 1\right)\right)$$

degrees of freedom pair. For the remaining half of the second interval, data for receiver 1 is sent achieving $$\left(\frac{T_1}{2} - 1\right)$$

further degrees of freedom.

During the remaining $$\left(\frac{T_2}{T_1} - 1\right)$$

intervals, product superposition transmission is sent achieving $$\left(\left(\frac{T_2}{T_1} - 1\right)(T_1 - 1), \left(\frac{T_2}{T_1} - 1\right)\right)$$

degrees of freedom pair.

Receiver 2 estimates its channel during the first and the last time slots of its coherence interval.

Thus, the above transmission scheme obtain the degrees of freedom pair $$\left(1 - \frac{1}{T_1} - \frac{1}{T_2} - \frac{T_1}{2T_2}, \frac{T_1}{T_2} + \frac{1}{T_1} - \frac{4}{T_2}\right). \quad (166)$$

Furthermore, product superposition can achieve the degrees of freedom pair $$\left(1 - \frac{1}{T_1}, \frac{1}{T_2} - \frac{1}{T_1}\right)$$

Hence, the achievable degrees of freedom is the convex hull of the degrees of freedom pairs achieved by blind interference alignment, product superposition, and combining blind interference alignment with product superposition.

C. Arbitrary Coherence Times

Theorem 4:

Consider a K-receiver broadcast channel without CSIT or CSIR having heterogeneous coherence times, where the coherence times are allowed to take any positive integer value. Product superposition can achieve the degrees of freedom tuple defined in Eq. (137).

Remark 5:

Blind interference alignment signaling can be sent at the location of the staggering coherence times achieving degrees of freedom gain. Hence, similar to the case of staggered coherence times with integer ratio in Section V-B, product superposition can be combined with blind interference alignment increasing the achievable degrees of freedom region.

Proof:

For clarity of explanation, we start by giving the achievable scheme for 3 receivers with $$N_k = N \le \min\left\{M, \left\lfloor\frac{T_1}{2}\right\rfloor\right\},$$

$\forall k$ over $(T_2 T_3)$ coherence intervals of receiver 1.

For every interval, a pilot sequence of length N slots, and receiver 1 data of length $T_1$–N slots are sent, achieving $N(T_1-N)$ degrees of freedom for receiver 1.

The number of pilot sequences of length N slots is $T_2 T_3$. Having coherence time $T_2$, receiver 2 needs only $T_1 T_3$ pilot sequences for channel estimation. Hence, produced superposition can be sent during $(T_2 T_3 - T_1 T_3)$ pilot sequences to send data for receiver 2 achieving $NT_3(T_2-T_1)$ degrees of freedom.

Furthermore, receiver 3 needs only $T_1 T_2$ pilot sequences for channel estimation, and hence, data signal for receiver 3 can be sent during $(T_2 T_3 - T_1 T_2)$ pilot sequences via product superposition. Since, data for receiver 2 already is sent via product superposition during $(T_2 T_3 - T_1 T_3)$ pilot sequences, receiver 3 can only reuse $(T_2 T_3 - T_1 T_2) - (T_2 T_3 - T_1 T_3) = (T_3 - T_2)T_1$ pilot sequences achieving $NT(T_3-T_2)$ degrees of freedom.

Thus, it is possible to achieve the degrees of freedom tuple $$\left(N\left(1 - \frac{N}{T_1}\right), N^2\left(\frac{1}{T_1} - \frac{1}{T_2}\right), N^2\left(\frac{1}{T_2} - \frac{1}{T_3}\right)\right). \quad (167)$$

Now, consider the proof for arbitrary number of receivers, and general antenna setup. For a set of receiver $\mathbb{J} \subseteq [1:K]$ having J receiver where $$\frac{T_j}{T_{j-1}} \in \mathbb{Q},$$

$j \in \mathbb{J}$ the degrees of freedom tuple of Eq. (137) can be obtained over $\Pi_{i=2}^J T_i$ coherence intervals of receiver $j_{min}$.

For every interval, a pilot sequence of length $N_{j_{min}}^*$ slots, and data of length $T_{j_{min}} - N_{j_{min}}^*$ for receiver $j_{min}$ are sent, achieving $N_{j_{min}}^*(T_{j_{min}} - N_{j_{min}}^*)$ degrees of freedom for receiver $j_{min}$.

The number of pilot sequences of length $N_{j_{min}}^*$ slots is $\Pi_{i=2}^J T_i$. Receiver $j=j_{min}$, with coherence time $T_j$, can estimate the channel of $\min\{N_{j_{min}}^*, N_j\}$ transmit antennas using $\Pi_{i=1, i\neq j}^J T_i$ pilot sequences. After excluding the pilots reused by receivers $i=\{j_{min}+1, \ldots, j-1\}$ to send data by product superposition transmission, data for receiver j can be sent via product superposition during $(T_j-T_{j-1})\Pi_{i=1, i\neq j, j-1}^J T_i$ pilots obtaining the degrees of freedom $N_{j_{min}}^* \min\{N_{j_{min}}^*, N_j\}(T_j-T_{j-1})\Pi_{i=1, i\neq j, j-1}^J T_i$.

Thus, the proof of Theorem 4 is completed.

VI. Multiple Access Channel with Identical Coherence Times

Consider a K-transmitter MIMO multiple access channel without CSIT or CSIR, where transmitter k is equipped with $M_k$ antennas, and the receiver is equipped with N antennas. The received signal at the discrete time n can be given by $$y(n) = \sum_{k=1}^{K} \overline{H}_k(n)x_k(n) + z(n), \tag{168}$$

where $x_k(n) \in \mathbb{C}^{M_k \times 1}$ is transmitter k transmitted signal, $z(n) \in \mathbb{C}^{N \times 1}$ is the i.i.d. Gaussian additive noise and $\overline{H}_k(n) \in \mathbb{C}^{N \times M_k}$ is transmitter k Rayleigh block-fading channel matrix with coherence time $T_k$. Consider the case when $T_k \geq 2N$, $\forall k$.

Assume that all transmitters have identical coherence time, T. In the sequel, define a degrees of freedom achievable region based on a pilot-based scheme in Section VI-A. Furthermore, an outer degrees of freedom region is given in Section VI-B based on the cooperative bound. Some numerical examples are given in Section VI-C where it is shown that the achievable and the outer degrees of freedom regions coincide at the regions of sum degrees of freedom.

A. Achievability

Theorem 5:

Consider a K-transmitter MIMO multiple access channel without CSIT or CSIR, meaning that the channel realization is not known, but the channel distribution is globally known. If the transmitters have identical coherence times, namely T, then for every ordered set of transmitters, $\mathbb{J}=\{k_1, k_2, \ldots, k_J\} \subseteq [1:K]$, we can achieve the set of degrees of freedom tuple $\mathbb{D}(\mathbb{J})$:

$$d_j = M_j'\left(1 - \frac{\sum_{j \in \mathbb{J}} M_j'}{T}\right), j \in \mathbb{J}, \tag{169}$$

where $M_j' = \min\{M_j, [N - \sum_{m=1}^{j-1} M_{k_m}']^+\}$, and $T \geq 2N$. The achievable degrees of freedom region is the convex hull of the degrees of freedom tuples, $\mathbb{D}(\mathbb{J})$, overall the $$\sum_{i=1}^{K} \frac{K!}{(K-i)!}$$

Possible ordered sets $\mathbb{J} \subseteq [1:K]$, i.e., $$\mathcal{D} = \{(d_1, \ldots, d_K) \in Co(\mathbb{D}(\mathbb{J})), \forall \mathbb{J} \subseteq [1:K]\}. \tag{170}$$

Proof:

It can be shown that a simple pilot-based scheme can achieve the above achievable degrees of freedom region. Assume an ordered set of transmitters $\mathbb{J} = \{k_1, k_2, \ldots, k_J\} \subseteq [1:K]$. In order to achieve the degrees of freedom tuple in (169), the following transmission scheme can be used.

At the beginning of every T-length interval, a training sequence of length $\sum_{j \in \mathbb{J}} M_j'$ is sent so that the receiver can estimate the channels where a $M_j'$-length training sequence is sent from transmitter j.

During the remaining $T - \sum_{j \in \mathbb{J}} M_j'$ period, simultaneously, $M_j' \times (T - \sum_{j \in \mathbb{J}} M_j')$ data matrix is sent from transmitter j. Hence, the receiver, using $\sum_{j \in \mathbb{J}} M_j'$ antennas, can invert the channel (via zero forcing) and decode the transmitted signal during $T - \sum_{j \in \mathbb{J}} M_j'$ slots.

Therefore, every T period, transmitter $j \in \mathbb{J}$ can achieve $M_j'(T - \sum_{j \in \mathbb{J}} M_j')$ degrees of freedom, and hence Eq. (169) can be obtained.

B. Outer Bound

For the considered K-transmitter multiple access channel with identical coherence times, namely T, the cooperative bound can be given by $$\sum_{j \in \mathbb{J}} R_j \leq I(X(\mathbb{J}); Y \mid X(\mathbb{J}^c)), \forall \mathbb{J} \subseteq [1:K]. \tag{171}$$

An outer bound on the degrees of freedom region is, $$\sum_{j \in \mathbb{J}} d_j \leq \min\left\{N, \sum_{j \in \mathbb{J}} M_j\right\}\left(1 - \frac{\min\left\{N, \sum_{j \in \mathbb{J}} M_j\right\}}{T}\right), \tag{172}$$

C. Numerical Examples

Consider a two-transmitter multiple access channel where the transmitters are equipped with $M_1=3$, $M_2=2$ antennas and the receiver is equipped with $N_2=4$ antennas. The coherence time of the two transmitters is T=10 slots. Thus, the outer degrees of freedom region is given by $$d_1 \leq \frac{21}{10},$$

$$d_2 \leq \frac{16}{10},$$

$$d_1 + d_2 \leq \frac{24}{10}.$$

Figure 22:
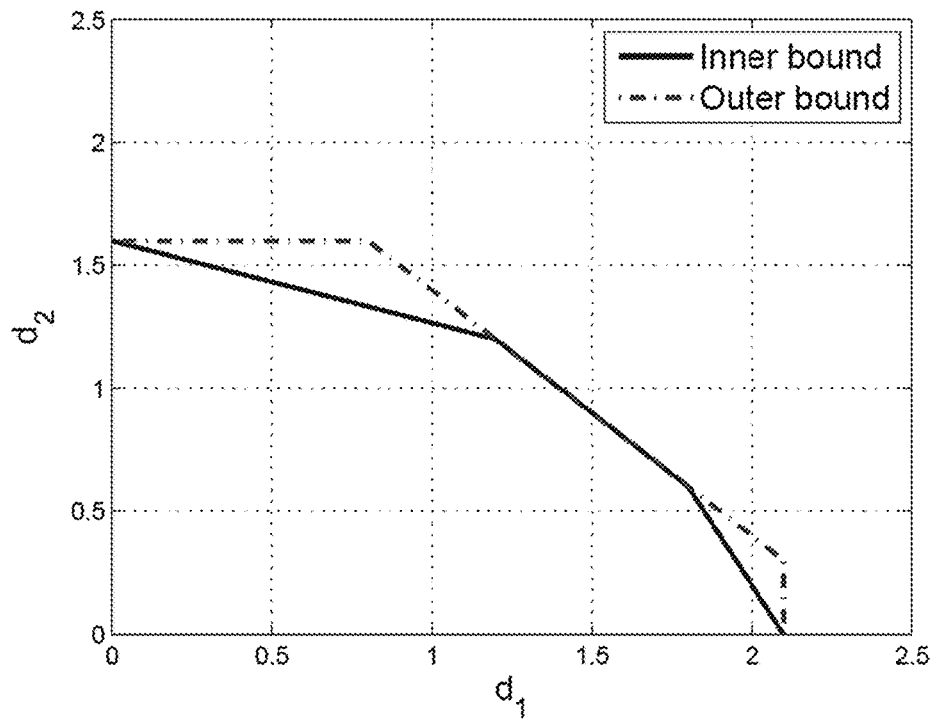
FIGS. 22 and 23 are plots illustrating examples of degrees of freedom region of a two-transmitter multiple access channel with identical coherence times, in accordance with various embodiments of the present disclosure.

The achievable degrees of freedom pairs in Theorem 5 can be obtained as follows. For the case of two transmitters, there are 5 ordered sets of transmitters $\mathbb{J}$: $\{\ \}$, $\{1\}$, $\{2\}$, $\{1,2\}$ and $\{2,1\}$. For $\{\ \}$, the trivial degrees of freedom pair $(0,0)$ can be obtained. For the two sets $\{1\}$, $\{2\}$, the degrees of freedom pairs $$\left(\frac{21}{10}, 0\right)$$

and $$\left(0, \frac{16}{10}\right),$$

respectively, can be obtained. For the two sets {1,2} and {2,1}, the degrees of freedom pairs $$\left(\frac{18}{10}, \frac{6}{10}\right)$$

and $$\left(\frac{12}{10}, \frac{12}{10}\right),$$

respectively, can be obtained. FIG. 22 shows an example of degrees of freedom region of a two-transmitter multiple access channel with identical coherence times where $M_1=3$, $M_2=2$, $N=4$, $T=10$. The convex hull of the achieved degrees of freedom pairs gives the achievable degrees of freedom region which is tight against the sum degrees of freedom as shown in FIG. 22.

Figure 23:
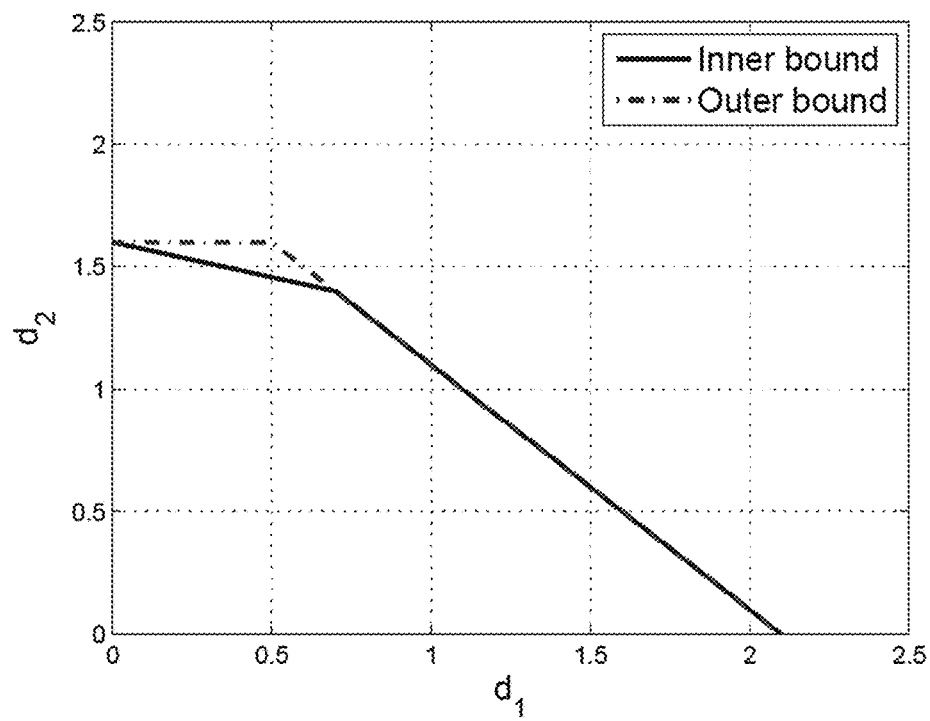

Consider a two-transmitter multiple access channel where the transmitters are equipped with $M_1=4$, $M_2=2$ antennas and the receiver is equipped with $N=3$ antennas. The coherence time of the two transmitters is $T=10$ slots. FIG. 23 shows an example of degrees of freedom region of a two-transmitter multiple access channel with identical coherence times where $M_1=4$, $M_2=2$, $N=3$, $T=10$. As shown in FIG. 23, the achievable degrees of freedom regions are tight against the sum degrees of freedom.

VII. Multiple Access Channel with Heterogeneous Coherence Times

Consider the multiple access channel defined in (53) where there is no CSIT or CSIR. Consider the case where the receivers coherence times are perfectly aligned and integer multiples of each other, i.e., $\forall k$, $$\frac{T_k}{T_{k-1}} \in \mathbb{Z}.$$

In the sequel, an achievable degrees of freedom region and an outer degrees of freedom region are given in Section VII-A and Section VII-B, respectively. Also, some numerical examples are given in Section VII-C to demonstrate the achievable and the outer degrees of freedom regions.

A. Achievability

Theorem 6:

Consider a K-transmitter MIMO multiple access channel without CSIT or CSIR, meaning that the channel realization is not known, but the channel distribution is globally known. Furthermore, the transmitters coherence times are assumed to be perfectly aligned and integer multiples of each other. Define $\mathbb{J} = \{i_1, \ldots, i_J\} \subseteq [1:K]$ to be a set of J transmitters where $\forall j \in \mathbb{J}$, $$\frac{T_j}{T_{j-1}} \in \mathbb{Z},$$

Define $\tilde{\mathbb{J}} = \{k_1, \ldots, k_J\}$ to be one of the J!possible ordered sets of $\mathbb{J}$. If $T_k \geq 2N$, $\forall k$, it is possible to achieve the set of degrees of freedom tuples $\mathbb{D}(\tilde{\mathbb{J}})$:

$$d_j = M'_j \sum_{m=1}^{J} \left( T_{i_1} - \sum_{n=1}^{m} M'_{i_n} \right) \left( \frac{1}{T_{i_m}} - \frac{1}{T_{i_{m+1}}} \right), \quad (173)$$

where $M_j' = \min\{M_j, [N - \Sigma_{m=1}^{j-1} M_{k_m}']^+\}$, and, for notational convenience, introduce the trivial random variable $T_{i_{J+1}}$, i.e., $$\frac{1}{T_{i_{J+1}}} = 0.$$

Hence, the achievable degrees of freedom region is the convex hull of the degrees of freedom tuples, $\mathbb{D}(\tilde{\mathbb{J}})$, over all the $$\sum_{i=1}^{K} \frac{K!}{(K-i)!}$$

possible ordered set $\tilde{\mathbb{J}} \subseteq [1:K]$, i.e., $$\mathcal{D} = \{(d_1, \ldots, d_K) \in Co(\mathbb{D}(\tilde{\mathbb{J}}), \forall \tilde{\mathbb{J}} \subseteq [1:K]\}. \quad (174)$$

Proof:

By time-sharing between the transmission schemes that achieve the degrees of freedom tuples $\mathbb{D}(\tilde{\mathbb{J}})$, we can construct the achievable degrees of freedom region which is the convex hull of the achieved degrees of freedom tuples. The remainder of the proof is dedicated to show the achievability of the degrees of freedom tuple in Eq. (173) using the following transmission scheme.

Every $T_{iJ}$-length interval is divided into $T_{i1}$-length subintervals.

During the first subinterval, $\Sigma_{j \in \mathbb{J}}^{J} M_j'$ pilots are sent to estimate $M_j'$ antennas of transmitter j, and hence, during the following $T_{i1} - \Sigma_{j \in \mathbb{J}}^{J} M_j'$ period, the transmitters can communicate coherently achieving $M_j'(T_{i1} - \Sigma_{j \in \mathbb{J}}^{J} M_j')$ degrees of freedom for transmitters $j \in \mathbb{J}$.

During the remaining subintervals, when the index of the subinterval is $$\ell \frac{T_{i_m}}{T_{i_1}} + 1,$$

where m=2, . . . , J−1, and $$\ell = 1, \ldots, \frac{T_{i_{m+1}}}{T_{i_m}} - 1, \frac{T_{i_{m+1}}}{T_{i_m}} + 1, \ldots,$$

-continued $$2\frac{T_{i_{m+1}}}{T_{i_m}} - 1, \frac{T_{i_{m+1}}}{T_{i_m}} + 1, \ldots, \frac{T_{i_J}}{T_{i_m}} - 1,$$

the channel of transmitter $j=i_1, \ldots, i_m$ needs to be estimated, whereas the channel of transmitter $j=i_m+1, \ldots, J$ stays the same. Hence, $\Sigma_{n=1}^m M_{i_n}'$ pilots are sent to estimate $M_j'$ antennas of transmitters $j=i_1, \ldots, i_m$. After that, during the following $T_{i1}-\Sigma_{n=1}^m M_{i_n}'$ period, the transmitters can communicate coherently achieving $M_j'(T_{i1}-\Sigma_{n=1}^m M_{i_n}')$ degrees of freedom for transmitters $j \in \mathbb{J}$. The number of subintervals of index $$k\frac{T_m}{T_{m-1}} + 1 \text{ is } \sum_{M=2}^{J} \left(\frac{T_{i_{m+1}}}{T_{i_m}} - 1\right)\frac{T_{i_J}}{T_{i_{m+1}}}.$$

For the $T_{i1}$-length subintervals whose index is not $$\ell\frac{T_{i_m}}{T_{i_1}} + 1,$$

the channels of all transmitters remain the same except the channel of transmitter $i_1$. Hence, $M_{i_1}'$ pilots are sent to estimate the channel of transmitter $i_1$, after that the transmitters can communicate coherently during the following $T_{i1}-M_{i_1}'$ period achieving $M_j'(T_{i1}-M_{i_1}')$ degrees of freedom for transmitter $j \in \mathbb{J}$. The number of the subintervals whose index is not equal to $$\ell\frac{T_{i_m}}{T_{i_1}} + 1 \text{ is } \left(\frac{T_{i_2}}{T_{i_1}} - 1\right)\frac{T_{i_J}}{T_{i_2}}.$$

For every $T_{iJ}$ interval transmitter $j \in \mathbb{J}$ achieves $$M_j' \sum_{m=1}^{J} \left(T_{i1} - \sum_{n=1}^{m} M_{i_n}'\right)\left(\frac{1}{T_{i_m}} - \frac{1}{T_{i_{m+1}}}\right)T_{iJ}$$

degrees of freedom obtaining Eq. (173) which completes the proof of Theorem 6.

B. Outer Bound

Theorem 7:

Consider a K-transmitter MIMO multiple access channel without CSIT or CSIR, meaning that the channel realization is not known, but the channel distribution is globally known. Furthermore, the transmitters coherence times are assumed to be perfectly aligned and integer multiples of each other. Define $\mathbb{J} = \{i_1, \ldots, i_J\} \subseteq [1:K]$ to be a set of J transmitters where $$\frac{T_j}{T_{j-1}} \in \mathbb{Z},$$

$\forall j \in \mathbb{J}$, and $T_k \geq 2 \max_k\{M, N_k\}$, $\forall k=1, \ldots, K$. For every $\mathbb{J} \subseteq [1:K]$, if a set of degrees of freedom tuples $(d_{i_1}, \ldots, d_{i_J})$ is achievable, then it must satisfy the inequalities $$\sum_{j \in \mathbb{J}} d_j \leq \min\left\{N, \sum_{j \in \mathbb{J}} M_j\right\}\left(1 - \frac{\min\left\{N, \sum_{j \in \mathbb{J}} M_j\right\}}{T_{i_J}}\right). \quad (175)$$

Proof:

The proof is divided into two parts. First, enhance the channel by increasing the coherence times of the transmitters so that the enhanced channel has identical coherence times.

Lemma 4:

For the considered K-transmitter MIMO multiple access channel, define $\mathcal{D}(\mathbb{J})$ to be the degrees of freedom region of a set of transmitters $\mathbb{J} = \{i_1, \ldots, i_J\} \subseteq [1:K]$ with $$\frac{T_j}{T_{j-1}} \in \mathbb{Z},$$

$\forall j \in \mathbb{J}$. Define $\overline{\mathcal{D}}(\mathbb{J})$ to be the degrees of freedom region of the same set of transmitters $\mathbb{J} = \{i_1, \ldots, i_J\} \subseteq [1:K]$ with $T_j = T_{iJ}$, $\forall j \in \mathbb{J}$, where the transmitters have identical coherence times, namely $T_{iJ}$. Thus $$\mathcal{D}(\mathbb{J}) \subseteq \overline{\mathcal{D}}(\mathbb{J}). \quad (176)$$

The proof is provided below.

For the second part of the proof, the enhanced channel has identical coherence times, namely $T_{iJ}$, hence, the cooperative outer bound is, $$\sum_{j \in \mathbb{J}} R_j \leq I(X(\mathbb{J}); Y | X(\mathbb{J}^c)). \quad (177)$$

According to the results of noncoherent communication, the bound in Eq. (175) can be obtained, and the proof of Theorem 7 is completed.

C. Numerical Examples

Consider a two-transmitter multiple access channel where the transmitters are equipped with $M_1=2$, $M_2=4$ antennas and the receiver is equipped with $N_2=4$ antennas. The coherence time of the two transmitters is $T_1=8$ and $T_2=32$ slots. From Theorem 7, the outer degrees of freedom region is given by $$d_1 \leq \frac{3}{2}, \quad (178)$$

$$d_1 + d_2 \leq \frac{7}{2}.$$

Figure 24:
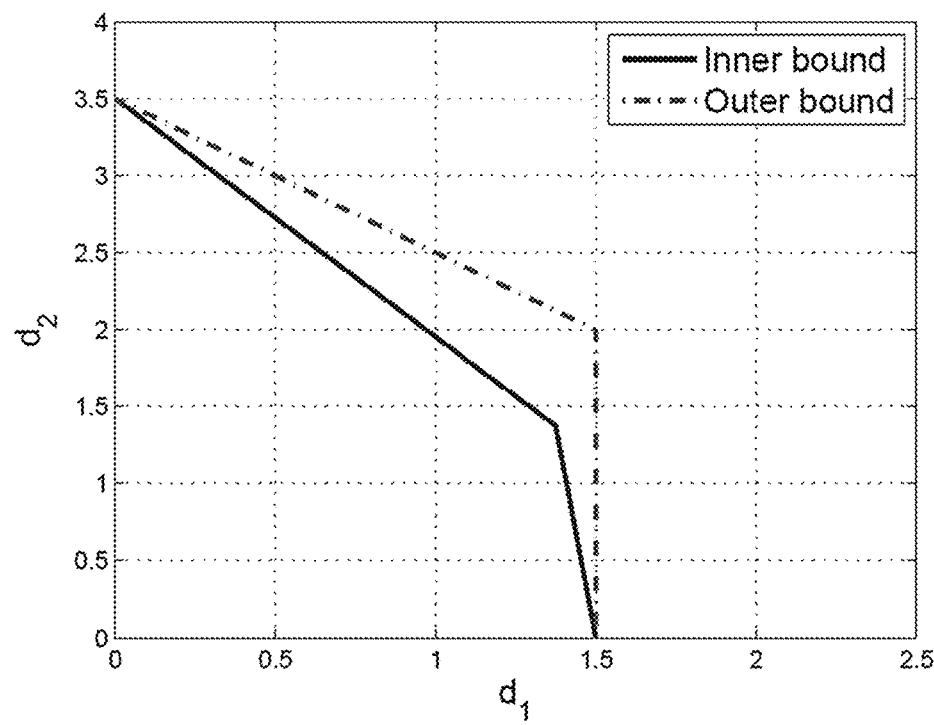
FIGS. 24 and 25 are plots illustrating examples of degrees of freedom region of a two-transmitter multiple access channel with heterogeneous coherence times, in accordance with various embodiments of the present disclosure.

The achievable degrees of freedom pairs in Theorem 6 can be obtained as follows. For the case of two transmitters, there are 5 ordered sets of transmitters $\mathbb{J}$: { }, {1}, {2}, {1,2} and {2,1}. For { }, the trivial degrees of freedom pair (0,0) can be obtained. For the two sets {1}, {2}, the degrees of freedom pairs $$\left(\frac{3}{2}, 0\right)$$

and $$\left(0, \frac{7}{2}\right),$$

respectively, can be obtained. For the two sets {1,2} and {2,1}, the degrees of freedom pairs $$\left(\frac{11}{8}, \frac{11}{8}\right)$$

and $$\left(0, \frac{7}{2}\right),$$

respectively, can be obtained. FIG. 24 shows an example of degrees of freedom region of a two-transmitter multiple access channel with heterogeneous coherence times where $M_1=2$, $M_2=4$, $N=4$, $T_1=8$, $T_2=32$. The convex hull of the achieved degrees of freedom pairs gives the achievable degrees of freedom region which is shown in FIG. 24.

Figure 25:
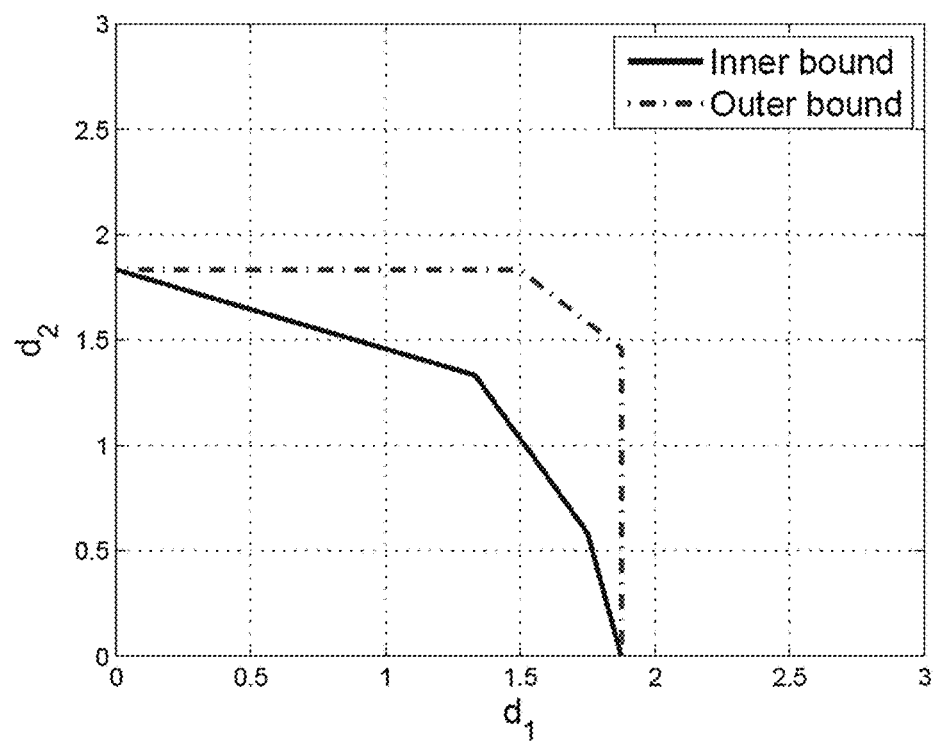

Next, consider a two-transmitter multiple access channel where the transmitters are equipped with $M_1=3$, $M_2=2$, $N=3$ antennas and coherence times $T_1=8$, $T_2=24$ slots. FIG. 25 shows an example of degrees of freedom region of a two-transmitter multiple access channel with heterogeneous coherence times where $M_1=3$, $M_2=2$, $N=4$, $T=10$, $T_1=8$, $T_2=24$. In this case the achievable and the outer degrees of freedom regions are shown in FIG. 25.

VIII. Conclusion

In the second part of this disclosure, multi-user networks without CSIT or CSIR were examined. For a broadcast channel where the receivers have identical coherence times, it was shown that the degrees of freedom region is tight against the TDMA inner bound. However, when the receivers have heterogeneous coherence times, TDMA is no longer optimal since the difference of the coherence times can be a source of diversity in the wireless systems. For a broadcast channel where the receiver's coherence times are integer multiples of each other, achievable degrees of freedom gains were obtained using the product superposition scheme. Furthermore, an outer degrees of freedom region was obtained using channel enhancement where the receiver's coherence times were increased so that the receivers of the enhanced channel have identical coherence times. With the coherence time at least twice the number of transmit and receive antennas, the optimality of the achievable scheme was shown in four cases: when the transmitter has fewer antennas than the receivers, when all the receivers have the same number of antennas, when the coherence time of the receivers are very long compared to the coherence time of one receiver, or the receivers have the same coherence time.

Additionally, a multiple access channel with identical coherence times was examined. A pilot-based achievable scheme was shown to be sum degrees of freedom optimal. Furthermore, a multiple access channel with heterogeneous coherence times was considered. When the transmitters coherence times are integer multiples of each other, an achievable pilot-based inner bound and an outer bound were obtained. The outer bound was obtained using channel enhancement where the transmitters coherence times were increased so that the transmitters of the enhanced channel have identical coherence times.

Coherent Broadcast Channel with Identical Coherent Times

The degrees of freedom optimality of TDMA inner bound (see, e.g., paragraph 0079) can be shown when the receivers have identical coherence times and CSI is assumed to be available at the receiver. Enhance the channel by providing global CSI at the receivers. Without loss of generality, assume that $N_1 \leq \ldots \leq N_K$. When $M \leq N_1$, the cooperative outer bound is tight against the TDMA inner bound. When $M > N_1$, the broadcast channel is degraded, hence, $$R_i \leq (U_i; Y_i | \mathbb{H}, U^{i-1}) \quad (179)$$

$$= I(X; Y_i | \mathbb{H}, U^{i-1}) - I(X; Y_i | \mathbb{H}, U^i),$$

where $U^i = \{U_j\}_{j=1}^i$ is a set of auxiliary random variables such that $U_1 \to \ldots \to U_{K-1} \to X \to (Y_1, \ldots Y_K)$ forms a Markov chain and for notational convenience we introduced a trivial random variable $U_0$ and $U_K = X$. $\mathbb{H}$ is the set of all channels. Furthermore, $$R_1 \leq (N_1 - r_1)\log(\rho) + o(\log(\rho)),$$

$$R_i \leq I(X; Y_i | \mathbb{H}, U^{i-1}) - r_i \log(\rho) + o(\log(\rho)), i \neq 1, K,$$

$$R_K \leq I(X; Y_K | \mathbb{H}, U^{K-1}), \quad (180)$$

since the degrees of freedom of $I(X; Y_1 | \mathbb{H})$ is bounded by the single-receiver bound, i.e. $N_1$, and $r_i$ is defined to be the degrees of freedom of the term $I(X; Y_i | \mathbb{H}, U^i)$, where $0 \leq r_i \leq N_i^*$. The extension of Lemma 1 of "On degrees of freedom region of MIMO networks without channel state information at transmitters" by C. Huang et al. (*IEEE Trans. Inf. Theory*, vol. 58, no. 2, pp. 849-857, February 2012), which is hereby incorporated by reference in its entirety, to the K-receiver case is straight forward, and hence, can be written as $$I(X; Y_{i,1} | \mathbb{H}, U^i, Y_{i,2:N_i^*}) \leq \frac{r_i}{N_i^*} \log(\rho) + o(\log(\rho)), \quad (181)$$

where $Y_{i,1} \in \mathbb{C}^{1 \times T}$ is the received signal at antenna 1 of receiver i over the entire T-length coherence time whereas $Y_{i,2:N_i^*} \in \mathbb{C}^{(N_i^* - 1) \times T}$ is the matrix comprising the received signal at antennas $2,3, \ldots, N_i^*$ of receiver i over the entire T-length coherence time. Furthermore, $$I(X; Y_i | \mathbb{H}, U^{i-1}) \stackrel{(a)}{=} I(X; Y_{i,1:N_i^*} | \mathbb{H}, U^{i-1}) + \quad (182)$$

$$I(X; Y_{i,N_i^*+1:N_i} | \mathbb{H}, U^{i-1}, Y_{i,1:N_i^*})$$

$$\stackrel{(b)}{=} I(X; Y_{i,1:N_{i-1}^*} | \mathbb{H}, U^{i-1}) +$$

$$I(X; Y_{i,N_{i-1}^*+1:N_i^*} | \mathbb{H}, U^{i-1}, Y_{i,1:N_{i-1}^*}) +$$

$$o(\log(\rho))$$

$$\stackrel{(c)}{=} I(X; Y_{i-1,1:N_{i-1}^*} | \mathbb{H}, U^{i-1}) +$$

-continued $$I(X; Y_{i,N_{i-1}^*+1:N_i^*} | \mathbb{H}, U^{i-1}, Y_{i,1:N_{i-1}^*}) +$$
$$o(\log(\rho))$$
$$= r_{i-1}\log(\rho) +$$
$$\sum_{j=N_{i-1}^*+1}^{N_i^*} I(X; Y_{i,j} | \mathbb{H}, U^{i-1}, Y_{i-1,1:N_{i-1}^*},$$
$$Y_{i,j+1:N_i^*}) + o(\log(\rho))$$
$$\stackrel{(d)}{\leq} r_{i-1}\log(\rho) +$$
$$(N_i^* - N_{i-1}^*)I(X; Y_{i-1,1} | \mathbb{H}, U^{i-1}, Y_{i-1,2:N_{i-1}^*}) +$$
$$o(\log(\rho))$$
$$\stackrel{(e)}{\leq} r_{i-1}\log(\rho) + (N_i^* - N_{i-1}^*)\frac{r_{i-1}}{N_{i-1}^*}\log(\rho) + o(\log(\rho))$$
$$\leq \frac{N_i^*}{N_{i-1}^*}r_{i-1}\log(\rho) + o(\log(\rho)),$$

where (a) and (b) follow from applying the chain rule, and $h(Y_{i,N_i^*+1:N_i} | \mathbb{H}, U^{i-1}, Y_{i,N_i^*}) = o(\log(\rho))$. Furthermore, (c) follows since $Y_{i,1:N_{i-1}^*}$ and $Y_{i-1,1:N_{i-1}^*}$ are statistically the same. (d) follows from applying the straight forward extension of Lemma 1 of "On degrees of freedom region of MIMO networks without channel state information at transmitters" by C. Huang et al. (*IEEE Trans. Inf. Theory*, vol. 58, no. 2, pp. 849-857, February 2012), which is hereby incorporated by reference in its entirety, and (e) follows from Eq. (181). Therefore, $$d_1 \leq N_1 - r_1, \tag{183}$$
$$d_i \leq \frac{N_i^*}{N_{i-1}^*}r_{i-1} - r_i, i \neq 1, K,$$
$$d_K \leq \frac{N_K^*}{N_{K-1}^*}r_{K-1},$$

which gives the region defined in Eq. (120).

Proof of Lemma 1

First, we prove the equality of Eq. (122), $$I(X; \overline{Y}_j | U, \tilde{Y}_{\{j,\ell\}}) = h(\overline{Y}_j | U, \tilde{Y}_{\{j,\ell\}}) - h(\overline{Y}_j | U, \tilde{Y}_{\{j,\ell\}}, X) \tag{184}$$
$$\stackrel{(a)}{=} h(\overline{Y}_\ell | U, \tilde{Y}_{\{j,\ell\}}) - h(\overline{Y}_\ell | U, \tilde{Y}_{\{j,\ell\}}, X)$$
$$= I(X; \overline{Y}_\ell | U, \tilde{Y}_{\{j,\ell\}}).$$

where (a) follows since the random variables are statistically equivalent, and entropies depend only on the statistics. Now prove the inequality of Eq. (123) as follows, $$I(X; \overline{Y}_j | U, \tilde{Y}_{\{j,\ell\}}) = h(\overline{Y}_j | U, \tilde{Y}_{\{j,\ell\}}) - h(\overline{Y}_j | U, \tilde{Y}_{\{j,\ell\}}, X) \tag{185}$$
$$\stackrel{(a)}{\geq} h(\overline{Y}_j | U, \tilde{Y}_{\{j,\ell\}}, \overline{Y}_\ell) - h(\overline{Y}_j | U, \tilde{Y}_{\{j,\ell\}}, X)$$
$$\stackrel{(b)}{=} h(\overline{Y}_j | U, \tilde{Y}_{\{j,\ell\}}, \overline{Y}_\ell) - h(\overline{Y}_j | U, \tilde{Y}_{\{j,\ell\}}, X, \overline{Y}_\ell)$$
$$= I(X; \overline{Y}_j | U, \tilde{Y}_{\{j,\ell\}}, \overline{Y}_\ell),$$

where (a) follows since conditioning does not increase the entropy. Furthermore (b) follows by the fact that $\overline{Y}_j \to X \to \overline{Y}_\ell$ forms a Markov chain. The received signal $\overline{Y}_j$, $\overline{Y}_\ell$ are given by, respectively, $$\overline{Y}_T = h_j^H X + z_j^H,$$
$$\overline{Y}_\ell = h_\ell^H X + z_\ell^H, \tag{186}$$

where $h_j^H$, $h_\ell^H$ are the channel vectors which are independent from each other whereas $z_j^H$, $z_\ell^H$ are the independent corresponding noise vectors. Therefore, conditioning on X, $\overline{Y}_j$ and $\overline{Y}_\ell$ are independent.

Proof of Lemma 2

Consider the set of receivers $\mathbb{J} \subseteq [1:K]$ where the receivers are ordered ascendingly according to the coherence time length, i.e., $T_j \geq T_j$, $\forall j \in \mathbb{J}$. The proof consists of two steps. First, show that the individual degrees of freedom of each receiver is nondecreasing with the increase of the coherence time of this receiver. Second, show that the degrees of freedom region of the channel is nondecreasing with the increase of the coherence time of the receivers. For the first step of the proof, introduce the following Lemma.

Lemma 5:

For the broadcast channel considered in Section III, define $\mathbb{J} = \{i_1, \ldots, i_J\} \subseteq [1:K]$ with $T_j \geq T_{j-1}$, $\forall j \in \mathbb{J}$ and $\Psi$ as the message of receive $j \in \mathbb{J}$ r. Thus, $$N_j^*\left(\frac{1}{J} - \frac{N_j^*}{T_j}\right) \leq MG\left\{\frac{1}{n}I(\Psi_j; Y_j^n)\right\} \leq N_j^*\left(1 - \frac{N_j^*}{T_j}\right), \tag{187}$$

where MG(x) is the multiplexing gain of a function $x(\rho)$ of $\rho$ and defined as $$MG(x) = \lim_{\rho \to \infty} \sup \frac{x(\rho)}{\log(\rho)}. \tag{188}$$

Proof: To first prove the right inequality of Eq. (187)

$$MG\left\{\frac{1}{n}I(\Psi_j; Y_j^n)\right\} \stackrel{(a)}{\leq} MG\left\{\frac{1}{n}I(X^n; Y_j^n)\right\} \tag{189}$$
$$\stackrel{(b)}{\leq} N_j^*\left(1 - \frac{N_j^*}{T_j}\right),$$

where (a) follows from the data processing inequality and (b) follows from the single-receiver results. Next, we show the left inequality of Eq. (187). Assume the following transmitted sequence $$X^n[U_{i_1}, \ldots, U_{i_J}], \tag{190}$$

where $$U_j \in \mathbb{C}^{N_j \times \frac{n}{J}}$$

is the matrix containing the signal of receiver $j \in \mathbb{J}$ and the matrix is constructed to be on the form of the optimal input of a non-coherent single receiver. Hence, $$MG\left\{\frac{1}{n}I(\Psi_j; Y_j^n)\right\} \geq MG\left\{\frac{1}{n}I(U_j; Y_j^n)\right\} \geq \qquad (191)$$

$$\frac{N_j^*}{J}\left(1 - \frac{N_j^*}{T_j}\right) \geq N_j^*\left(\frac{1}{J} - \frac{N_j^*}{T_j}\right).$$

Thus, the proof of Lemma 5 is completed.

By Lemma 5, there are lower and outer bounds which are increasing with $T_j$. Furthermore, the difference between the two bounds is $$\Delta = N_j^*\left(1 - \frac{N_j^*}{T_j}\right) - N_j^*\left(\frac{1}{J} - \frac{N_j^*}{T_j}\right) = N_j^* \frac{J-1}{J}. \qquad (192)$$

Therefore, $$MG\left\{\frac{1}{n}I(\Psi_j; Y_j^n)\right\}$$

is nondecreasing with the increase of $T_j$, which completes the first step of the proof of Lemma 2.

Now, consider the second part of the proof via a contradiction argument. Define $\mathcal{D}$ to be the degrees of freedom region of a set of receivers with unequal coherence times where $\max_j T_j = T_{max}$ and $Y_j^n$ denotes the received signal at receiver j. Define $\bar{\mathcal{D}}$ to be the degrees of freedom region of the receivers where the coherence time of all receivers is $T_{max}$, where $\bar{Y}_j^n$ denotes the received signal at receiver j of this enhanced channel. Define $\tilde{D} \in \mathcal{D}$ to be a degrees of freedom tuple, and $d_j \in \tilde{D}$ is the degrees of freedom of receiver j. Assume that $\tilde{D} \notin \bar{\mathcal{D}}$. By Fano's inequality, $$d_j \leq MG\left\{\frac{1}{\bar{n}}I(\Psi_j; Y_j^n)\right\}, \qquad (193)$$

$$\leq MG\left\{\frac{1}{\bar{n}}I(\Psi_j; \bar{Y}_j^n)\right\},$$

where $\Psi_j$ is the message of receiver $j \in \mathbb{J}$, and the last inequality follows from Lemma 5. Therefore, $d_j \in \bar{\mathcal{D}}$, $\forall j$, which contradicts the initial assumption completing the second part of the proof. $\bar{\mathcal{D}}$ Proof of Lemma 4

Consider the set of transmitter $\mathbb{J} = \{i_1, \ldots, i_J\} \subseteq [1:K]$ where $\forall j \in \mathbb{J}$, $$\frac{T_j}{T_{j-1}} \in \mathbb{Z}.$$

By Fano's inequality, as $\bar{n} \to \infty$, $$\sum_{j \in \mathbb{J}} R_j \leq \frac{1}{\bar{n}} I(X_{i_1}^n, \ldots, X_{i_J}^n; Y^n), \qquad (194)$$

where $X_j^n$ is transmitter $j \in \mathbb{J}$ signal and $Y^n$ is the received signal over the entire transmission time $1:\bar{n}$. In the sequel, it can be shown that the degrees of freedom of $$\frac{1}{n}I(X_j; Y^n),$$

$j \in \mathbb{J}$ is nondecreasing in $T_j$. Given lower and upper bounds on this term, and furthermore, both bounds are nondecreasing in $T_j$. Introduce the following Lemma.

Lemma 6:

For the multiple access channel considered in Section VII, define $\mathbb{J} = \{i_1, \ldots, i_J\} \subseteq [1:K]$ and $\Psi_j$ as the message of transmitter $j \in \mathbb{J}$. Thus, $$\sum_{j \in \mathbb{J}} M_j^*\left(\frac{1}{J} - \frac{M_j^*}{T_j}\right) \leq MG\left\{\frac{1}{\bar{n}} I(X_{i_1}^n, \ldots, X_{i_J}^n; Y^n)\right\} \leq \sum_{j \in \mathbb{J}} M_j^*\left(1 - \frac{M_j^*}{T_j}\right). \qquad (195)$$

Proof:

First prove the right inequality of Eq. (195). Begin with $$MG\left\{\frac{1}{\bar{n}} I(X_{i_1}^n, \ldots, X_{i_J}^n; Y^n)\right\} \leq \sum_{j \in \mathbb{J}} M_j^*\left(1 - \frac{M_j^*}{T_j}\right), \qquad (196)$$

where the above inequality follows from the single-transmitter results. Next, show the left inequality of Eq. (195). Assume the following transmitted sequence $$\bar{X}_j^n = [0, \ldots 0, U_j, 0, \ldots, 0], \qquad (197)$$

where $U_j \in$ $$\mathbb{C}^{M_j \times \frac{n}{J}}$$

is the matrix containing the signal of transmitter $j \in \mathbb{J}$ and the matrix is constructed to be on the form of the optimal input of a non-coherent single transmitter. Hence, $$MG\left\{\frac{1}{\bar{n}} I(X_{i_1}^n, \ldots, X_{i_J}^n; Y^n)\right\} \geq MG\left\{\frac{1}{\bar{n}} \sum_{j \in \mathbb{J}} I(U_j; Y_j^n)\right\} \geq \qquad (198)$$

$$\sum_{j \in \mathbb{J}} \frac{M_j^*}{J}\left(1 - \frac{M_j^*}{T_j}\right) \geq \sum_{j \in \mathbb{J}} M_j^*\left(\frac{1}{J} - \frac{M_j^*}{T_j}\right).$$

Thus, the proof of Lemma 6 is completed.

By Lemma 6, there exists lower and outer bounds which are increasing with $T_j$. Furthermore, the difference between the two bounds is $$\Delta = \sum_{j \in \mathcal{J}} M_j^* \left(1 - \frac{M_j^*}{T_j}\right) - M_j^* \left(\frac{1}{J} - \frac{M_j^*}{T_j}\right) = M_j^* \frac{J-1}{J}. \quad (199)$$

Therefore $$MG\left\{\frac{1}{n} I(X_{i_1}^n, \ldots, X_{i_j}^n; Y^n)\right\}$$

is nondecreasing with the increase of $T_j$, and hence, the proof of Lemma 4 is completed.

Figure 26:
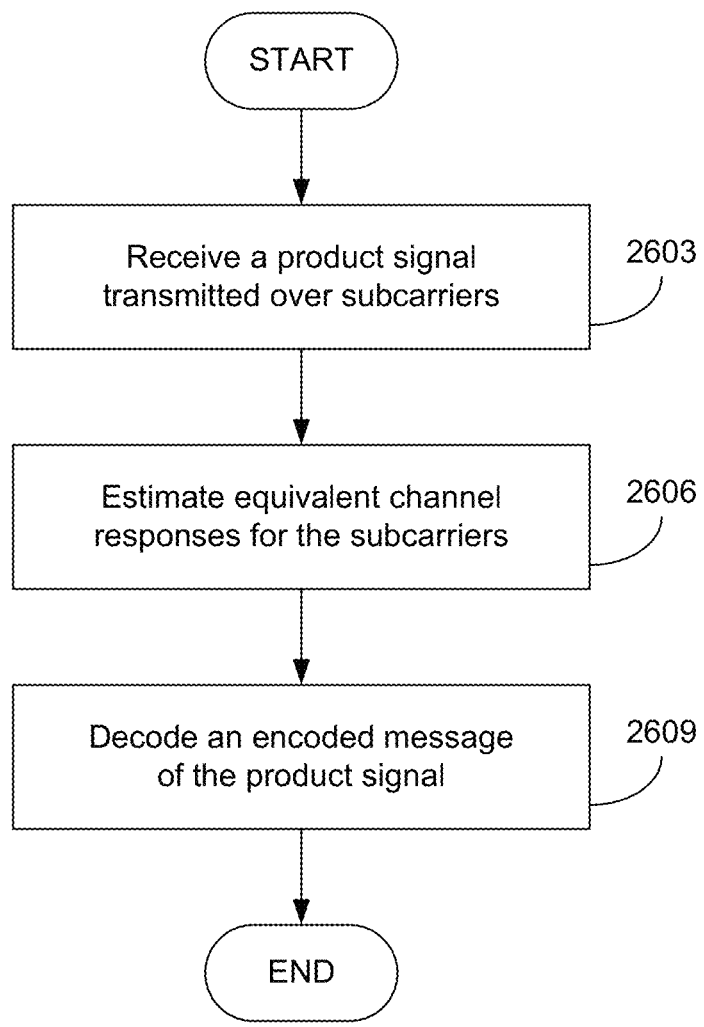
FIG. 26 is a flow chart illustrating an example of coherence diversity which can be implemented by processing circuitry in transceivers, transmitters and/or receivers, in accordance with various embodiments of the present disclosure.

Referring next to FIG. 26, shown is a flow chart illustrating an example of the coherence diversity which can be implemented by processing circuitry in transceivers, transmitters and/or receivers, in accordance with various embodiments of the present disclosure. Consider the case of, e.g., a transceiver. Beginning at 2603, a product signal transmitted over a plurality of subcarriers is received. The product signal can comprise a product superposition of a first baseband signal and a second baseband signal. The first baseband signal can include a pilot symbol in a number of time slots of at least a portion of the plurality of subcarriers and a first encoded message in a remaining number of time slots of the plurality of subcarriers. The second baseband signal can include a second encoded message. In other embodiments, the product signal can comprise a product superposition of three or more baseband signals. For example, the product signal can comprise a product superposition of the first baseband signal, the second baseband signal and a third baseband signal.

The number of time slots can correspond to a number of antennas transmitting the product signal. The number of time slots can be a beginning number of time slots of the portion of the plurality of subcarriers. In other embodiments, the number of time slots may not include a beginning number of time slots of the portion of the plurality of subcarriers. In some implementations, each of the plurality of subcarriers can include the pilot symbol in the number of time slots. In other implementations, a first number of the plurality of subcarriers can include the pilot symbol in the number of time slots, and a remaining number of the plurality of subcarriers will not include the pilot symbol. For example, one subcarrier can include the pilot symbol and the remaining subcarriers do not include the pilot symbol. The pilot symbol can be included in a subgroup of the number of time slots. Individual time slots of the subgroup can be separated based upon the first coherence time. Time slots between the individual time slots of the subgroup can comprise a portion of the first encoded message. The subgroup of the number of time slots can be based upon a number of antennas transmitting the product signal, a number of antennas receiving the product signal, and the first coherence time.

The first baseband signal can be associated with a first channel that varies faster in time than a second channel associated with the second baseband signal. The first baseband signal can be associated with a first channel that varies faster in both time and frequency than a second channel associated with the second baseband signal. In some embodiments, the second channel can vary faster in frequency than the first channel. In other implementations, the first baseband signal can be associated with a first channel that varies faster in frequency than a second channel associated with the second baseband signal. The second channel can vary faster in time than the first channel.

The equivalent channel responses for the subcarriers can be estimated based upon the pilot symbol in the number of time slots of the subcarriers at 2606. The equivalent channel responses for the first number of the plurality of subcarriers can be estimated based upon the pilot symbol in the number of time slots of the first number of the plurality of subcarriers, and the equivalent channel responses for the remaining number of the plurality of subcarriers can be interpolated based upon the pilot symbol in the number of time slots of the first number of the plurality of subcarriers. The number of time slots and the remaining number of time slots can correspond to subintervals of a first coherence time interval of a first receiver of the first baseband signal and a second coherence time interval of a second receiver of the second baseband signal. In some embodiments, the number of time slots and the remaining number of time slots can correspond to subintervals of a first coherence time interval of a first receiver of the first baseband signal, a second coherence time interval of a second receiver of the second baseband signal, and a third coherence time interval of a third receiver of the second baseband signal. The second and third coherence times can be integer multiples or non-integer multiples of the first coherence time. Interference alignment of the first and second baseband signals can be included after estimating the equivalent channel responses.

Encoded messages can then be decoded at 2609. The second encoded message can be decoded based at least in part upon the first baseband signal and the equivalent channel responses. Decoding the second encoded message can include removing the first baseband signal from the product signal based upon the equivalent channel responses. In other implementations, decoding the second encoded message can comprise estimating the second baseband signal from the product of the pilot symbol and the second encoded message.

Figure 27:
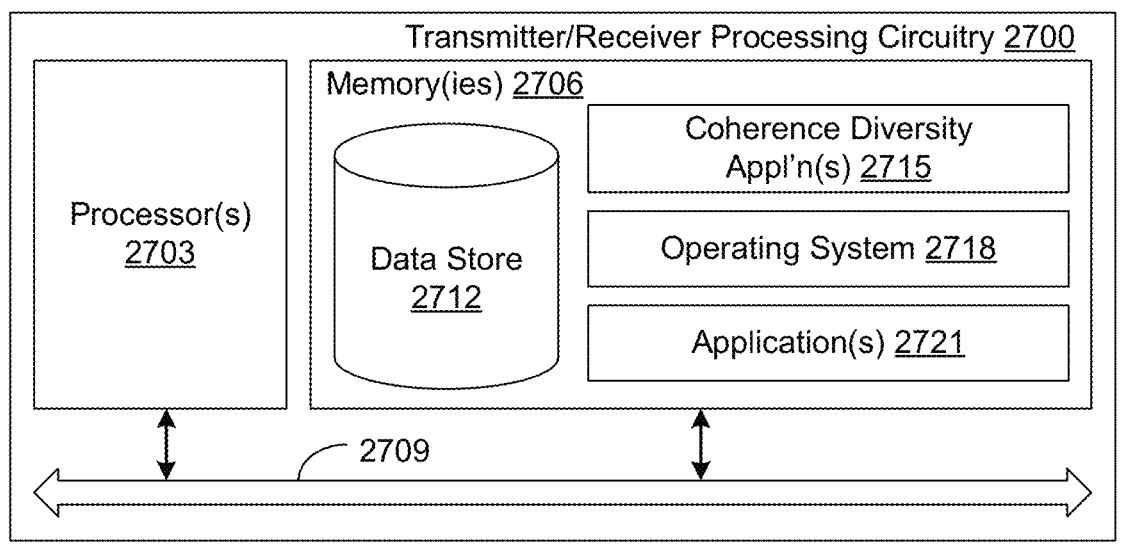
FIG. 27 is a schematic block diagram that illustrates an example of processing circuitry employed by transmitters and/or receivers, in accordance with various embodiments of the present disclosure.

With reference now to FIG. 27, shown is a schematic block diagram of an example of processing circuitry 2700 in transceivers, transmitters and/or receivers that may be used to implement various portions of the coherency diversity in accordance with various embodiments of the present disclosure. The processing circuitry 2700 includes at least one processor circuit, for example, having a processor 2703 and a memory 2706, both of which are coupled to a local interface 2709. To this end, the processing circuitry 2700 may be implemented using one or more circuits, one or more microprocessors, microcontrollers, application specific integrated circuits, dedicated hardware, digital signal processors, microcomputers, central processing units, field programmable gate arrays, programmable logic devices, state machines, or any combination thereof. The local interface 2709 may comprise, for example, a data bus with an accompanying address/control bus or other bus structure as can be appreciated. The processing circuitry 2700 can include a display for rendering of generated graphics such as, e.g., a user interface and an input interface such, e.g., a keypad or touch screen to allow for user input. In addition, the processing circuitry 2700 can include communication interfaces (not shown) that allow the processing circuitry 2700 to communicatively couple with other communication devices. The communication interfaces may include one or more wireless connection(s) such as, e.g., Bluetooth or other radio frequency (RF) connection and/or one or more wired connection(s).

Stored in the memory 2706 are both data and several components that are executable by the processor 2703. In particular, stored in the memory 2706 and executable by the processor 2703 are coherence diversity application(s) 2715, an operating system 2718, and/or other applications 2721. Coherence diversity applications 2715 can include applications that support control and/or operation of the transceiver, transmitter and/or receiver for communications. It is understood that there may be other applications that are stored in the memory 2706 and are executable by the processor 2703 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python, Ruby, Delphi®, Flash®, LabVIEW® or other programming languages.

A number of software components are stored in the memory 2706 and are executable by the processor 2703. In this respect, the term "executable" means a program file that is in a form that can ultimately be run by the processor 2703. Examples of executable programs may be, for example, a compiled program that can be translated into machine code in a format that can be loaded into a random access portion of the memory 2706 and run by the processor 2703, source code that may be expressed in proper format such as object code that is capable of being loaded into a random access portion of the memory 2706 and executed by the processor 2703, or source code that may be interpreted by another executable program to generate instructions in a random access portion of the memory 2706 to be executed by the processor 2703, etc. An executable program may be stored in any portion or component of the memory 2706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 2706 is defined herein as including both volatile and nonvolatile memory and data storage components. Volatile components are those that do not retain data values upon loss of power. Nonvolatile components are those that retain data upon a loss of power. Thus, the memory 2706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 2703 may represent multiple processors 2703 and the memory 2706 may represent multiple memories 2706 that operate in parallel processing circuits, respectively. In such a case, the local interface 2709 may be an appropriate network that facilitates communication between any two of the multiple processors 2703, between any processor 2703 and any of the memories 2706, or between any two of the memories 2706, etc. The local interface 2709 may comprise additional systems designed to coordinate this communication, including, for example, performing load balancing. The processor 2703 may be of electrical or of some other available construction.

Although the coherence diversity application(s) 2715, the operating system 2718, application(s) 2721, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Also, any logic or application described herein, including the coherence diversity application(s) 2715 and/or application(s) 2721, that comprises software or code can be embodied in any non-transitory computer-readable medium for use by or in connection with an instruction execution system such as, for example, a processor 2703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1% to about 5%, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A method, comprising:
receiving a product signal transmitted over a plurality of subcarriers, the product signal comprising a product superposition of a first baseband signal and a second baseband signal, where the first baseband signal comprises a pilot symbol in a number of time slots of at least a portion of the plurality of subcarriers and a first encoded message in a remaining number of time slots of the plurality of subcarriers, where a first number of the plurality of subcarriers includes the pilot symbol in the number of time slots, and a remaining number of the plurality of subcarriers do not include the pilot symbol, and where the second baseband signal comprises a second encoded message;
estimating equivalent channel responses for the plurality of subcarriers based upon the pilot symbol in the number of time slots of the plurality of subcarriers, wherein the equivalent channel responses for the first number of the plurality of subcarriers are estimated based upon the pilot symbol in the number of time slots of the first number of the plurality of subcarriers, and the equivalent channel responses for the remaining number of the plurality of subcarriers are interpolated based upon the pilot symbol in the number of time slots of the first number of the plurality of subcarriers; and
decoding the second encoded message based at least in part upon the first baseband signal and the equivalent channel responses.

2. The method of claim 1, wherein the number of time slots are a beginning number of time slots of the at least a portion of the plurality of subcarriers.

3. The method of claim 1, wherein decoding the second encoded message comprises removing the first baseband signal from the product signal based upon the equivalent channel responses.

4. The method of claim 1, wherein decoding the second encoded message comprises estimating the second baseband signal from the product of the pilot symbol and the second encoded message.

5. The method of claim 1, wherein the number of time slots corresponds to a number of antennas transmitting the product signal.

6. The method of claim 1, wherein the first number of the plurality of subcarriers is one subcarrier of the plurality of subcarriers.

7. The method of claim 1, wherein the number of time slots and the remaining number of time slots correspond to subintervals of a first coherence time interval of a first receiver of the first baseband signal and a second coherence time interval of a second receiver of the second baseband signal.

8. The method of claim 1, wherein the product signal comprises a product superposition of three or more baseband signals.

9. The method of claim 1, wherein the product signal comprises a product superposition of the first baseband signal, the second baseband signal and a third baseband signal.

10. The method of claim 1, wherein the first baseband signal is associated with a first channel that varies faster in time than a second channel associated with the second baseband signal.

11. The method of claim 10, wherein the first baseband signal is associated with a first channel that varies faster in both time and frequency than a second channel associated with the second baseband signal.

12. The method of claim 10, wherein the second channel varies faster in frequency than the first channel.

13. The method of claim 1, wherein the first baseband signal is associated with a first channel that varies faster in frequency than a second channel associated with the second baseband signal.

14. The method of claim 13, wherein the second channel varies faster in time than the first channel.

15. The method of claim 1, further comprising interference alignment of the first and second baseband signals after estimating the equivalent channel responses.

16. A method, comprising:
receiving a product signal transmitted over a plurality of subcarriers, the product signal comprising a product superposition of a first baseband signal, a second baseband signal and a third baseband signal, where the first baseband signal comprises a pilot symbol in a number of time slots of at least a portion of the plurality of subcarriers and a first encoded message in a remaining number of time slots of the plurality of subcarriers, and where the second baseband signal comprises a second encoded message, wherein the number of time slots and the remaining number of time slots correspond to subintervals of a first coherence time interval of a first receiver of the first baseband signal, a second coherence time interval of a second receiver of the second baseband signal, and a third coherence time interval of a third receiver of the second baseband signal;
estimating equivalent channel responses for the plurality of subcarriers based upon the pilot symbol in the number of time slots of the plurality of subcarriers; and
decoding the second encoded message based at least in part upon the first baseband signal and the equivalent channel responses.

17. The method of claim 16, wherein the number of time slots do not include a beginning number of time slots of the at least a portion of the plurality of subcarriers.

18. The method of claim 16, wherein each of the plurality of subcarriers includes the pilot symbol in the number of time slots.

19. The method of claim 16, wherein a first number of the plurality of subcarriers includes the pilot symbol in the number of time slots, and a remaining number of the plurality of subcarriers do not include the pilot symbol.

20. The method of claim 16, wherein second and third coherence times are integer multiples of a first coherence time.

21. The method of claim 16, wherein the second and third coherence times are non-integer multiples of the first coherence time.

22. The method of claim 16, wherein the pilot symbol is included in a subgroup of the number of time slots.

23. The method of claim 22, wherein individual time slots of the subgroup are separated based upon a first coherence time.

24. The method of claim 23, wherein time slots between the individual time slots of the subgroup comprise a portion of the first encoded message.

25. The method of claim 22, wherein the subgroup of the number of time slots is based upon a number of antennas transmitting the product signal, a number of antennas receiving the product signal, and the first coherence time.

* * * * *